US011710823B2

(12) United States Patent
Kawakami et al.

(10) Patent No.: US 11,710,823 B2
(45) Date of Patent: *Jul. 25, 2023

(54) PARTICLE, ELECTRODE, POWER STORAGE DEVICE, ELECTRONIC DEVICE, AND METHOD FOR MANUFACTURING ELECTRODE

(71) Applicant: SEMICONDUCTOR ENERGY LABORATORY CO., LTD., Atsugi (JP)

(72) Inventors: Takahiro Kawakami, Kanagawa (JP); Teruaki Ochiai, Kanagawa (JP); Shuhei Yoshitomi, Kanagawa (JP); Takuya Hirohashi, Kanagawa (JP); Mako Motoyoshi, Kanagawa (JP); Yohei Momma, Kanagawa (JP); Junya Goto, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,407

(22) Filed: Jun. 29, 2022

(65) Prior Publication Data

US 2022/0352510 A1    Nov. 3, 2022

Related U.S. Application Data

(60) Continuation of application No. 16/934,201, filed on Jul. 21, 2020, now Pat. No. 11,394,025, which is a
(Continued)

(30) Foreign Application Priority Data

Oct. 27, 2014 (JP) .................................. 2014-218501
Oct. 27, 2014 (JP) .................................. 2014-218659
(Continued)

(51) Int. Cl.
  *H01M 4/505* (2010.01)
  *H01M 4/36* (2006.01)
  (Continued)

(52) U.S. Cl.
  CPC ............ *H01M 4/505* (2013.01); *H01M 4/131* (2013.01); *H01M 4/1391* (2013.01); *H01M 4/366* (2013.01); *H01M 2220/30* (2013.01)

(58) Field of Classification Search
  CPC .... H01M 4/505; H01M 4/131; H01M 4/1391; H01M 4/366; H01M 2220/30
  See application file for complete search history.

(56) References Cited

U.S. PATENT DOCUMENTS 6,306,542 B1   10/2001 Nakano et al.
7,303,840 B2   12/2007 Thackeray et al.
(Continued)

FOREIGN PATENT DOCUMENTS

CN   101481148 B   6/2011
CN   103210531 A   7/2013
(Continued)

OTHER PUBLICATIONS

International Search Report (Application No. PCT/IB2015/057849) dated Feb. 2, 2016.
(Continued)

*Primary Examiner* — Jane J Rhee
(74) *Attorney, Agent, or Firm* — Nixon Peabody LLP; Jeffrey L. Costellia

(57) ABSTRACT

To increase capacity per weight of a power storage device, a particle includes a first region, a second region in contact
(Continued)

with at least part of a surface of the first region and located on the outside of the first region, and a third region in contact with at least part of a surface of the second region and located on the outside of the second region. The first and the second regions contain lithium and oxygen. At least one of the first region and the second region contains manganese. At least one of the first and the second regions contains an element M. The first region contains a first crystal having a layered rock-salt structure. The second region contains a second crystal having a layered rock-salt structure. An orientation of the first crystal is different from an orientation of the second crystal.

9 Claims, 55 Drawing Sheets

Related U.S. Application Data continuation of application No. 16/114,312, filed on Aug. 28, 2018, now Pat. No. 10,749,174, which is a division of application No. 14/920,650, filed on Oct. 22, 2015, now Pat. No. 10,084,186.

(30) Foreign Application Priority Data

Nov. 7, 2014 (JP) ................................. 2014-227325
Nov. 10, 2014 (JP) ................................. 2014-227729

(51) Int. Cl.
 $H01M\ 4/131$ (2010.01)
 $H01M\ 4/1391$ (2010.01)

(56) References Cited

U.S. PATENT DOCUMENTS

| | | | |
|---|---|---|---|
| 7,541,114 B2 | 6/2009 | Ohzuku et al. | |
| 7,635,536 B2 | 12/2009 | Johnson et al. | |
| 7,790,308 B2 | 9/2010 | Johnson et al. | |
| 8,080,340 B2 | 12/2011 | Thackeray et al. | |
| 8,470,477 B2 | 6/2013 | Miwa et al. | |
| 8,877,381 B2 | 11/2014 | Yasuda et al. | |
| 9,384,904 B2 | 7/2016 | Inoue et al. | |
| 9,391,325 B2 | 7/2016 | Ohzuku et al. | |
| 9,490,474 B2 | 11/2016 | Nomoto et al. | |
| 9,685,653 B2 | 6/2017 | Inoue et al. | |
| 9,698,411 B2 | 7/2017 | Yamamoto et al. | |
| 9,899,660 B2 | 2/2018 | Inoue et al. | |
| 10,109,853 B2 | 10/2018 | Sugie et al. | |
| 10,263,243 B2 | 4/2019 | Inoue et al. | |
| 10,553,864 B2 | 2/2020 | Sugie et al. | |
| 11,056,678 B2 | 7/2021 | Inoue et al. | |
| 2005/0170250 A1 | 8/2005 | Ohzuku et al. | |
| 2006/0051671 A1 | 3/2006 | Thackeray et al. | |
| 2006/0051673 A1 | 3/2006 | Johnson et al. | |
| 2008/0116418 A1 | 5/2008 | Tabuchi et al. | |
| 2009/0123842 A1 | 5/2009 | Thackeray et al. | |
| 2010/0143784 A1 | 6/2010 | Johnson et al. | |
| 2012/0058397 A1 | 3/2012 | Zhamu et al. | |
| 2012/0256337 A1 | 10/2012 | Yokoyama et al. | |
| 2012/0258358 A1 | 10/2012 | Yura et al. | |
| 2012/0258365 A1 | 10/2012 | Yokoyama et al. | |
| 2012/0258369 A1 | 10/2012 | Yokoyama et al. | |
| 2012/0315544 A1* | 12/2012 | Yasuda | C01G 45/1257 977/773 |
| 2013/0295463 A1 | 11/2013 | Matsuda et al. | |
| 2013/0330616 A1* | 12/2013 | Christensen | C01G 53/50 429/231.95 |
| 2013/0337320 A1 | 12/2013 | Yukawa | |
| 2014/0045067 A1 | 2/2014 | Cho et al. | |
| 2014/0154555 A1 | 6/2014 | Endoh et al. | |
| 2014/0332715 A1* | 11/2014 | Kawakami | H01M 4/364 252/182.1 |
| 2015/0099178 A1 | 4/2015 | Kawakami et al. | |
| 2015/0099179 A1 | 4/2015 | Ikenuma et al. | |
| 2015/0325855 A1 | 11/2015 | Kawakami et al. | |
| 2021/0408516 A1 | 12/2021 | Inoue et al. | |

FOREIGN PATENT DOCUMENTS

| | | |
|---|---|---|
| EP | 1487039 A | 12/2004 |
| EP | 2677574 A | 12/2013 |
| EP | 2704236 A | 3/2014 |
| JP | 11-025983 A | 1/1999 |
| JP | 2004-311427 A | 11/2004 |
| JP | 2006-318928 A | 11/2006 |
| JP | 2006-318929 A | 11/2006 |
| JP | 2008-511960 | 4/2008 |
| JP | 2012-169217 A | 9/2012 |
| JP | 2012-226877 A | 11/2012 |
| JP | 2013-069566 A | 4/2013 |
| JP | 2013-091581 A | 5/2013 |
| JP | 2014-505992 | 3/2014 |
| JP | 2014-112476 A | 6/2014 |
| JP | 2014-515171 | 6/2014 |
| JP | 5701378 | 4/2015 |
| JP | 2015-143176 A | 8/2015 |
| KR | 2012-0121235 A | 11/2012 |
| TW | 200305299 | 10/2003 |
| TW | 200913355 | 3/2009 |
| TW | 201407868 | 2/2014 |
| WO | WO-2006/028476 | 3/2006 |
| WO | WO-2011/111364 | 9/2011 |
| WO | WO-2012/098970 | 7/2012 |
| WO | WO-2012/112316 | 8/2012 |
| WO | WO-2012/137534 | 10/2012 |
| WO | WO-2013/151110 | 10/2013 |
| WO | WO-2014/115559 | 7/2014 |

OTHER PUBLICATIONS

Written Opinion (Application No. PCT/IB2015/057849) dated Feb. 2, 2016.

Taiwanese Office Action (Application No. 108148204) dated May 5, 2020.

* cited by examiner

[-100] ←

FIG. 16A
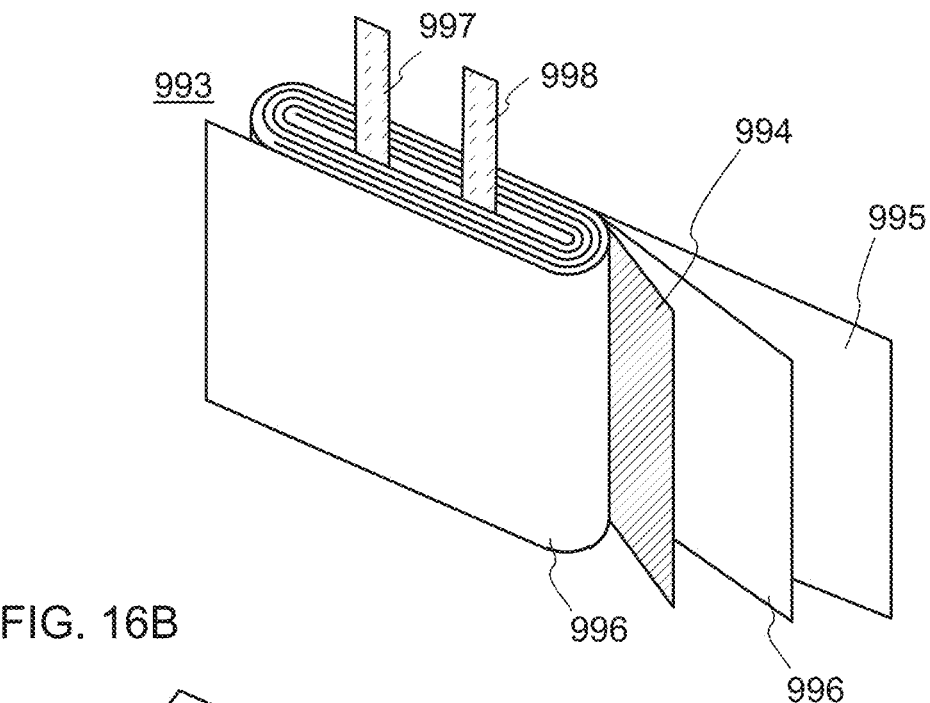
FIG. 16B
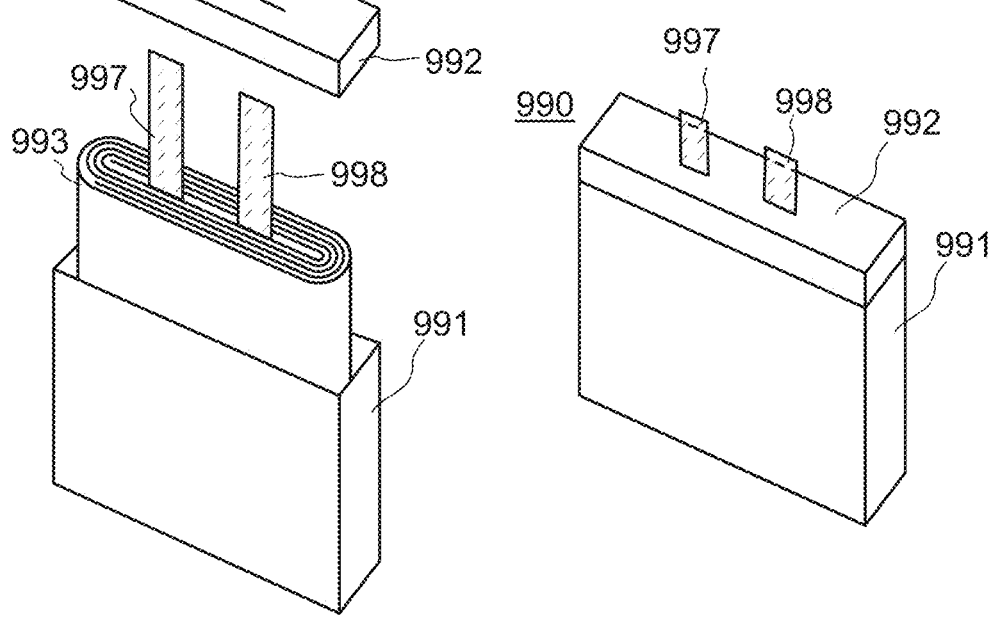
FIG. 16C

FIG. 18A1
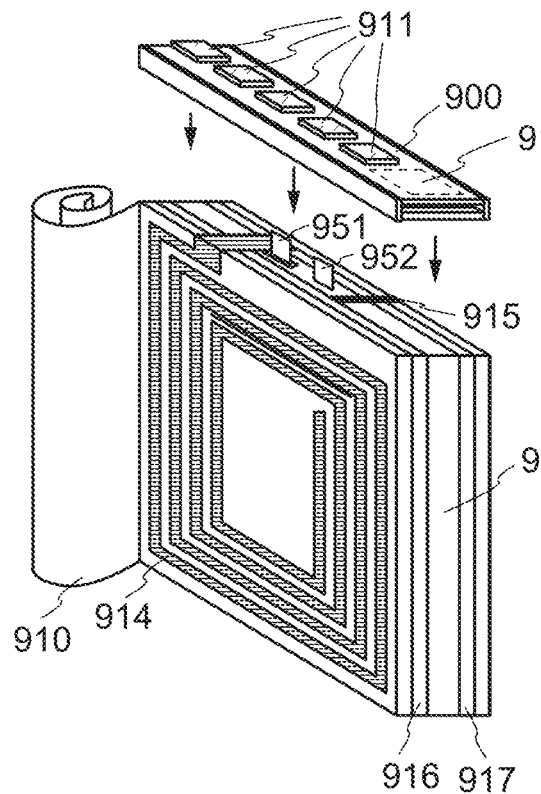
FIG. 18A2
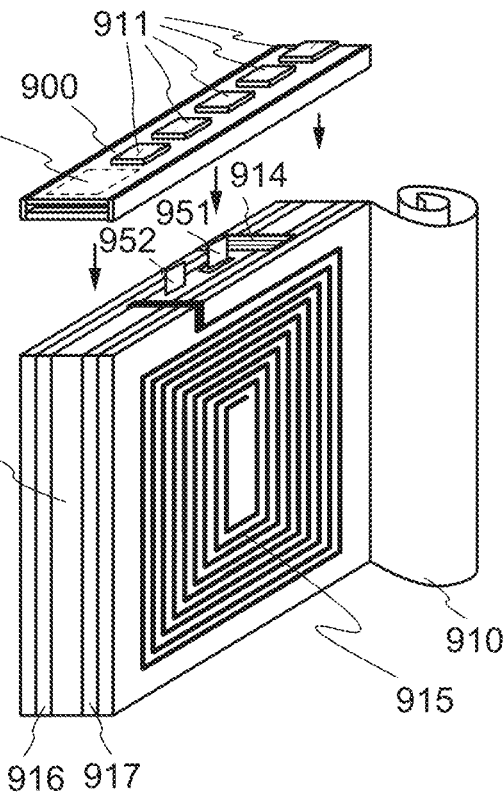
FIG. 18B1
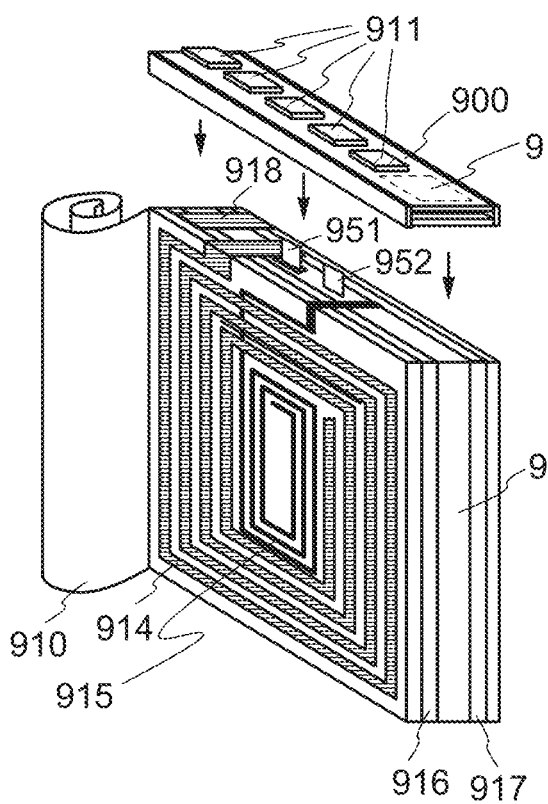
FIG. 18B2
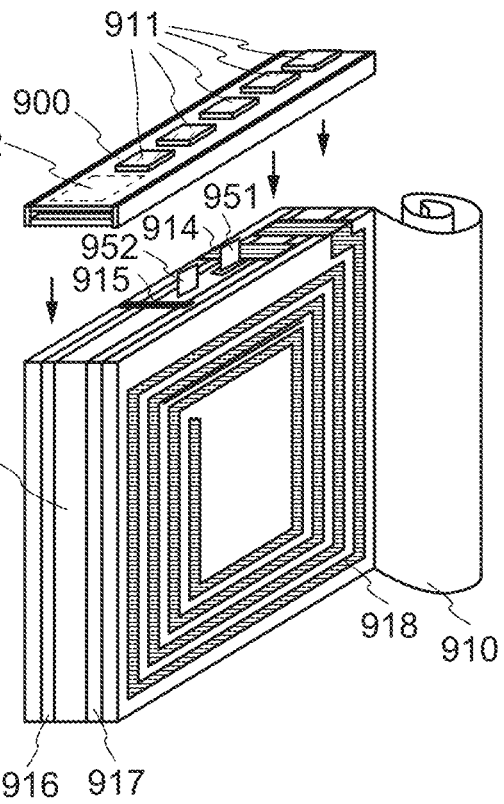

PARTICLE, ELECTRODE, POWER STORAGE DEVICE, ELECTRONIC DEVICE, AND METHOD FOR MANUFACTURING ELECTRODE

TECHNICAL FIELD

The present invention relates to an object, a method, or a manufacturing method. In addition, the present invention relates to a process, a machine, manufacture, or a composition of matter. In particular, one embodiment of the present invention relates to a semiconductor device, a display device, an imaging device, a power storage device, a memory device, a driving method thereof, or a manufacturing method thereof. In particular, one embodiment of the present invention relates to a structure of a power storage device and a method for manufacturing the power storage device. In particular, one embodiment of the present invention relates to a positive electrode active material of a lithium-ion secondary battery.

BACKGROUND ART

In recent years, portable electronic devices such as smartphones and tablets have spread rapidly. Also with growing interest in the environment, hybrid cars and electric cars have attracted attention, thereby increasing the importance of power storage devices typified by secondary batteries. Examples of the secondary battery include a nickel-metal hydride battery, a lead-acid battery, and a lithium-ion secondary battery. In particular, lithium-ion secondary batteries have been actively researched and developed because capacity thereof can be increased and size thereof can be reduced.

The basic structure of a secondary battery includes a positive electrode, a negative electrode, and an electrolyte provided therebetween. Examples of an electrolyte-containing object include a solid electrolyte and an electrolytic solution. Typically, the positive electrode and the negative electrode each include a current collector and an active material layer provided over the current collector. In the case of a lithium-ion secondary battery, a material capable of receiving and releasing lithium ions is used as an active material for a positive electrode and a negative electrode.

As examples of positive electrode active materials of a lithium-ion secondary battery, phosphate compounds disclosed in Patent Document 1, such as lithium iron phosphate ($LiFePO_4$), lithium manganese phosphate ($LiMnPO_4$), lithium cobalt phosphate ($LiCoPO_4$), and lithium nickel phosphate ($LiNiPO_4$), each having an olivine structure and containing lithium (Li) and iron (Fe), manganese (Mn), cobalt (Co), or nickel (Ni) are known.

REFERENCE

Patent Document

[Patent Document 1] Japanese Published Patent Application No. H11-25983

DISCLOSURE OF INVENTION

An object of one embodiment of the present invention is to increase the capacity per volume and/or weight of a power storage device. Another object of one embodiment of the present invention is to increase the capacity per volume and/or weight of an electrode.

Another object of one embodiment of the present invention is to increase the capacity per volume and/or weight of a particle containing a positive electrode active material. Another object of one embodiment of the present invention is to increase the amount of lithium ions per volume and/or weight of a particle containing a positive electrode active material to achieve high energy density.

Another object of one embodiment of the present invention is to cause a battery reaction stably at a high potential in a positive electrode containing a positive electrode active material.

Another object of one embodiment of the present invention is to provide a power storage device in which a decrease in capacity in charge and discharge cycles is prevented. Another object of one embodiment of the present invention is to provide a positive electrode active material that can be manufactured at low cost.

Furthermore, high ionic conductivity and high electrical conductivity are required for a positive electrode active material of a lithium-ion secondary battery. Thus, another object of one embodiment of the present invention is to provide a positive electrode active material having high ionic conductivity and/or high electrical conductivity.

Another object of one embodiment of the present invention is to provide a method for manufacturing an electrode of a power storage device. Another object of one embodiment of the present invention is to provide a method for manufacturing a positive electrode active material of a secondary battery.

Another object of one embodiment of the present invention is to provide a novel material. Another object of one embodiment of the present invention is to provide a novel positive electrode active material. Another object of one embodiment of the present invention is to provide a novel particle containing a positive electrode active material. Another object of one embodiment of the present invention is to provide a novel power storage device. Another object of one embodiment of the present invention is to provide a novel battery. Another object of one embodiment of the present invention is to provide a novel lithium-ion secondary battery.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is the particle containing the lithium-manganese composite oxide.

The particle containing the lithium-manganese composite oxide of one embodiment of the present invention includes the first region and the second region. The particle containing the lithium-manganese composite oxide of one embodiment of the present invention preferably includes the third region.

The second region is in contact with at least a part of a surface of the first region and is located on the outside of the first region. Here, the term "outside" refers to the side closer to a surface of a particle. It is preferable that the third region be in contact with at least a part of a surface of the second region and be located on the outside of the second region.

In the case where the particle of one embodiment of the present invention including the second region is used as a positive electrode active material of a storage battery, the discharge capacity can be increased in some cases. Furthermore, the discharge voltage can be increased in some cases.

In the case where the particle of one embodiment of the present invention including the third region is used as a positive electrode active material of a storage battery, the discharge capacity can be increased in some cases. Furthermore, the discharge voltage can be increased in some cases.

The first region and the second region contain lithium and oxygen. At least one of the first region and the second region contains manganese. At least one of the first region and the second region contains the element M. Here, the element M is preferably silicon, phosphorus, or a metal element other than lithium and manganese, more preferably Si, P, or a metal element selected from Ni, Ga, Fe, Mo, In, Nb, Nd, Co, Sm, Mg, Al, Ti, Cu, and Zn, still more preferably nickel.

More preferably, the first region and the second region contain both manganese and the element M.

The third region preferably includes a surface of a particle containing the lithium-manganese composite oxide of one embodiment of the present invention.

In the case where a power storage device is manufactured using the particle containing the lithium-manganese composite oxide of one embodiment of the present invention, the third region is preferably more stable than the first region and the second region against a battery reaction, e.g., charging and discharging.

The second region may include a crystal structure different from that of the first region. The second region may include a crystal whose orientation is different from that of the first region. Here, "orientation is different" means that an orientation of a crystal is different from that of another crystal by an angle greater than 10°, for example.

It is preferable that the second region have a spinel structure and that the first region have a layered rock-salt structure, for example. In the case where the particle of one embodiment of the present invention including the second region is used as a positive electrode active material of a storage battery, the discharge capacity can be increased in some cases. Furthermore, the discharge voltage can be increased in some cases.

The second region preferably has composition different from that of the first region.

The valence of manganese in the second region may be different from that of manganese in the first region. The valence of the element M in the second region may be different from that of the element M in the first region.

A transition layer may be provided between the second region and the first region. A mixed layer may be provided between the second region and the first region.

One embodiment of the present invention is a particle including a lithium-manganese composite oxide. The particle includes a first region and a second region. The second region is in contact with at least a part of the first region. The first region and the second region contain lithium and oxygen. At least one of the first region and the second region contains manganese. At least one of the first region and the second region contains an element represented by M. The first region contains a first crystal having a layered rock-salt structure. The second region contains a second crystal having a layered rock-salt structure. A {0 0 1} plane of the first crystal is parallel to at least one of a {1 0 0} plane, a {1 3 –1} plane, and a {–1 3 1} plane of the second crystal. Here, "two planes are parallel to each other" means that, for example, an angle formed by normals of the two surfaces is smaller than or equal to 10°, preferably smaller than or equal to 5°, more preferably smaller than or equal to 3°. In addition, "two lines are parallel to each other" means that, for example, an angle formed by the two lines is smaller than or equal to 10° preferably smaller than or equal to 5°, more preferably smaller than or equal to 3°.

One embodiment of the present invention is a particle including a lithium-manganese composite oxide. The particle includes a first region, a second region, and a third region. The second region is in contact with at least a part of the first region. The third region is in contact with at least a part of the second region. The first region and the second region contain lithium and oxygen. At least one of the first region and the second region contains manganese. At least one of the first region and the second region contains an element represented by M. The first region contains a first crystal having a layered rock-salt structure. The second region contains a second crystal having a layered rock-salt structure. The orientation of the first crystal is different from the orientation of the second crystal. The third region preferably contains carbon.

In the above-described structure, a {0 0 1} plane of the first crystal is preferably parallel to at least one of a {1 0 0} plane, a {1 3 –1} plane, and a {–1 3 1} plane of the second crystal.

One embodiment of the present invention is a particle containing a lithium-manganese composite oxide. The particle includes a first region and a second region. The second region is in contact with at least a part of the first region. The first region and the second region contain lithium and oxygen. At least one of the first region and the second region contains manganese. At least one of the first region and the second region contains an element represented by M. The first region contains a first crystal having a layered rock-salt structure. The second region contains a second crystal having a spinel structure.

One embodiment of the present invention is a particle containing a lithium-manganese composite oxide. The particle includes a first region and a second region. The second region is in contact with at least a part of the first region. The first region and the second region contain lithium and oxygen. At least one of the first region and the second region contains manganese. At least one of the first region and the second region contains an element represented by M. The atomic ratio of lithium, manganese, the element M, and oxygen in the first region is represented by a1:b1:c1:d1, the atomic ratio of lithium, manganese, the element M, and oxygen in the second region is represented by a2:b2:c2:d2, d1/(b1+c1) (=A1) is greater than or equal to 2.2, and d2/(b2+c2) (=A2) is less than 2.2. When the particle of one embodiment of the present invention in which A2 is smaller than A1 is used as the positive electrode active material of the storage battery, the second region can have higher stability against charging and discharging than the first region in some cases. When the particle of one embodiment of the present invention is used as the positive electrode active material of the storage battery, the discharge capacity can be increased in some cases. Furthermore, the discharge voltage can be increased in some cases.

In the above-described structure, it is preferable that a third region in contact with at least a part of the second region be provided and that the third region contain carbon.

In the above-described structure, it is preferable that the thickness of the third region be greater than or equal to 0.1 nm and less than or equal to 30 nm.

One embodiment of the present invention is a particle containing a lithium-manganese composite oxide. The particle includes a first region and a second region. The second region is in contact with at least a part of the first region. The first region and the second region contain lithium, manganese, an element represented by M, and oxygen. The atomic ratio of lithium, manganese, the element M, and oxygen in the first region is represented by a1:b1:c1:d1, the atomic ratio of lithium, manganese, the element M, and oxygen in the second region is represented by a2:b2:c2:d2, d1/(b1+c1) is greater than or equal to 2.2, and d2/(b2+c2) is less than 2.2. The first region contains a first crystal having a layered rock-salt structure. The second region contains a second crystal having a layered rock-salt structure. A {0 0 1} plane of the first crystal is parallel to at least one of a {1 0 0} plane, a {1 3 –1} plane, and a {–1 3 1} plane of the second crystal.

In the above-described structure, it is preferable that the second region include a layered region and that the thickness of the layered region be greater than or equal to 0.1 nm and less than or equal to 30 nm.

One embodiment of the present invention is a secondary battery including a positive electrode including the above-described particle. One embodiment of the present invention is an electronic device including the secondary battery.

In the case where the power storage device is manufactured using the particle containing the lithium-manganese composite oxide of one embodiment of the present invention, the amount of lithium in the particle is changed by a battery reaction such as charging and discharging. For example, when charging is performed, lithium is deintercalated as lithium ions and the amount of lithium in the particle is reduced. The reduced amount is changed depending on the depth of charge.

One embodiment of the present invention is a method for manufacturing an electrode layer, including the following steps: mixing a particle, a binder, and a solvent to form a mixture; forming the mixture on at least one surface of a current collector to form a mixed layer; and performing heat treatment on the mixed layer to form an electrode layer. The particle contains lithium, manganese, an element M, and oxygen. The element M is one or more elements selected from chromium, cobalt, aluminum, nickel, iron, magnesium, molybdenum, zinc, indium, gallium, copper, titanium, niobium, silicon, and phosphorus. The electrode layer contains a compound having a bond between at least one element selected from lithium, manganese, the element M, and oxygen and at least one element in the binder. In the above-described structure, it is preferable that the compound contain fluorine and at least one of lithium, manganese, and the element M. It is preferable that the particle contain an oxide containing lithium, manganese, the element M, and oxygen.

One embodiment of the present invention is an electrode layer on a current collector. The electrode layer contains a particle, a binder, and a solvent. The particle contains lithium, manganese, an element Ill, and oxygen. The element M is one or more elements selected from chromium, cobalt, aluminum, nickel, iron, magnesium, molybdenum, zinc, indium, gallium, copper, titanium, niobium, silicon, and phosphorus. The electrode layer contains a compound having a bond between at least one element selected from lithium, manganese, the element Al, and oxygen and at least one element in the hinder. In the above-described structure, it is preferable that the compound contain fluorine and at least one of lithium, manganese, and the element M. It is preferable that the particle contain an oxide containing lithium, manganese, the element M, and oxygen.

In the case where the power storage device is manufactured using the particle containing the lithium-manganese composite oxide of one embodiment of the present invention, the amount of lithium in the particle is changed by a battery reaction such as charging and discharging. For example, when charging is performed, lithium is deintercalated as lithium ions and the amount of lithium in the particle is reduced. The reduced amount is changed depending on the depth of charge.

One embodiment of the present invention can increase the capacity per volume and/or weight of a power storage device. One embodiment of the present invention can increase the capacity per volume and/or weight of an electrode.

One embodiment of the present invention can increase the capacity per volume and/or weight of a particle containing a positive electrode active material. One embodiment of the present invention can increase the amount of lithium ions per volume and/or weight of a particle containing a positive electrode active material to achieve high energy density.

One embodiment of the present invention can cause a battery reaction stably at a high potential in a positive electrode containing a positive electrode active material.

One embodiment of the present invention can provide a power storage device in which a decrease in capacity in charge and discharge cycles is prevented. One embodiment of the present invention can provide a positive electrode active material that can be manufactured at low cost.

Furthermore, high ionic conductivity and high electrical conductivity are required as the properties of a positive electrode active material of a lithium-ion secondary battery. One embodiment of the present invention can provide a positive electrode active material having high ionic conductivity and/or high electrical conductivity.

One embodiment of the present invention can provide a method for manufacturing an electrode of a power storage device. One embodiment of the present invention can provide a method for manufacturing a positive electrode active material of a secondary battery.

One embodiment of the present invention can provide a novel material. One embodiment of the present invention can provide a novel positive electrode active material. One embodiment of the present invention can provide a novel particle containing a positive electrode active material. One embodiment of the present invention can provide a novel power storage device. One embodiment of the present invention can provide a novel battery. One embodiment of the present invention can provide a novel lithium-ion secondary battery.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF DRAWINGS

FIGS. 16A to 16C illustrate examples of power storage devices.

FIGS. 18A1, 18A2, 18B1, and 18B2 illustrate examples of power storage devices.

BEST MODE FOR CARRYING OUT THE INVENTION

Figure 1:
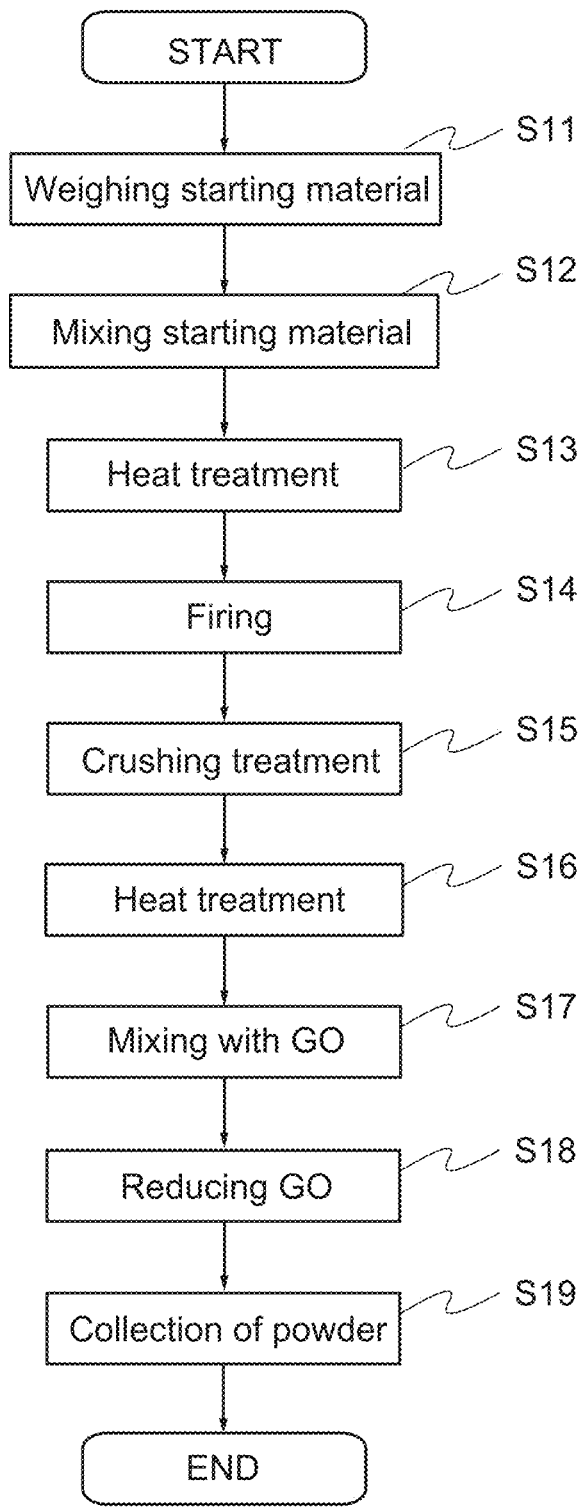
FIG. 1 is a flow chart illustrating a method for forming an active material.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments and the examples. In describing structures of the present invention with reference to the drawings, common reference numerals are used for the same portions in different drawings. Note that the same hatched pattern is applied to similar parts, and the similar parts are not especially denoted by reference numerals in some cases.

Note that the size, the thickness of films (layers), or regions in drawings is sometimes exaggerated for simplicity.

Note that the ordinal numbers such as "first" and "second" in this specification are used for convenience and do not denote the order of steps or the stacking order of layers. Therefore, for example, description can be made even when "first" is replaced with "second" or "third", as appropriate. In addition, the ordinal numbers in this specification and the like are not necessarily the same as those which specify one embodiment of the present invention.

Note that an active material generally refers only to a material that relates to intercalation and deintercalation of ions functioning as carriers; however, an active material described in this specification and the like also includes a layer that covers an "active material" in some cases.

Embodiment 1

In this embodiment, a "particle containing a lithium-manganese composite oxide" of one embodiment of the present invention will be described. Furthermore, an electrode containing the particle will be described.

A lithium-manganese composite oxide of one embodiment of the present invention can be represented by a composition formula $Li_aMn_bM_cO_d$. Here, the element M is preferably silicon, phosphorus, or a metal element other than lithium and manganese. Furthermore, it is preferable to satisfy the following: $0 \le a/(b+c) < 2$; $c > 0$; and $0.26 \le (b+c)/d < 0.5$. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like. The lithium-manganese composite oxide preferably has a layered rock-salt crystal structure. The lithium-manganese composite oxide may have a layered rock-salt crystal structure and a spinel crystal structure. The average diameter of a primary particle of the lithium-manganese composite oxide is preferably greater than or equal to 5 nm and less than or equal to 50 μm, for example.

<Synthesis>

Next, a method for forming the "particle containing the lithium-manganese composite oxide" of one embodiment of the present invention will be described. In this embodiment, the lithium-manganese composite oxide is synthesized first. Then, a coating layer is formed on the lithium-manganese composite oxide, so that a particle including a first region, a second region, and a third region is obtained.

A manganese compound and a lithium compound can be used as raw materials of the lithium-manganese composite oxide. In addition to the manganese compound and the lithium compound, a compound containing at least one selected from chromium, cobalt, aluminum, nickel, iron, magnesium, molybdenum, zinc, indium, gallium, copper, titanium, niobium, silicon, phosphorus, and the like can be used as a raw material. Examples of the manganese compound are manganese dioxide, manganese sesquioxide, trimanganese tetroxide, hydrous manganese oxide, manganese carbonate, and manganese nitrate. Examples of the lithium compound are lithium hydroxide, lithium carbonate, and lithium nitrate.

In this embodiment, $MnCO_3$ (manganese compound), $Li_2CO_3$ (lithium compound), and NiO are used as starting materials.

First, $Li_2CO_3$, $MnCO_3$, and NiO are each weighed as a starting material as shown in Step S11 in FIG. 1.

In the case where $Li_2CO_3$, $MnCO_3$, and NiO are used as starting materials at a ratio for weighing (molar ratio) of 1:0.7:0.3, for example, a lithium-manganese composite oxide $Li_2Mn_{0.7}Ni_{0.3}O_3$ is formed as a final product. In this case, the atomic ratio of Li to (Mn+Ni) in the lithium-manganese composite oxide is 2:1.

In this embodiment, the ratio for weighing (molar ratio) of the starting materials is adjusted so that the atomic ratio of Li to (Mn+Ni) in the lithium-manganese composite oxide becomes slightly different from 2:1.

In this embodiment, the starting materials are weighed so that the ratio for weighing (molar ratio) of $Li_2CO_3$ to $MnCO_3$ and NiO becomes 0.84:0.8062:0.318.

Next, $Li_2CO_3$, $MnCO_3$, and NiO are mixed as shown in Step S12 in FIG. 1. There is no particular limitation on a method for mixing the starting materials, and a known crusher or a known mill such as a ball mill, a bead mill, a jet mill, or a roller mill can be used. A crushing and grinding method may be a dry method or a wet method. There is no particular limitation on a solvent that is used in a wet method, and water, alcohol, or acetone can be used as the solvent, for example.

When the starting materials are mixed by a wet method, heat treatment shown in Step S13 in FIG. 1 for evaporating a solvent contained in the mixed starting materials is performed. The heat treatment is performed at higher than or equal to 50° C. and lower than or equal to 150° C. The solvent contained in the mixed starting materials is evaporated by the heat treatment, whereby a mixed material is obtained.

Then, the mixed material is put in a crucible and firing shown in Step S14 in FIG. 1 is performed at higher than or equal to 800° C. and lower than or equal to 1000° C. The firing is performed for longer than or equal to 5 hours and shorter than or equal to 20 hours in dry air at a flow rate of 10 L/min, for example. The firing atmosphere may be an air atmosphere or an atmosphere containing an oxygen gas. Owing to the firing of the mixed material, a fired object (lithium-manganese composite oxide) is formed.

Figure 2A:
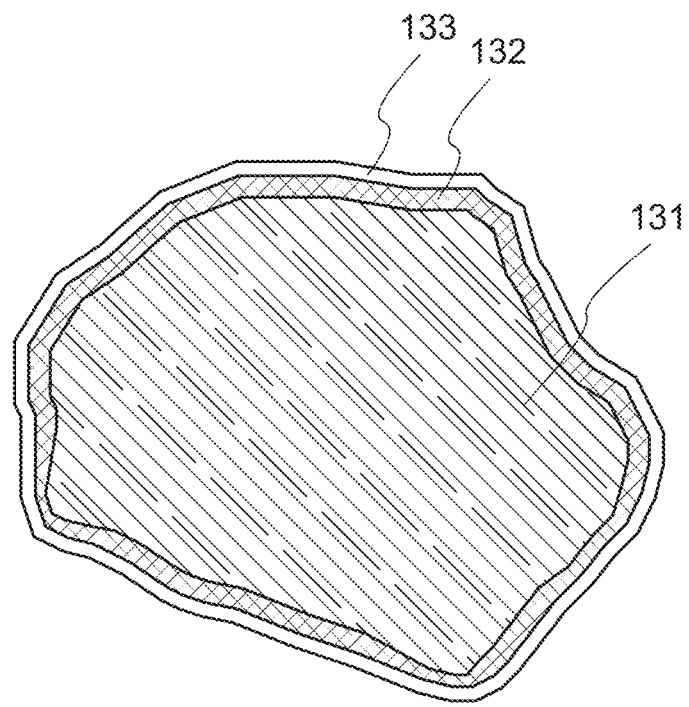
FIGS. 2A and 2B each illustrate a particle of one embodiment of the present invention.

As shown in FIG. 2A, the lithium-manganese composite oxide which is synthesized by firing and in which a plurality of primary particles are sintered is in a state where the plurality of primary particles are sintered and a large secondary particle is formed. Therefore, crushing treatment shown in Step S15 in FIG. 1 is performed on the lithium-manganese composite oxide in which the plurality of primary particles are sintered. By performing the crushing treatment on the fired object, the fired object is crushed into the primary particles or powder as small as the primary particles. The crushing treatment in this specification and the like includes an operation of grinding a sintered object. Note that grinding means further crushing of the primary particles. As in the case of mixing the starting materials, a known crusher or a known mill such as a ball mill or a bead mill can be used for the crushing treatment. A crushing and grinding method may be a dry method or a wet method. There is no particular limitation on a solvent that is used in a wet method, and water, alcohol, or acetone can be used as the solvent, for example.

The size of the particle subjected to crushing and grinding can be evaluated by measuring the specific surface area of the particle, for example. By increasing the specific surface area of the particle containing the lithium-manganese composite oxide, for example, the area of contact between the particle and an electrolyte solution can be increased in the case of manufacturing a storage battery including a positive electrode in which the particle containing the lithium-manganese composite oxide is used. The increase in their contact area can increase the reaction rate of the storage battery and increase the output characteristics, for example.

It is preferable to perform the crushing treatment because the specific surface area of the particle is increased in some cases. The specific surface area of the particle containing the lithium-manganese composite oxide is preferably greater than or equal to $0.1 \text{ m}^2/\text{g}$, for example. If the specific surface area of the particle is too much increased, the amount of binders in the electrode containing the particle with respect to the specific surface area becomes insufficient, and accordingly, the strength of the electrode is reduced in some cases. When the amount of binders is increased in this case, the capacity of the electrode per unit weight and unit volume is reduced in some cases. Therefore, the specific surface area of the particle containing the lithium-manganese composite oxide is preferably greater than or equal to $1 \text{ m}^2/\text{g}$ and less than or equal to $50 \text{ m}^2/\text{g}$, more preferably greater than or equal to $5 \text{ m}^2/\text{g}$ and less than or equal to $30 \text{ m}^2/\text{g}$.

In this embodiment, the crushing treatment of the lithium-manganese composite oxide in which primary particles are sintered is performed with a bead mill by a wet method using acetone.

When the crushing treatment is performed by a wet method, heat treatment for evaporating a solvent is performed after the crushing treatment. The heat treatment may be performed in a manner similar to that of the heat treatment in Step S13. After that, vacuum drying is performed, whereby powdery lithium-manganese composite oxide is obtained.

Next, heat treatment is performed. The heat treatment shown in Step S16 in FIG. 1 is performed in the following manner: the lithium-manganese composite oxides subjected to the crushing treatment are put in a crucible and heated at higher than or equal to 300° C. and lower than or equal to 1000° C., preferably higher than or equal to 600° C. and lower than or equal to 900° C. The heat treatment is performed for longer than or equal to 5 hours and shorter than or equal to 20 hours in dry air at a flow rate of 10 L/min, for example. The atmosphere may be an air atmosphere or an atmosphere containing an oxygen gas.

Through the above steps, the lithium-manganese composite oxide represented by the composition formula $Li_aMn_bM_cO_d$ can be formed. In this embodiment, the raw materials are weighed so that the ratio for weighing (molar ratio) of $Li_2CO_3$ to $MnCO_3$ and NiO becomes 0.84:0.8062:0.318, whereby a lithium-manganese composite oxide represented by a composition formula $Li_{1.68}Mn_{0.8062}M_{0.318}O_3$ can be formed.

The crystallinity of the lithium-manganese composite oxide subjected to the crushing treatment shown in Step S15 might be disordered by the impact of the crushing treatment. In addition, oxygen vacancies might be formed in the lithium-manganese composite oxide. Thus, heat treatment is preferably performed on the powdery lithium-manganese composite oxide subjected to the vacuum drying.

The heat treatment performed on the lithium-manganese composite oxides subjected to the crushing treatment can repair oxygen vacancies and compensate the crystal disorder caused by the crushing treatment. Note that another crushing treatment may be performed on the powdery lithium-manganese composite oxide subjected to the heat treatment, in which case the crushing treatment can be performed in a manner similar to that of the crushing treatment in Step S15 in FIG. 1.

Figure 46:
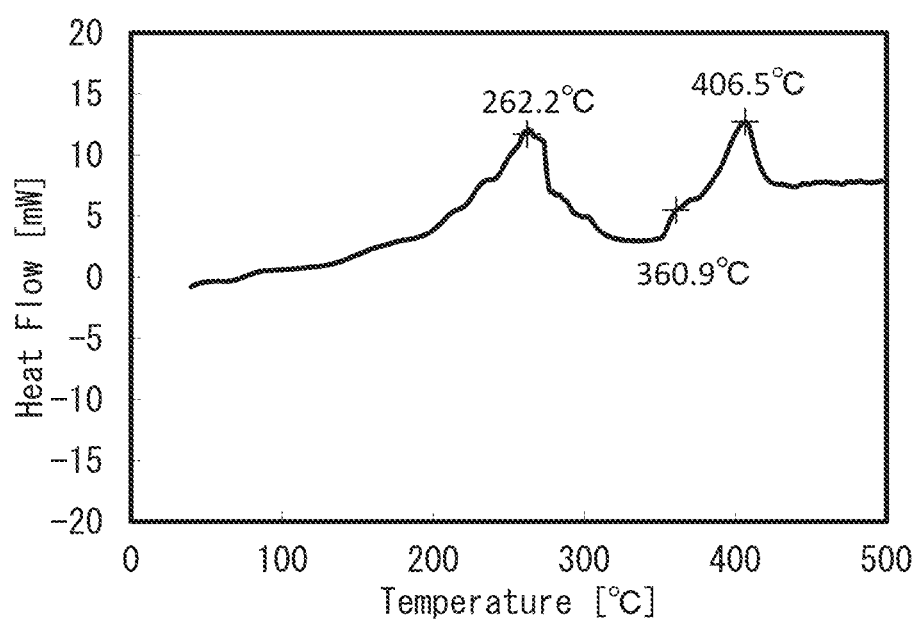
FIG. 46 shows a differential scanning calorimetry curve.
Figure 47A:
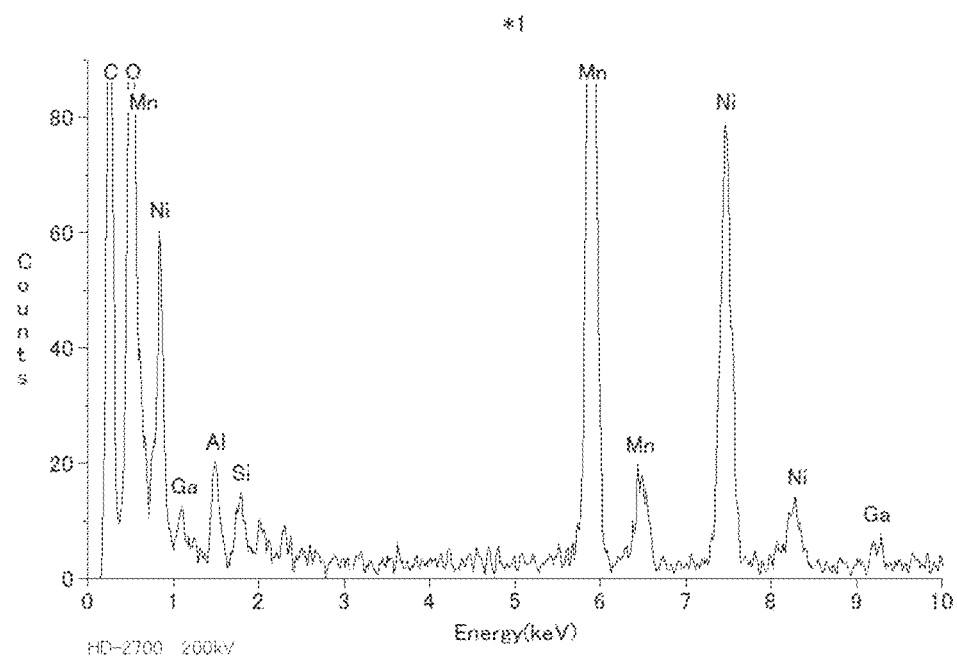
FIGS. 47A and 47B show EDX measurement results.
Figure 47B:
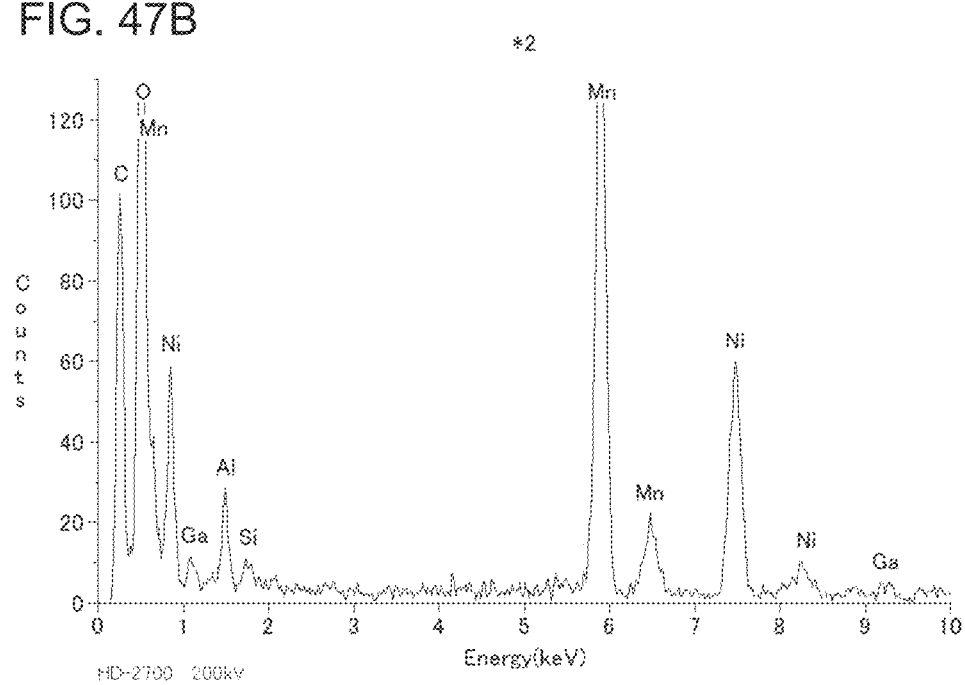
Figure 48A:
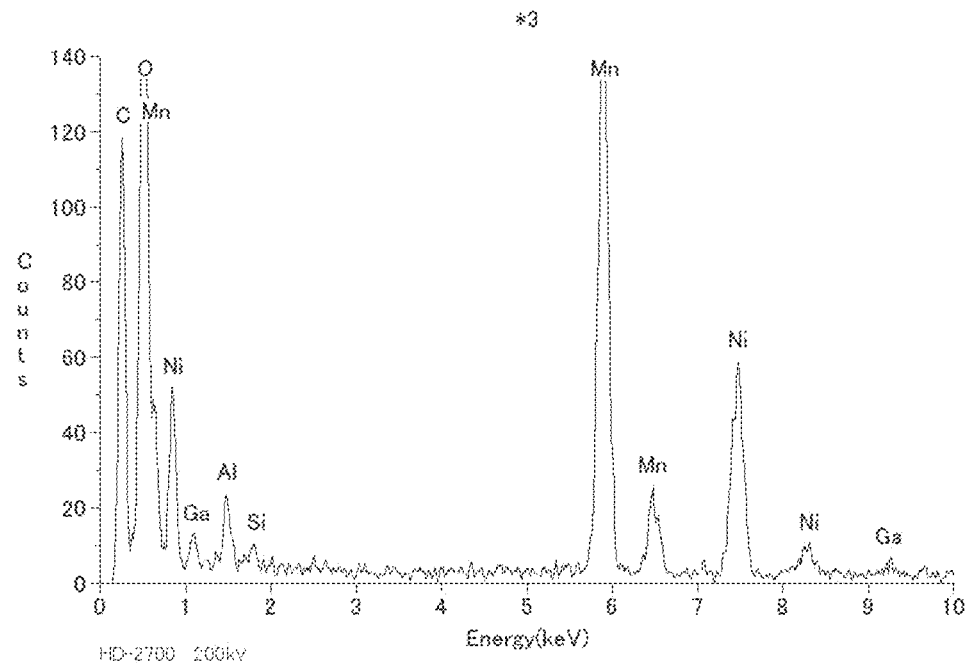
FIGS. 48A and 48B show EDX measurement results.
Figure 48B:
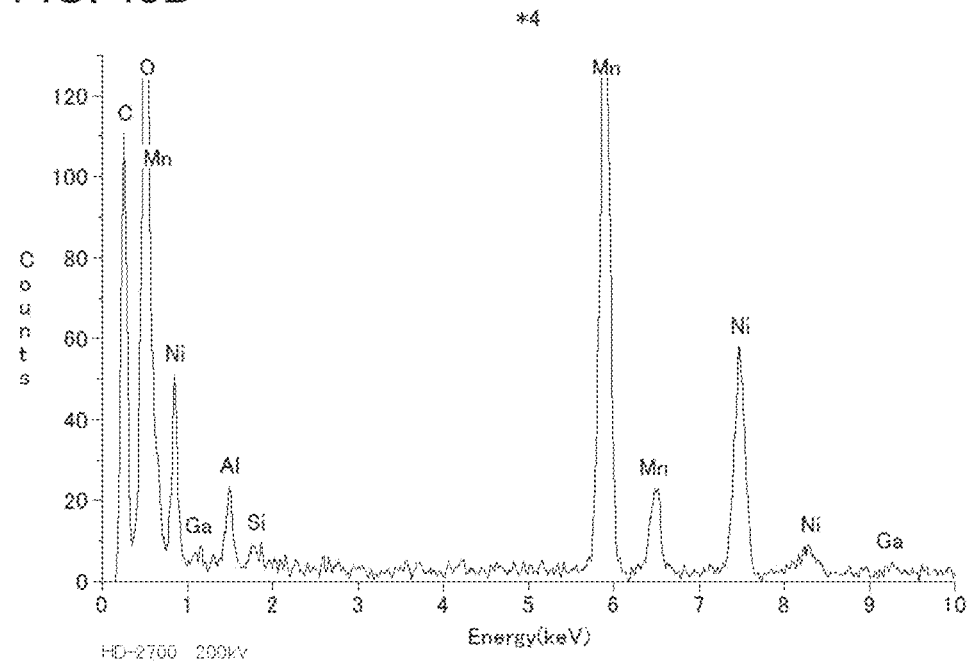
Figure 49A:
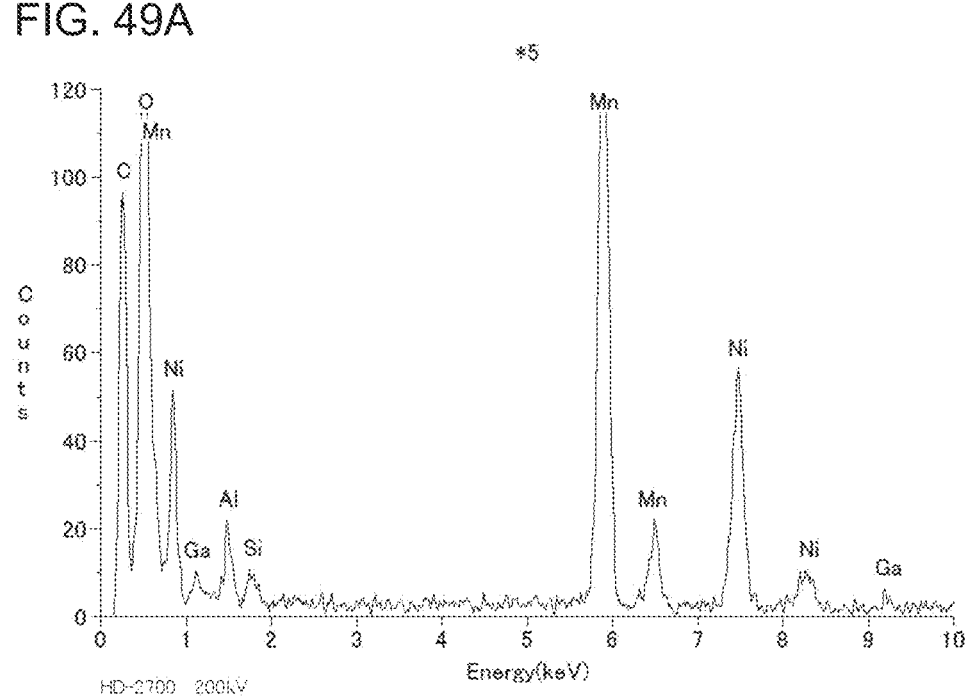
FIGS. 49A and 49B show EDX measurement results.
Figure 49B:
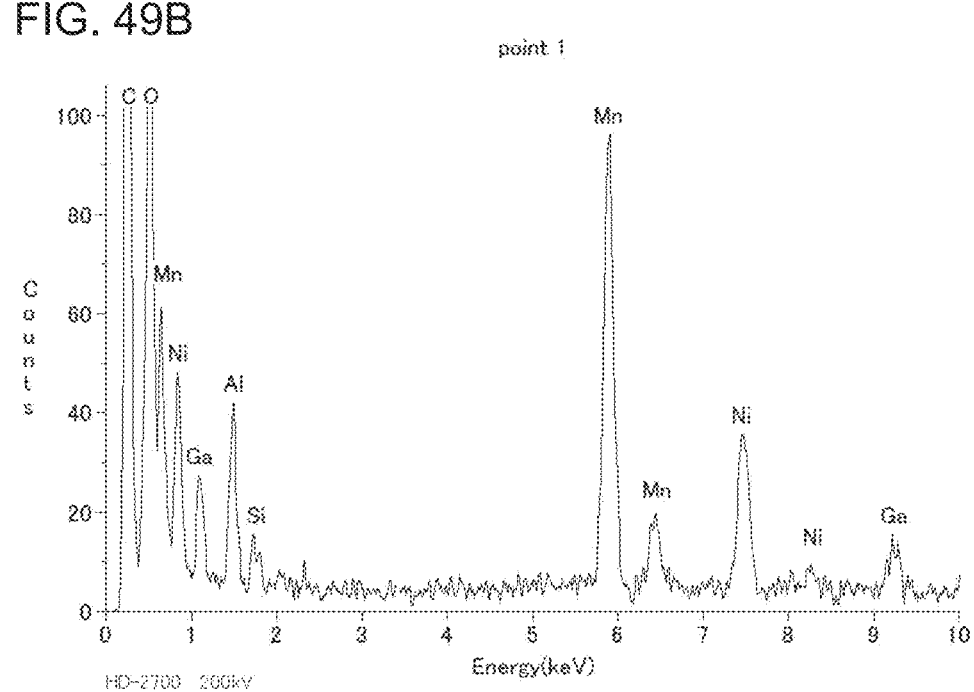
Figure 50A:
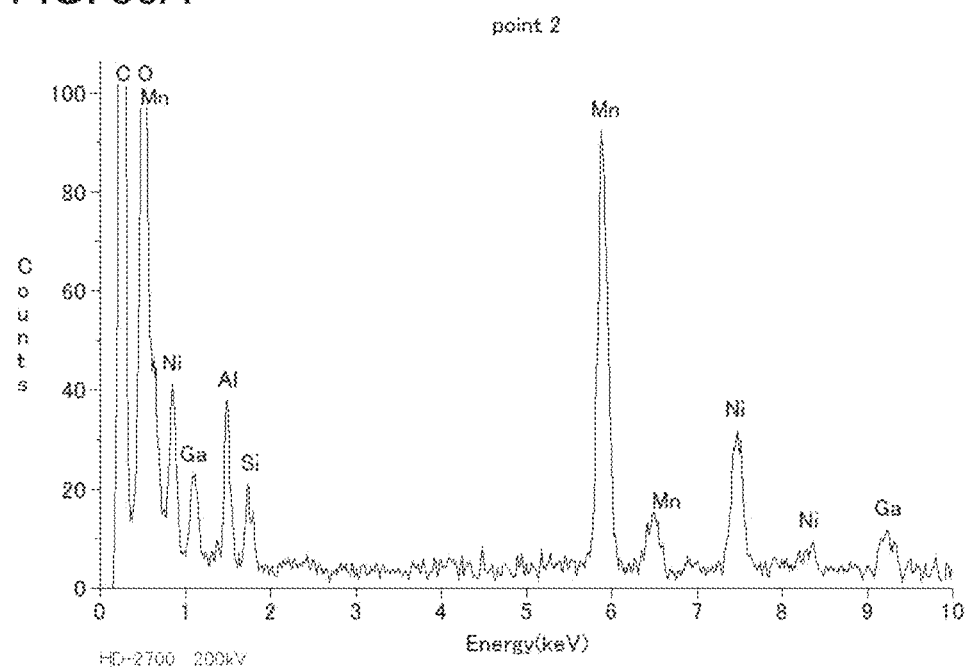
FIGS. 50A and 50B show EDX measurement results.
Figure 50B:
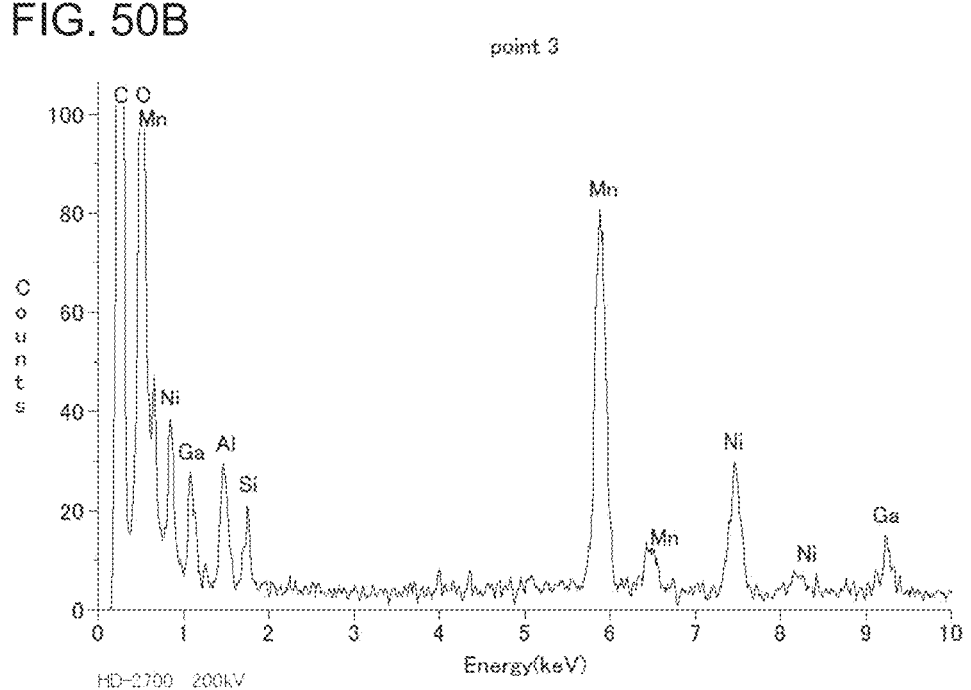
Figure 51A:
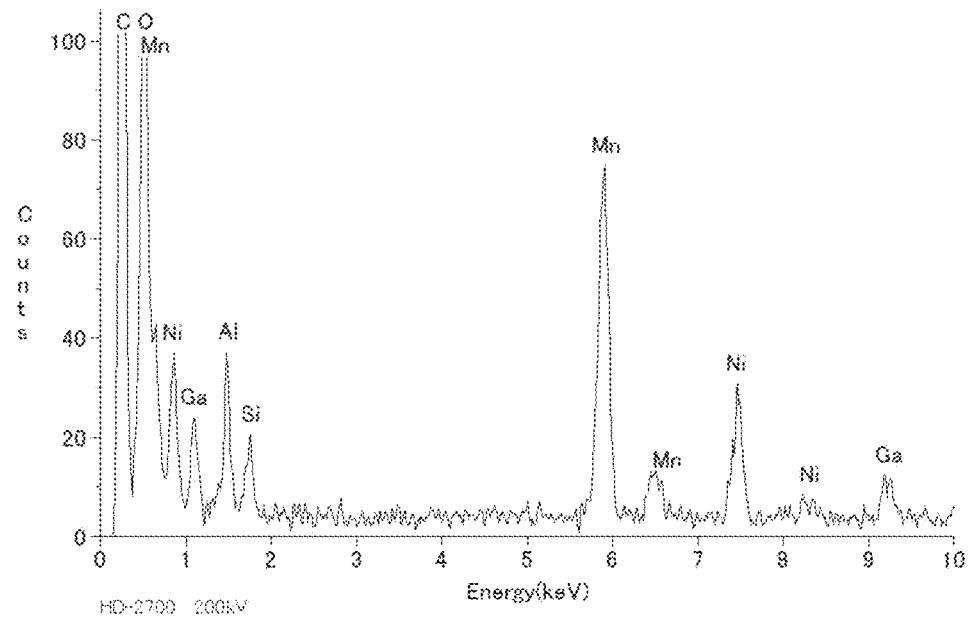
FIGS. 51A and 51B show EDX measurement results.
Figure 51B:
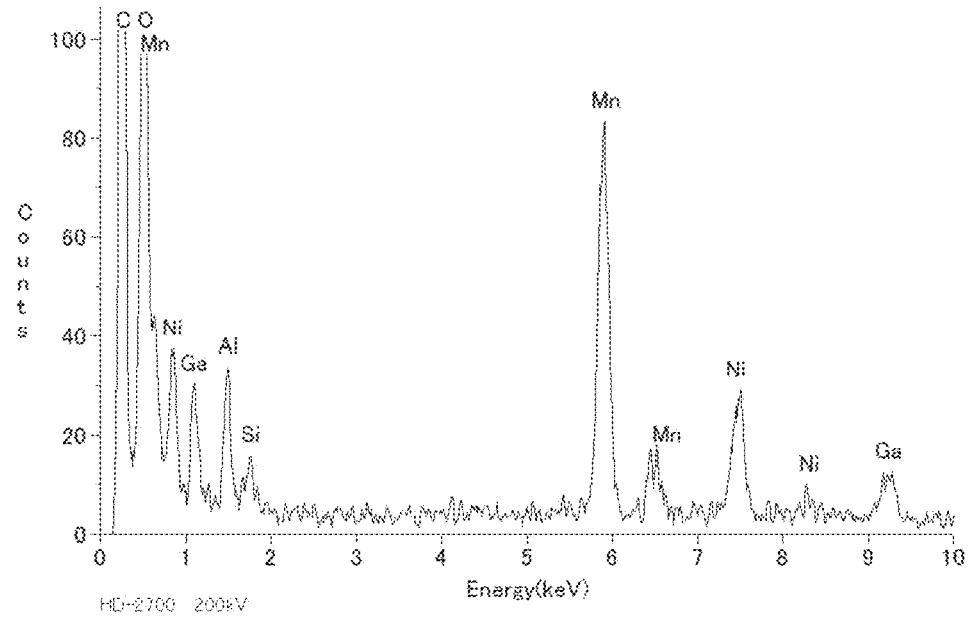

Here, a lithium-manganese composite oxide was formed by Step S11 through Step S16 shown in FIG. 1 using a raw material of $Li_2CO_3$:$MnCO_3$:NiO=0.84:0.8062:0.318, and the temperature stability of the lithium-manganese composite oxide was evaluated. Specifically, the evaluation was performed by differential scanning calorimetry measurement. FIG. 46 shows a differential scanning calorimetry (DSC) curve. In FIG. 46, the vertical axis indicates heat flow, and the horizontal axis indicates temperature. As shown in FIG. 46, a peak indicating heat generation was observed at 262.2° C. At temperatures lower than 262.2° C., the lithium-manganese composite oxide was stable. Thus, it is shown that the lithium-manganese composite oxide of one embodiment of the present invention is stable even at high temperatures, e.g., 260° C. or lower.

The atomic ratio of Li to (Mn+Ni) in the lithium-manganese composite oxide described in this embodiment is slightly different from 2:1. Thus, the electrode containing such a lithium-manganese composite oxide can increase the voltage and the discharge capacity as compared with that containing a lithium-manganese composite oxide whose atomic ratio of Li to (Mn+Ni) is 2:1.

Through the above steps, the lithium-manganese composite oxide in the form of particles can be obtained. Here, the lithium-manganese composite oxide preferably includes the first region and the second region. The second region is in contact with at least a part of an outside of the first region and is located in the outside of the first region. Here, the term "outside" refers to the side closer to a surface of a particle.

The first region and the second region contain lithium and oxygen. At least one of the first region and the second region contains manganese. At least one of the first region and the second region contains the element M. Here, the element M is preferably silicon, phosphorus, or a metal element other than lithium and manganese, more preferably Si, P, or a metal element selected from Ni, Ga, Fe, Mo, In, Nb, Nd, Co, Sm, Mg, Al, Ti, Cu, and Zn, still more preferably nickel.

<Coating Layer>

Next, the coating layer is formed on the obtained lithium-manganese composite oxide. The coating layer preferably contains carbon. Since carbon has high conductivity, the particle coated with carbon in the electrode of the storage battery can reduce the resistance of the electrode, for example. The coating layer may contain a graphene oxide or a graphene oxide subjected to reduction.

The coating layer may contain a metal compound. Examples of the metal include cobalt, aluminum, nickel, iron, manganese, titanium, zinc, lithium, and carbon. The coating layer may contain an oxide of the metal, a fluoride of the metal, or the like as an example of the metal compound.

In this embodiment, a layer containing carbon is provided as the coating layer. It is preferred to use graphene as the layer containing carbon. Graphene has excellent electrical characteristics of high conductivity and excellent physical properties of high flexibility and high mechanical strength.

Note that graphene in this specification includes single-layer graphene or multilayer graphene including two to hundred layers of single-layer graphene. Single-layer graphene refers to a one-atom-thick sheet of carbon molecules having r bonds. Graphene oxide refers to a compound formed by oxidation of such graphene. When graphene oxide is reduced to give graphene, oxygen contained in the graphene oxide is not entirely deintercalated and part of the oxygen remains in graph ene. When graphene contains oxygen, the proportion of oxygen in the graphene, which is measured by XPS (X-ray photoelectron spectroscopy), is higher than or equal to 2 atomic % and lower than or equal to 20 atomic %, preferably higher than or equal to 3 atomic % and lower than or equal to 15 atomic %.

The thickness of the layer containing carbon is preferably greater than or equal to 1 nm and less than or equal to 50 nm.

Next, a method for providing the layer containing carbon on the lithium-manganese composite oxide will be described. In this embodiment, reduced graphene oxide (abbreviated to RGO) obtained by reducing graphene oxide (abbreviated to GO) is used as the layer containing carbon.

Various synthesis methods such as a Hummers method, a modified Hummers method, and oxidation of graphite can be used to form graphene oxide.

For example, in a Hummers method, graphite such as flake graphite is oxidized to give graphite oxide. The obtained graphite oxide is graphite that is oxidized in places and thus to which a functional group such as a carbonyl group, a carboxyl group, or a hydroxyl group is bonded. In the graphite oxide, the crystallinity of the graphite is lost and the distance between layers is increased. Therefore, graphene oxide can be easily obtained by separation of the layers from each other by ultrasonic treatment or the like.

The length of one side (also referred to as a flake size) of the graphene oxide is greater than or equal to 50 nm and less than or equal to 100 μm, preferably greater than or equal to 800 nm and less than or equal to 20 μm. It is preferable that the flake size be as large as possible to cover surfaces of the lithium-manganese composite oxides with ease.

First, graphene oxide and water are put in a mixer to form a dispersion solution of graphene oxide. At this time, graphene oxide at greater than or equal to 0.5 wt % and less than or equal to 5 wt % is preferably used. Graphene oxide at less than 0.5 wt % might be insufficient to cover the surfaces of the lithium-manganese composite oxides, whereas graphene oxide at greater than 5 wt % causes an increase in the volume and weight of the electrode.

Next, the lithium-manganese composite oxides are put in the dispersion solution and kneading is performed as shown in Step S17 in FIG. 1. Note that kneading means mixing something until it has a high viscosity. The kneading can separate aggregation of lithium manganese composite oxide powder; thus, the graphene oxide and the lithium manganese composite oxides can be uniformly dispersed.

Then, the mixture of the graphene oxide and the lithium-manganese composite oxides is dried under a reduced pressure in a bell jar and then is ground in a mortar, so that the lithium manganese composite oxides coated with graphene oxide is obtained.

Subsequently, reduction treatment is performed on the graphene oxide covering the surfaces of the lithium-manganese composite oxides as shown in Step S18 in FIG. 1. The reduction treatment of the graphene oxide may be performed by heat treatment or by causing a reaction in a solvent containing a reducing agent. In this embodiment, the graphene oxide is made to react in a solvent containing a reducing agent.

When the graphene oxide is made to react in the solvent containing the reducing agent, the graphene oxide covering the surfaces of the lithium-manganese composite oxides is reduced to give graphene. Note that oxygen in graphene oxide is not necessarily entirely deintercalated and may remain partly in the graphene. In the case where graphene contains oxygen, the proportion of oxygen in the graphene, which is measured by XPS, is higher than or equal to 2 atomic % and lower than or equal to 20 atomic %, preferably higher than or equal to 3 atomic % and lower than or equal to 15 atomic %. This reduction treatment is preferably performed at temperatures of room temperature to 150° C., more preferably at temperatures of room temperature to 80° C. The reduction treatment with heating can promote the reduction reaction. The reduction time of the graphene oxide can be longer than or equal to 3 minutes and shorter than or equal to 10 hours.

Examples of the reducing agent include ascorbic acid, hydrazine, dimethyl hydrazine, hydroquinone, sodium boron hydride ($NaBH_4$), tetra butyl ammonium bromide (TBAB), lithium aluminum hydride ($LiAlH_4$), N,N-diethylhydroxylamine, and a derivative thereof. For example, ascorbic acid and hydroquinone are preferable to hydrazine and sodium tetrahydroborate in that they are safe owing to low reducing ability and utilized industrially with ease.

A polar solvent can be used as the solvent. Any material can be used for the solvent as long as it can dissolve the reducing agent. Examples of the material of the solvent include water, methanol, ethanol, acetone, tetrahydrofuran (THF), dimethylformamide (DMF), 1-methyl-2-pyrrolidone (NMP), dimethyl sulfoxide (DMSO), ethylene glycol, diethylene glycol, glycerin, and a mixed solution of any two or more of the above.

As the reducing solution containing a reducing agent and a solvent, a liquid in which ethanol and ascorbic acid are mixed, or a liquid in which water, ascorbic acid, and lithium hydroxide are mixed can be used. In this embodiment, a reducing solution containing ascorbic acid, water, and lithium hydroxide is used.

When the graphene oxide covering the lithium-manganese composite oxide is made to react in the reducing solution, protons of ascorbic acid are added to the graphene oxide and then $H_2O$ is released, whereby the graphene oxide is reduced.

After the reduction treatment, collection of powder is performed as shown in Step S19 in FIG. 1. In this step, the reducing solution is filtered. A substance obtained in this step is referred to as a substance A. The filtration can be suction filtration or the like. Alternatively, the substance A and a liquid may be separated from each other by centrifugation.

Next, the obtained substance A is washed. The washing is preferably performed using a solvent given as the solvent contained in the reducing solution. The solvent may be the same as or different from the solvent contained in the reducing solution.

Next, drying is performed. The drying step is performed, for example, at a temperature higher than or equal to 50° C. and lower than 500° C., preferably higher than or equal to 120° C. and lower than or equal to 400° C. for 1 hour to 48 hours. The drying allows evaporation or removal of the polar solvent and moisture. The drying step can also facilitate the reduction of graphene oxide. The drying may be performed under a reduced pressure (in vacuum), in a reduction atmosphere, or under an atmospheric pressure. As an atmosphere for the drying, air or an inert gas such as nitrogen may be used.

Here, in the case where the substance A is a particle, the particle preferably forms a secondary particle.

In the case where the substance A forms a secondary particle, the average value of the particle diameters of secondary particles is preferably less than or equal to 50 μm, more preferably less than or equal to 30 μm, still more preferably greater than or equal to 1 μm and less than or equal to 20 μm. The particle diameter refers to, for example, a particle diameter measured with a particle size analyzer. The particle diameter may refer to a particle diameter of the secondary particle of the substance A. The particle diameter of the secondary particle can also be obtained by observation of the particle with a microscope, for example, as well as measurement with a particle size analyzer. Alternatively, the diameter of a particle can be obtained by calculating a diameter of a circle whose area is equal to the area of the cross section of the particle.

Note that another method may be used in which, after the substance A is washed, a liquid is formed by dissolving the substance A in a solvent, and the solution is subjected to spray dry treatment and dried, for example. By the spray dry treatment, the substance A forms a secondary particle, for example, so that a particle diameter is changed in some cases.

Heat treatment is preferably performed after the spray dry treatment. For example, the heat treatment is performed at a temperature higher than or equal to 50° C. and lower than 500° C., preferably higher than or equal to 120° C. and lower than or equal to 400° C. for 1 hour to 48 hours. The heat treatment allows evaporation or removal of the polar solvent and moisture. The heat treatment can also facilitate the reduction of graphene oxide. The heat treatment may be performed under a reduced pressure (in vacuum) or under an atmospheric pressure.

Alternatively, the heat treatment may be performed in a reduction atmosphere. As an atmosphere for the heating, air or an inert gas such as nitrogen may be used.

Through the above steps, the graphene oxide is reduced, so that graphene can be formed on the surface of the lithium-manganese composite oxides.

Note that oxygen in graphene oxide is not necessarily entirely deintercalated and may remain partly in the graphene. When graphene contains oxygen, the proportion of oxygen in the graphene, which is measured by XPS, is higher than or equal to 2 atomic % and lower than or equal to 20 atomic %, preferably higher than or equal to 3 atomic % and lower than or equal to 15 atomic %.

In some cases, the heat treatment after the reduction treatment can increase electrical conductivity of graphene as compared to that before the heat treatment.

By performing the heat treatment after the reduction treatment, the first region to the third region are formed in the "particle containing the lithium-manganese composite oxide" of one embodiment of the present invention, for example, in some cases. The first region to the third region in the "particle containing the lithium-manganese composite oxide" may be formed before the heat treatment or in the heat treatment. The thickness, the composition, the crystal structure, and the like of the first region to the third region which are formed, for example, before the formation of the coating layer, after the formation of the coating layer, and after the reduction treatment may be changed in the heat treatment.

Furthermore, by the heat treatment, an element included in the binder reacts with a particle containing the lithium-manganese composite oxide in some cases. For example, in the case where PVdF is used as the binder, fluorine contained in PVdF and one or more of lithium, manganese, and the element M of the particle containing the lithium-manganese composite oxide may form metal fluoride.

An element contained in the coating layer of the lithium-manganese composite oxide, e.g., the layer containing carbon, and fluorine may form a bond. In the case where the coating layer is the layer containing carbon, carbon fluoride may be formed. Here, the coating layer may include the third region included in the "particle containing the lithium-manganese composite oxide" or include the third region and a part of the first region or the second region. The second region included in the "particle containing the lithium-manganese composite oxide" may include a part of the coating layer, for example.

Through the above steps, a particle in which graphene is provided on at least part of a surface of the lithium-manganese composite oxide can be formed.

Graphene has excellent electrical characteristics of high conductivity and excellent physical properties of high flexibility and high mechanical strength. Therefore, the use of the electrode containing the particle in a battery can improve the electrical conductivity and physical properties of the electrode, for example.

Through the above steps, the particle of one embodiment of the present invention can be obtained. The particle of one embodiment of the present invention contains the lithium-manganese composite oxide. The particle of one embodiment of the present invention preferably includes the first region to the third region.

One embodiment of the present invention is the particle containing the lithium-manganese composite oxide.

The particle containing the lithium-manganese composite oxide of one embodiment of the present invention includes the first region and the second region. The particle containing the lithium-manganese composite oxide of one embodiment of the present invention preferably includes the third region.

The second region is in contact with at least a part of a surface of the first region and is located in the outside of the first region. Here, the term "outside" refers to the side closer to a surface of a particle. The third region is preferably in contact with at least a part of a surface of the second region and is located in the outside of the second region.

In the case where the second region includes a layered region, the thickness of the layered region is preferably greater than or equal to 0.1 nm and less than or equal to 30 nm, more preferably greater than or equal to 1 nm and less than or equal to 15 nm.

The first region and the second region contain lithium and oxygen. At least one of the first region and the second region contains manganese. At least one of the first region and the second region contains the element M.

More preferably, the first region and the second region contain both manganese and the element M.

The third region preferably includes a surface of a particle containing the lithium-manganese composite oxide of one embodiment of the present invention.

In the case where the third region includes a layered region, the thickness of the layered region is preferably greater than or equal to 0.1 nm and less than or equal to 30 nm, more preferably greater than or equal to 1 nm and less than or equal to 20 nm, much more preferably greater than or equal to 2 nm and less than or equal to 10 nm.

FIG. 2A shows an example in which a particle includes a region 131 as the first region, a region 132 as the second region, and a region 133 as the third region.

As shown in FIG. 2A, at least a part of the region 132 is in contact with a surface of the region 131. At least a part of the region 133 is in contact with a surface of the region 132.

Figure 2B:
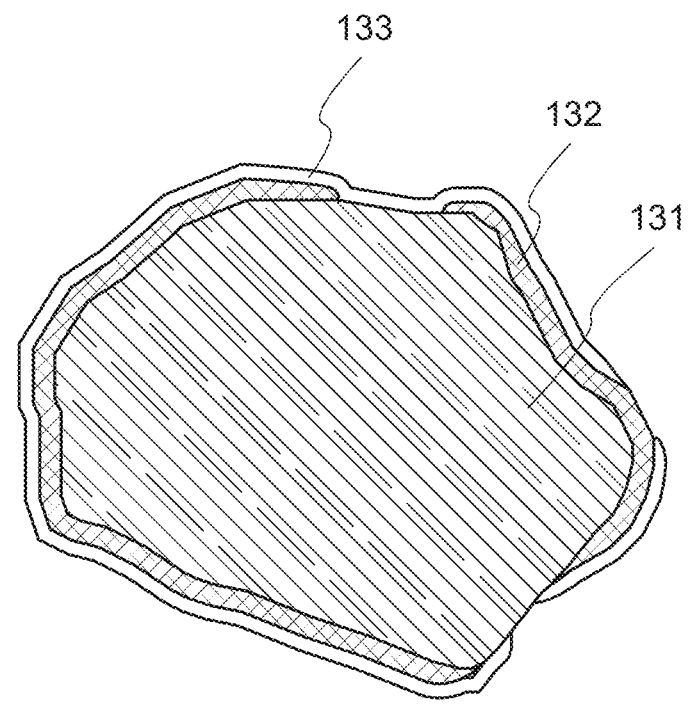

As shown in FIG. 2B, the region 131 may include a region not covered with the region 132. The region 132 may include a region not covered with the region 133. For example, the region 131 may include a region in contact with the region 133. The region 131 may include a region covered with neither the region 132 nor the region 133.

In the case where a power storage device is manufactured using the particle containing the lithium-manganese composite oxide of one embodiment of the present invention, the third region is preferably more stable than the first region and the second region against a battery reaction, e.g., charging and discharging.

The second region may include a crystal structure different from that of the first region. The second region may include a crystal whose orientation is different from that of the first region.

It is preferable that the second region have a spinel structure and that the first region have a layered rock-salt structure, for example.

Alternatively, it is preferable that the first region and the second region have a layered rock-salt structure and that a first plane of a crystal included in the first region be parallel to a second plane of a crystal included in the second region, for example.

Here, in the case where the first plane is a {0 0 1} plane of the layered rock-salt structure, the {0 0 1} plane of the layered rock-salt structure is preferably parallel to at least one of a {1 0 0} plane, a {1 3 –1} plane, and a {–1 3 1} plane of a crystal included in the second region. Alternatively, in the case where the first plane is a {1 0 0} plane of the layered rock-salt structure, the {1 0 0} plane of the layered rock-salt structure is preferably at least parallel to at least one of a {0 0 1} plane, a {1 3 –1} plane, and a {–1 3 1} plane of a crystal included in the second region. Alternatively, in the case where the first plane is a {1 3 –1} plane of the layered rock-salt structure, the {1 3 –1} plane of the layered rock-salt structure is preferably parallel to at least one of a {0 0 1} plane, a {1 0 0} plane, and a {–1 3 1} plane of a crystal included in the second region. Alternatively, in the case where the first plane is a {–1 3 1} plane of the layered rock-salt structure, the {—1 3 1} plane of the layered rock-salt structure is preferably parallel to at least one of a {0 0 1} plane, a {1 0 0} plane, and a {1 3 –1} plane of a crystal included in the second region.

It is preferable that the first region and the second region have a layered rock-salt structure and that a first orientation of the crystal included in the first region be parallel to a second orientation of the crystal included in the second region, for example. Crystal orientations of the crystal included in the first region and the crystal included in the second region will be described.

Here, a first group includes three crystal orientations of {1 0 0}, {1 1 0}, and {−1 1 0}, a second group includes {0 0 1}, {0 1 1}, and {0 1 −1}, a third group includes {−3 2 3}, {3 1 6}, and {6 −1 3}, and a fourth group includes {3 2 −3}, {3 −1 6}, and {6 1 3}.

The crystal included in the first region has an orientation selected from the orientations in one of the first group to the fourth group. The crystal included in the second region has an orientation selected from the orientations in one of three groups other than the group from which the orientation of the crystal included in the first region is selected.

A specific combination example will be described below. Description will be made on the (0 0 1) plane and the (1 0 0) plane. In the following description, indices are written using notation in which the symmetry of a crystal is not taken into consideration in order to be written specifically.

Figure 3:
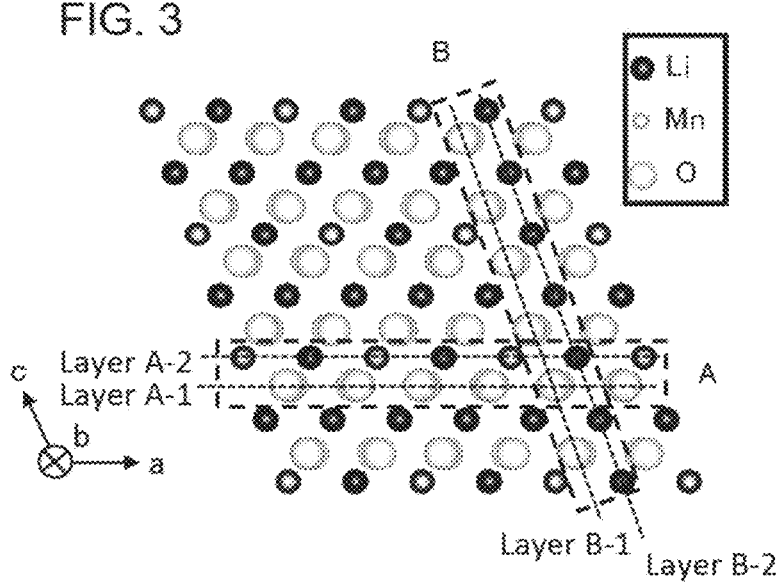
FIG. 3 illustrates a crystal structure.
Figure 4A:
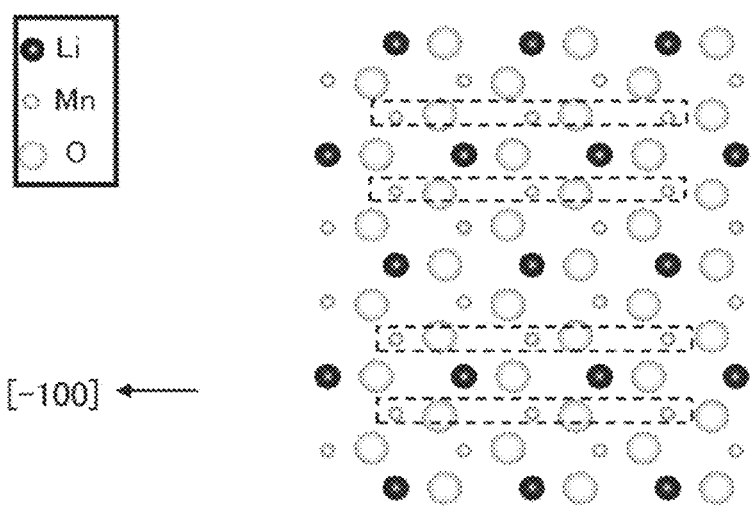
FIGS. 4A and 4B each illustrate a crystal structure.

FIG. 3 shows a crystal structure of $Li_2MnO_3$ seen in the negative direction of a b-axis. FIG. 4A shows a layer A-1 and a layer A-2 in a region surrounded by the dashed line A shown in FIG. 3. In FIG. 4A, the layer A-1 and the layer A-2 are observed from the layer A-2 side in a direction perpendicular to the layer A-1 and the layer A-2. The layer A-1 contains oxygen, and the layer A-2 contains lithium and manganese.

Figure 4B:
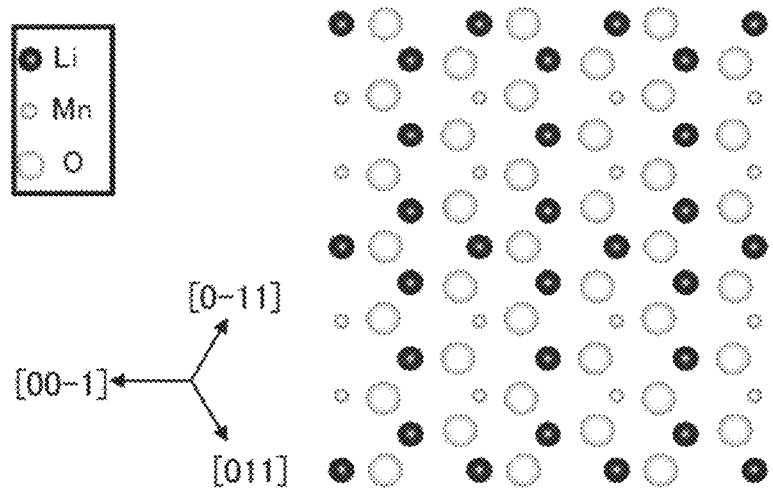

FIG. 4B shows a layer B-1 and a layer B-2 in a region surrounded by the dashed line B shown in FIG. 3. In FIG. 4B, the layer B-1 and the layer B-2 are observed from the layer B-2 side in a direction perpendicular to the layer B-1 and the layer B-2.

In FIG. 4A, lithium or manganese is stacked over an oxygen atom and is shifted in a [110] direction, a [−100] direction, or a [1−10] direction. Similarly, in FIG. 4B, lithium or manganese is stacked over a hexagonal structure formed by oxygen and is shifted in a [0−11] direction, a [00−1] direction, or a [011] direction. When manganese is changed to lithium in a region surrounded by the dashed line in FIG. 4A, a structure similar to that of FIG. 4B is obtained. That is, the positions of metal atoms in FIGS. 4A and 4B are approximately the same, though the kinds of the metal atoms are different. Thus, it is probable that the two structures have many common parts and are therefore compatible with each other when stacked.

The second region preferably has composition different from that of the first region.

For example, the case is described where the first region contains lithium, manganese, the element M, and oxygen; the second region contains lithium, manganese, the element M, and oxygen; the atomic ratio of lithium, manganese, the element M, and oxygen in the first region is represented by a1:b1:c1:d1; and the atomic ratio of lithium, manganese, the element M, and oxygen in the second region is represented by a2:b2:c2:d2. Here, d1/(b1+c1) is preferably greater than or equal to 2.2, more preferably greater than or equal to 2.3, much more preferably greater than or equal to 2.35 and less than or equal to 3. Furthermore, d2/(b2+c2) is preferably less than 2.2, more preferably less than 2.1, much more preferably greater than or equal to 1.1 and less than or equal to 1.9.

The valence of manganese in the second region may be different from that of manganese in the first region. The valence of the element M in the second region may be different from that of the element M in the first region.

Here, in the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the second region and the first region. Here, the transition layer is a region where composition is changed continuously or gradually, a region where a crystal structure is changed continuously or gradually, or a region where the lattice constant of a crystal is changed continuously or gradually.

A mixed layer may be provided between the second region and the first region. The mixed layer is a layer in which, for example, two or more crystals having different crystal orientations are mixed, two or more crystals having different crystal structures are mixed, or two or more crystals having different compositions are mixed.

Here, the first region preferably has a layered rock-salt structure, and the second region preferably has at least one of a spinel structure and a layered rock-salt structure.

In the case where a storage battery or the like is manufactured using the "particle containing the lithium-manganese composite oxide" of one embodiment of the present invention, the first region to the third region may be formed in any of the steps before the completion of the storage battery.

For example, the first region to the third region may be formed before the formation of the electrode, e.g., after the synthesis of the particle. Alternatively, the first region to the third region may be formed in forming the electrode. The thickness, the composition, the crystal structure, and the like of the first region to the third region which are formed after the synthesis of the particle, for example, may be changed in the formation of the electrode.

The first region to the third region may be formed in heat treatment in any of steps in a process for manufacturing the storage battery or the like.

In a process for forming the lithium-manganese composite oxide, a crushing step of the lithium-manganese composite oxide (Step S15, for example) in which primary particles are sintered is important because the step influences the characteristics of a battery. In the crushing step, a shear (grinding stress) is applied to the lithium-manganese composite oxide in which the primary particles are sintered, whereby a powdery lithium-manganese composite oxide is formed. In the case where the lithium-manganese composite oxide has a layered rock-salt crystal structure, a primary particle might be cleaved and cracked along a plane parallel or perpendicular to the layer at this time. The cleaved and cracked primary particle is called a particle having a cleavage plane or a particle with a cleavage plane exposed, in this specification and the like. Note that some cracked primary particles do not have a cleavage plane.

In the case where a particle having a cleavage property, such as the lithium-manganese composite oxide having a layered rock-salt crystal structure, is used as the active material, the active material might be cracked not only in the crushing step but also in a formation process of an electrode because a pressure is applied to an active material layer when the electrode is pressurized.

When a wound battery is formed, a great stress is caused at the time of winding an electrode. Even when a wound body of the electrode is stored in a housing, the active material might be further cracked because an outward stress from an axis of winding is caused all the time.

Such cleavage and cracking of the primary particle of the lithium-manganese composite oxide as the active material cause a decrease in the discharge capacity and cycle characteristics of a battery.

Also in the above-described case, a layer containing carbon is preferably formed on a cleavage plane of the lithium-manganese composite oxide. The layer containing carbon may cover the entire cleavage plane or the whole lithium-manganese composite oxide having a cleavage plane. Here, "cleavage plane" includes a plane exposed by cleavage, for example.

In one embodiment of the present invention, graphene is formed so as to cover the lithium-manganese composite oxide. The graphene may be formed on either the whole or the part of the surface of the lithium-manganese composite oxide. The graphene is preferably formed so as to cover an exposed cleavage plane of a particle. The position of the graphene is not limited in particular as long as the graphene is formed on at least the part of a cleavage plane of the lithium-manganese composite oxide. When the active material in which at least part of the cleavage plane is covered with graphene is used for an electrode, a decrease in the voltage and discharge capacity of a battery can be prevented. Accordingly, the charge-discharge cycle characteristics of the battery can be improved.

Graphene has excellent physical properties of high flexibility and high mechanical strength. For this reason, in a battery including an electrode containing the active material, the lithium-manganese composite oxide can be prevented from being further cleaved and cracked because of the volume change even when the lithium-manganese composite oxide repeats expansion and contraction accompanied by repeated charge and discharge of the battery.

In addition, pressure applied to the lithium-manganese composite oxides, which is due to pressure applied to the electrode in a formation process of the electrode, can be alleviated owing to the mechanical strength of graphene. This can prevent the lithium-manganese composite oxides from being further cleaved and cracked.

Moreover, even when a great stress is caused at the time of winding an electrode of a wound battery or even when an outward stress from an axis of winding is applied to the electrode all the time in the case where a wound body of the electrode is stored in a housing, the lithium-manganese composite oxides can be prevented from being further cleaved and cracked by the stress.

<Structure of Electrode>

Next, an electrode using the particle of one embodiment of the present invention is described.

Figure 5A:
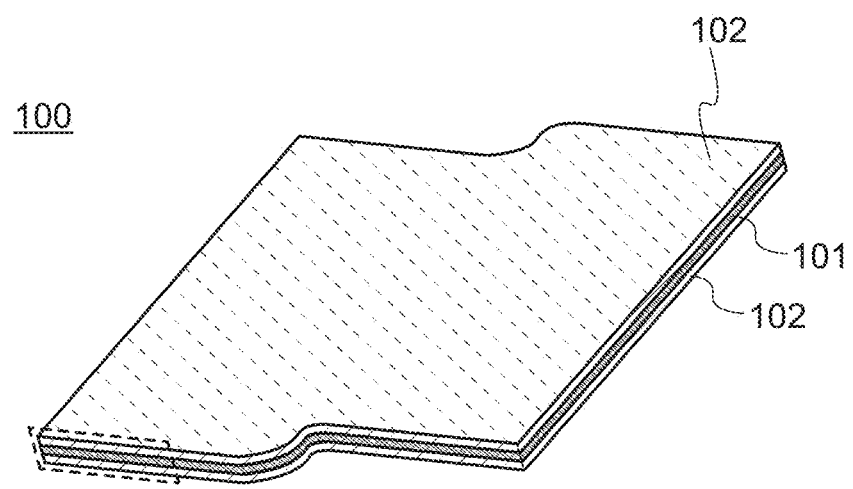
FIGS. 5A and 5B are schematic diagrams illustrating an electrode.
Figure 5B:
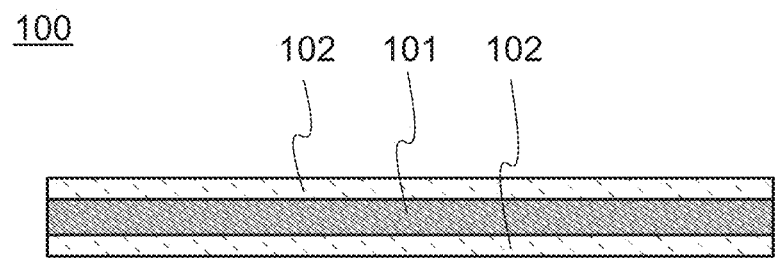

FIG. 5A is an overhead view of an electrode 100, and FIG. 5B is a cross-sectional view of a portion surrounded by a broken line in FIG. 5A. The electrode 100 has a structure in which an active material layer 102 is provided over a current collector 101. Although the active material layers 102 are provided such that the current collector 101 is sandwiched therebetween in FIG. 5A, the active material layer 102 may be formed over only one surface of the current collector 101.

There is no particular limitation on the current collector 101 as long as it has high conductivity without causing a significant chemical change in a power storage device. For example, the current collector 101 can be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like can be used to form the current collector 101. Alternatively, the current collector 101 can be formed using an aluminum alloy to which an element that improves heat resistance, such as silicon, neodymium, scandium, or molybdenum, is added. Still alternatively, a metal element that can form silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The current collector 101 can have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The current collector 101 may be formed to have micro irregularities on the surface thereof in order to enhance adhesion to the active material layer, for example. The current collector 101 preferably has a thickness of 5 μm to 30 μm inclusive.

The positive electrode active material layer 102 includes the active material. An active material refers only to a material that relates to insertion and extraction of ions that carriers. In this specification and the like, a material that is actually an "active material" and the material including a conductive additive, a binder, and the like are collectively referred to as an active material layer.

In the case where the active material is used as a negative electrode active material, for example, a carbon-based material, an alloy-based material, or the like can be used.

Examples of the carbon-based material include graphite, graphitizing carbon (soft carbon), non-graphitizing carbon (hard carbon), a carbon nanotube, graphene, and carbon black.

Examples of graphite include artificial graphite such as meso-carbon microbeads (MCMB), coke-based artificial graphite, and pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as relatively high capacity per unit volume, small volume expansion, low cost, and higher level of safety than that of a lithium metal.

As the negative electrode active material, an alloying material can be used. Here, as the alloying material, a material which can undergo a charge and discharge reaction by being alloyed with metal to serve as a carrier ion can be used. A material containing at least one of Ga, Si, Al, Ge, Sn, Pb, Sb, Bi, Ag, Zn, Cd, In, and the like can be used, for example. Such elements have higher capacity than carbon. In particular, silicon has a high theoretical capacity of 4200 mAh/g, and therefore, the capacity of the power storage device can be increased. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

It is particularly preferable to use, as the negative electrode active material, a material containing silicon, such as silicon or SiO, to increase the capacity of the power storage device. Here, SiO is a compound containing silicon and oxygen. When the atomic ratio of silicon to oxygen is represented by $\alpha:\beta$, $\alpha$ preferably has an approximate value of $\beta$. Here, when $\alpha$ has an approximate value of $\beta$, an absolute value of the difference between $\alpha$ and $\beta$ is preferably less than or equal to 20% of a value of $\beta$, more preferably less than or equal to 10% of a value of $\beta$.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide with which an alloying reaction with lithium is not caused, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the active material is a positive electrode active material, a material into and from which lithium ions can be intercalated and deintercalated can be used as the positive electrode active material; for example, a material having an olivine crystal structure, a layered rock-salt crystal structure, a spinel crystal structure, or a NASICON crystal structure, or the like can be used.

Although the case of using the particle containing the lithium-manganese composite oxide as the positive electrode active material is described in this embodiment, a different active material may be used. Examples of the different active material include compounds such as $LiFeO_2$, $LiCoO_2$, $LiNiO_2$, $LiMn_2O_4$, $V_2O_5$, $Cr_2O_5$, and $MnO_2$.

Alternatively, lithium-containing complex phosphate, $LiMPO_4$ (general formula, where M is one or more of Fe(II), Mn(II), Co(II), and Ni(II)), can be used. Typical examples of $LiMPO_4$ are lithium metal phosphate compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, lithium-containing complex silicate such as $Li_{(2-j)}MSiO_4$ (general formula, where M is one or more of Fe(II), Mn(II), Co(II), and Ni(II), and 0≤j≤2) may be used. Typical examples of $Li_{(2-j)}MSiO_4$ are lithium silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(s-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound expressed by $A_xM_2(XO_4)_3$ (general formula, where A=Li, Na, or Mg, M=Fe, Mn, Ti, V, Nb, or Al, X=S, P, Mo, W, As, or Si) can be used for the active material. Examples of the NASICON compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula, where M=Fe or Mn), a perovskite fluoride such as $NaF_3$ and $FeF_3$, a metal chalcogenide (a sulfide, a selenide, or a telluride) such as $TiS_2$ and $MoS_2$, a material with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a compound containing carriers such as an alkali metal (e.g., sodium or potassium) or an alkaline-earth metal (e.g., calcium, strontium, barium, beryllium, or magnesium) instead of lithium of the lithium compound, the lithium-containing complex phosphate, or the lithium-containing complex silicate may be used as the positive electrode active material.

The average particle diameter of the positive electrode active material is preferably, for example, greater than or equal to 5 nm and less than or equal to 50 μm.

The active material layer 102 may include a conductive additive. Examples of the conductive additive include natural graphite, artificial graphite such as meso-carbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (acetylene black (AB)) and graphene. Alternatively, metal powder or metal fiber of copper, nickel, aluminum, silver, gold, or the like, a conductive ceramic material, or the like can be used.

Flaky graphene has excellent electrical characteristics of high conductivity and excellent physical properties of high flexibility and high mechanical strength. For this reason, the use of graphene as the conductive additive can increase the points and the area where the active materials are in contact with each other.

The active material layer 102 preferably includes a binder, more preferably a binder that contains water-soluble polymers. The active material layer 102 may include a plurality of kinds of binders.

As the binder, a material such as polyvinylidene fluoride (PVdF), polystyrene, poly(methyl acrylate), poly(methyl methacrylate) (PMMA), sodium polyacrylate, polyvinyl alcohol (PVA), polyethylene oxide (PEO), polypropylene oxide, polyimide (PI), polyvinyl chloride, polytetrafluoroethylene, polyethylene, polypropylene, isobutylene, polyethylene terephthalate, nylon, or polyacrylonitrile (PAN) is preferably used.

As the binder, a rubber material such as styrene-butadiene rubber (SBR), styrene-isoprene-styrene rubber, acrylonitrile-butadiene rubber, butadiene rubber, or ethylene-propylene-diene copolymer can be used. Any of these rubber materials is more preferably used in combination with water-soluble polymers. Since these rubber materials have rubber elasticity and easily expand and contract, it is possible to obtain a highly reliable electrode that is resistant to stress due to expansion and contraction of an active material by charge and discharge, bending of the electrode, or the like. On the other hand, the rubber materials have a hydrophobic group and thus are unlikely to be soluble in water in some cases. In such a case, particles are dispersed in an aqueous solution without being dissolved in water, so that increasing the viscosity of a composition containing a solvent used for the formation of the active material layer 102

(also referred to as an electrode binder composition) up to the viscosity suitable for application might be difficult. Water-soluble polymers having an excellent function of adjusting viscosity, such as a polysaccharide, can moderately increase the viscosity of the solution and can be uniformly dispersed together with a rubber material. Thus, a favorable electrode with high uniformity (e.g., an electrode with uniform electrode thickness or electrode resistance) can be obtained.

As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

A single binder may be used or plural kinds of binders may be used in combination.

<Formation Method of Electrode>

Next, a method for forming the electrode 100 of one embodiment of the present invention will be described.

First, an electrode binder composition is formed. The electrode binder composition can be formed in such a manner that the above-described active material to which a conductive additive, a binder, and the like are added as appropriate is mixed with a solvent, for example. The electrode binder composition may be slurry or a paste. As the solvent, for example, water or N-methyl-2-pyrrolidone (NMP) can be used.

The case where the electrode 100 is a positive electrode of a storage battery will be described as an example. Described here is an example where the active material of one embodiment of the present invention is used as an active material, acetylene black is used as a conductive additive, PVdF is used as a binder, and NMP is used as a solvent.

First, the active material of one embodiment of the present invention, acetylene black, and polyvinylidene fluoride are mixed. Then, NMP is added to the obtained mixture and mixed until predetermined viscosity is obtained; thus, the electrode binder composition can be formed. In this step, the mixing and the addition of the polar solvent may be repeated more than once. The electrode binder composition may be in a slurry form or a paste form.

Through the above steps, the electrode binder composition in which the active material, the conductive additive, and the binder are uniformly dispersed can be obtained.

Here, an undercoat may be formed over the current collector. Note that the undercoat is a coating layer provided to reduce contact resistance or to improve adhesion between the current collector and the active material layer. Examples of the undercoat include a carbon layer, a metal layer, a layer containing carbon and high molecules, and a layer containing metal and high molecules. Forming the undercoat over the current collector can reduce the contact resistance between the current collector and the active material layer formed later, and/or can increase adhesion between the active material layer and the current collector. In addition, the adhesion between the current collector and the active material layer can be increased. In the case of using graphene as the conductive additive, the undercoat is preferably not dissolved in a reducing solution in the process of reducing graphene oxide.

As the undercoat, for example, an aqueous solution in which graphite, acetylene black, and the like are dispersed or the aqueous solution into which high molecules are mixed can be used. Examples of the undercoat include a mixture of graphite and sodium polyacrylate (PAA) and a mixture of AB and PVdF. The weight ratio of black lead to PAA is preferably in a range of 95:5 to 50:50, and the compounding ratio of AB to PVdF is preferably in a range of 70:30 to 50:50.

Note that if there is no problem with the adhesion between the current collector and the active material layer, the electrode strength, and the contact resistance, it is not necessary to apply the undercoat to the current collector.

Next, slurry is provided on one or both surfaces of the current collector by a coating method such as a doctor blade method.

Next, the slurry formed over the current collector is dried by a method such as ventilation drying or reduced pressure (vacuum) drying to form the active material layer. The drying is preferably performed using a hot wind with temperatures of 50° C. to 180° C. Through this step, the polar solvent contained in the active material layer is evaporated. Note that there is no particular limitation on the atmosphere.

The active material layer may be pressed by a compression method such as a roll press method or a flat plate press method to increase the density of the active material layer. When the pressing is performed while being heated at higher than or equal to 90° C. and lower than or equal to 180° C., preferably lower than or equal to 120° C., the binder (e.g., PVdF) contained in the undercoat or the active material layer is softened to such an extent that the characteristics of the electrode is not changed, further increasing the adhesion between the current collector and the active material layer.

Next, heat treatment is performed on the active material layer to evaporate the solvent. The heat treatment is preferably performed under a reduced pressure (in vacuum) or in a reduction atmosphere. The heat treatment step may be performed at temperatures higher than or equal to 50° C. and lower than or equal to 600° C., preferably higher than or equal to 120° C. and lower than or equal to 500° C., more preferably higher than or equal to 200° C. and lower than or equal to 400° C. for 1 to 48 hours. The heat treatment allows evaporation or removal of the polar solvent and moisture in the active material layer.

Here, in the case where an electrode is manufactured using the "particle containing the lithium-manganese composite oxide" of one embodiment of the present invention and a storage battery is fabricated using the electrode, the first region to the third region included in the "particle containing the lithium-manganese composite oxide" may be formed in any of the formation process of the "particle containing the lithium-manganese composite oxide" and the fabrication process of the storage battery.

<Heat Treatment>

By the heat treatment, the first region to the third region are formed in the "particle containing the lithium-manganese composite oxide" of one embodiment of the present invention in some cases, for example.

Note that the first region to the third region in the "particle containing the lithium-manganese composite oxide" may be formed before the formation of the electrode, e.g., after the synthesis of the particle. Alternatively, the first region to the third region may be formed in forming the electrode. The thickness, the composition, the crystal structure, and the like of the first region to the third region which are formed after the synthesis of the particle, for example, may be changed in the formation of the electrode. The first region to the third region may be formed in heat treatment in any of steps in a process for manufacturing the storage battery or the like.

Furthermore, by the heat treatment, an element included in the binder reacts with an element included in a particle containing the lithium-manganese composite oxide in some cases. For example, the case where PVdF is used as the binder is described. PVdF is a high molecular compound containing fluorine. The use of the high molecular compound containing fluorine as the binder causes a bond between a material of the electrode other than the binder, e.g., the active material, the conductive additive, and the current collector, and fluorine in some cases. Here, "having a bond" refers to a state where a bond can be observed by XPS analysis or the like, or refers to including a material having the bond. Examples of such a material having a bond include metal fluoride. In some cases, metal fluoride is formed using lithium, manganese, and the element M which are metals included in the lithium-manganese composite oxide of one embodiment of the present invention, for example. A bond with metal used in the current collector can be formed.

An element contained in the coating layer of the lithium-manganese composite oxide, e.g., the layer containing carbon, and fluorine may form a bond. In the case where the coating layer is the layer containing carbon, carbon fluoride may be formed. Here, the coating layer may include the third region included in the "particle containing the lithium-manganese composite oxide" or include the third region and a part of the first region or the second region. The second region included in the "particle containing the lithium-manganese composite oxide" may include a part of the coating layer, for example.

The formation of such a bond can further increase the strength of the electrode in some cases, for example. When the bond is formed in advance, for example, an irreversible reaction can be suppressed in some cases when charging and discharging of the manufactured storage battery are performed. Furthermore, there is a case where charging and discharging cause a change in the volume of the active materials and a decrease in the strength of the electrode. The decrease in the strength of the electrode reduces adhesion between the active materials or adhesion between the active material and the conductive additive, thereby reducing conductive paths of the electrode and causing a reduction in capacity in some cases. In view of this, the formation of such a bond increases the strength of the electrode, so that the electrode has increased tolerance to a change in volume in some cases.

The temperature of the heat treatment which is suitable for the bond formation is preferably higher than or equal to 120° C., more preferably higher than or equal to 160° C., much more preferably higher than or equal to 200° C., still much more preferably higher than or equal to 250° C.

Gas such as oxygen, air, nitrogen, or a rare gas can be used as an atmosphere of the heat treatment. The heat treatment may be performed under an atmospheric pressure or a reduced pressure. For example, in the case where gas containing oxygen is used, a reaction between materials of the electrode, such as the particle containing the lithium-manganese composite oxide and the binder, can be promoted. Here, "a reaction with the binder is promoted" means that, for example, a bond between an element in the binder and an element in the particle containing the lithium-manganese composite oxide is observed by XPS analysis or the like. In the case where an inert gas such as nitrogen or a rare gas is used, a change in the quality of materials of the electrode, such as the current collector, can be suppressed in some cases. In the case where the heat treatment is performed under a reduced pressure, a change in the quality of a material of the electrode, such as the current collector, can be suppressed in some cases.

When the temperature of the heat treatment is too high, a material of the electrode is decomposed, for example. For example, a decomposition reaction might occur in the particle containing the lithium-manganese composite oxide. If such a particle is used in a storage battery, the capacity of the storage battery might be reduced. Therefore, the heat treatment temperature is preferably lower than or equal to 600° C. more preferably lower than or equal to 500° C., much more preferably lower than or equal to 400° C.

<Press>

The current collector over which the active material layer is formed may be further pressed. Thus, the adhesion between the current collector and the active material layer can be increased. In addition, the density of the active material layer can be increased. Further, by applying heat at higher than or equal to 90° C. and lower than or equal to 180° C., preferably lower than or equal to 120° C. when the pressing is performed, the binder (e.g., PVdF) contained in the undercoat or the active material layer is softened to the extent that the characteristics of the electrode is not changed; thus, the adhesion between the current collector and the active material layer is further increased.

Lastly, the current collector and the active material layer are stamped to have a predetermined size, whereby the electrode is formed.

In Embodiment 1, one embodiment of the present invention has been described. Other embodiments of the present invention are described in Embodiments 2 to 6. Note that one embodiment of the present invention is not limited thereto. That is, various embodiments of the invention are described in Embodiments 1 to 6, and thus one embodiment of the present invention is not limited to a specific embodiment. Although an example of application to a lithium-ion secondary battery is described as one embodiment of the present invention, one embodiment of the present invention is not limited to this example. Depending on circumstances or conditions, one embodiment of the present invention can be used for a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a primary battery, a capacitor, and a lithium ion capacitor. Furthermore, depending on circumstances or conditions, for example, one embodiment of the present invention is not necessarily used for a lithium-ion secondary battery. For example, although an example where the active material includes graphene or graphene oxide has been described as one embodiment of the present invention, one embodiment of the present invention is not limited to this example. Depending on circumstances or conditions, in one embodiment of the present invention, graphene or graphene oxide may be used for the following components: an electrode for a supercapacitor (electric double layer capacitor) that has extremely high capacitance; an oxygen-reduction electrode catalyst; a material of a dispersion liquid with lower friction than a lubricant; a transparent electrode for a display device or a solar battery; a gas-barrier material; a polymer material with high mechanical strength and lightweight; a material for a sensitive nanosensor for sensing uranium or plutonium contained in radiation-tainted water; and a material used for removing a radioactive material.

Embodiment 1 can be implemented in appropriate combination with any of the structures described in the other embodiments.

Embodiment 2

Described in this embodiment will be an example of a power storage device using the electrode of one embodiment of the present invention.

Note that the power storage device in this specification and the like indicates all elements and devices that have the function of storing electric power. For example, a storage battery such as a lithium-ion secondary battery, a lithium-ion capacitor, and an electric double layer capacitor are included in the category of the power storage device.

<Thin Storage Battery>

Figure 6:
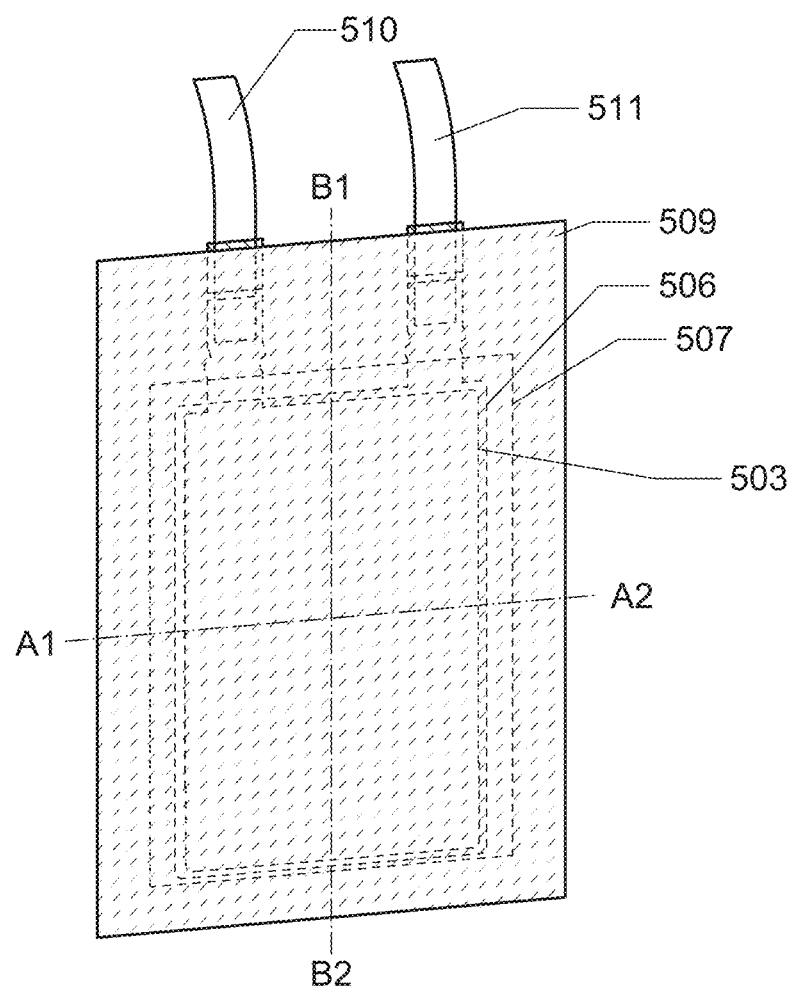
FIG. 6 illustrates a thin storage battery.

FIG. 6 illustrates a thin storage battery as an example of a storage device. When a flexible thin storage battery is used in an electronic device at least part of which is flexible, the storage battery can be bent as the electronic device is bent.

Figure 7A:
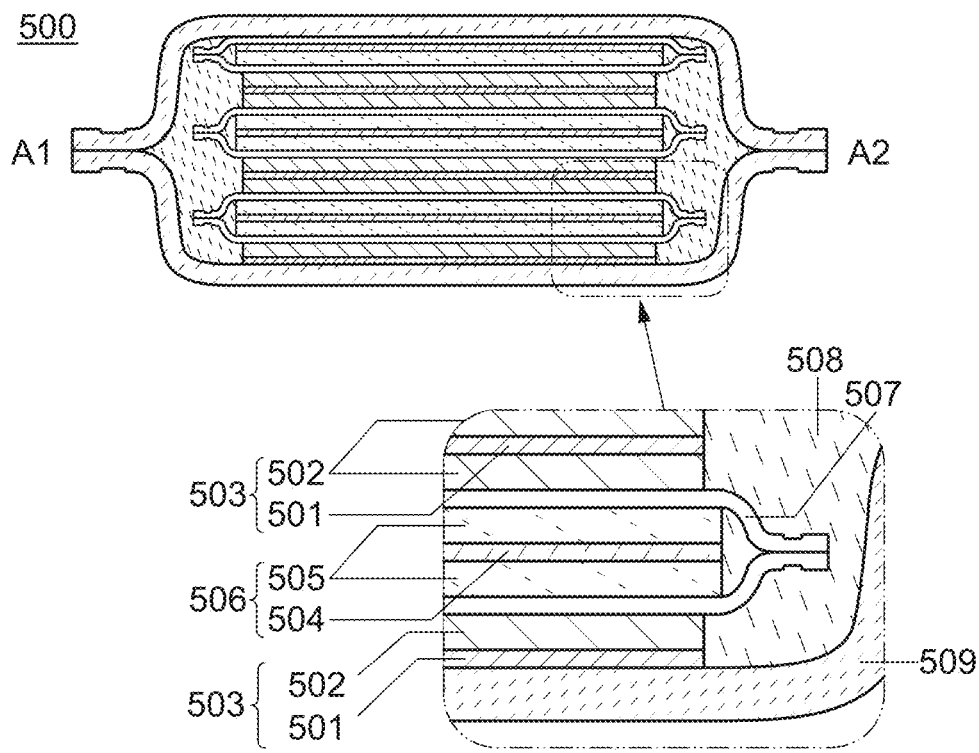
FIGS. 7A and 7B are cross-sectional views of an electrode.
Figure 7B:
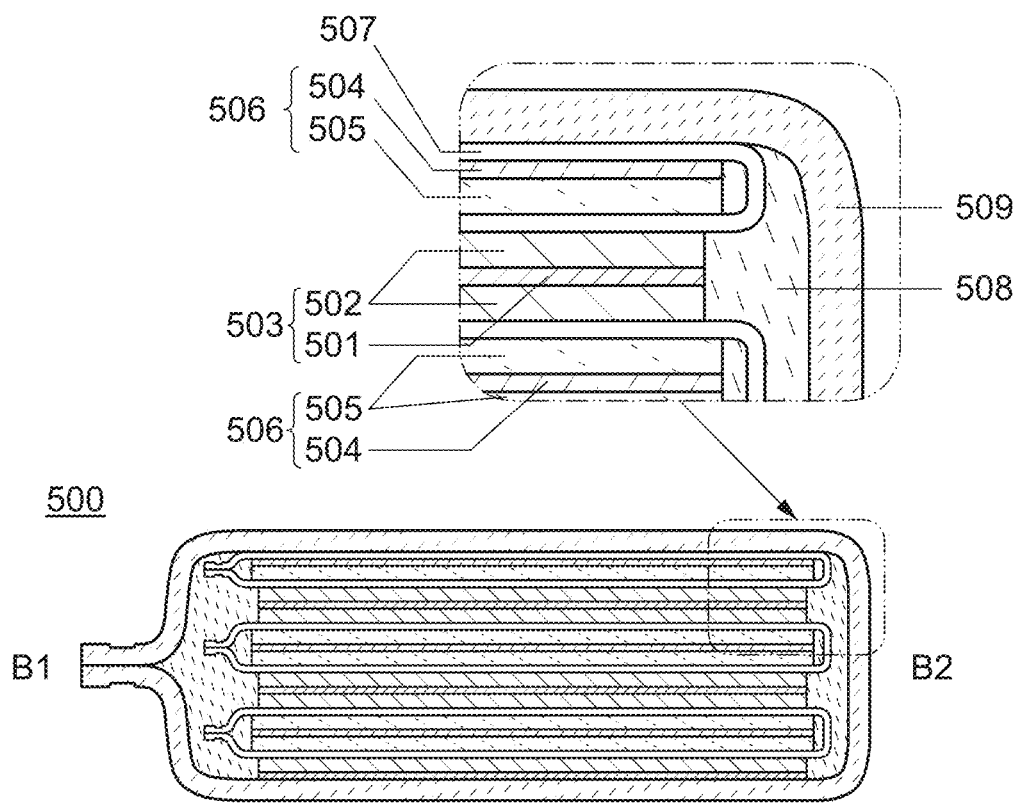

FIG. 6 is an external view of a thin storage battery 500. FIG. 7A is a cross-sectional view along dashed-dotted line A1-A2 in FIG. 6, and FIG. 7B is a cross-sectional view along dashed-dotted line B1-B2 in FIG. 6. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509.

As at least one of the positive electrode 503 and the negative electrode 506, the electrode of one embodiment of the present invention is used. The electrode of one embodiment of the present invention may be used as both the positive electrode 503 and the negative electrode 506.

Here, a structure of the positive electrode 503 will be described. The electrode of one embodiment of the present invention is preferably used as the positive electrode 503. Here, an example of using the electrode 100 described in Embodiment 2 as the positive electrode 503 will be described.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate (VC), γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, tetrafluoroborate, perfluoroalkylborate, hexafluorophosphate, and perfluoroalkylphosphate.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate (VC), propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 weight % and lower than or equal to 5 weight %.

Alternatively, a gelled electrolyte obtained in such a manner that a polymer is swelled with an electrolytic solution may be used. Examples of the gelled electrolyte (polymer-gel electrolyte) include a host polymer that is used as a support and contains the electrolytic solution described above.

Examples of host polymers include a polymer having a polyalkylene oxide structure, such as polyethylene oxide (PEO); PVdF; polyacrylonitrile; and a copolymer containing any of them. For example, PVdF-HFP, which is a copolymer of PVdF and hexafluoropropylene (HFP) can be used. The formed polymer may be porous.

Instead of the electrolytic solution, a solid electrolyte including an inorganic material such as a sulfide-based inorganic material or an oxide-based inorganic material, or a solid electrolyte including a macromolecular material such as a polyethylene-oxide-based (PEO-based) macromolecular material may alternatively be used. When the solid electrolyte is used, a separator and a spacer are not necessary. Furthermore, the battery can be entirely solidified: therefore, there is no possibility of liquid leakage and thus the safety of the battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

The separator 507 is preferably formed to have a bag-like shape to surround one of the positive electrode 503 and the negative electrode 506. For example, as illustrated in FIG.

Figure 8A:
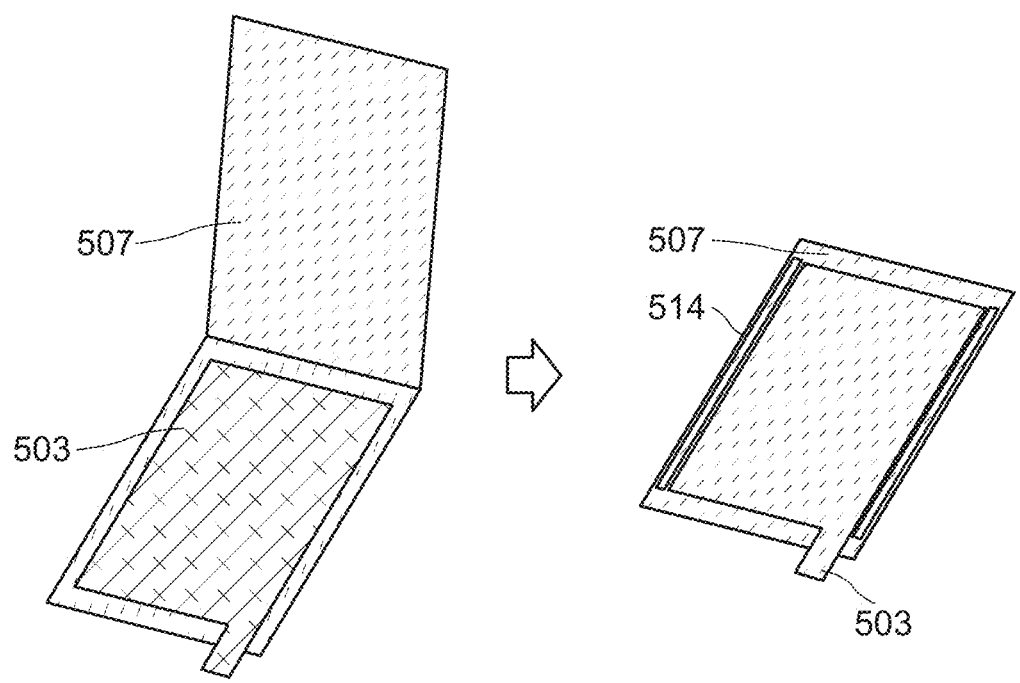
FIGS. 8A and 8B each illustrate a thin storage battery.
Figure 8B:
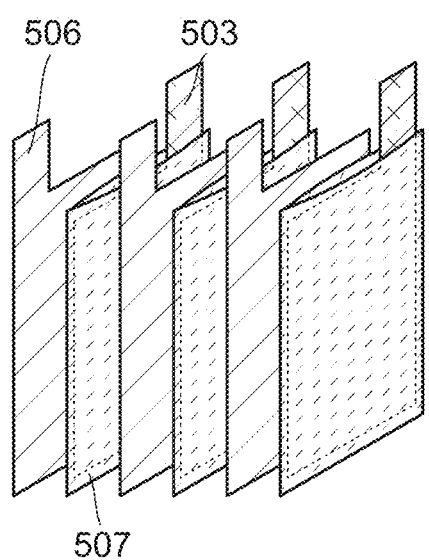

8A, the separator 507 is folded in two so that the positive electrode 503 is sandwiched, and sealed with a sealing portion 514 in a region outside the region overlapping with the positive electrode 503; thus, the positive electrode 503 can be reliably supported inside the separator 507. Then, as illustrated in FIG. 8B, the positive electrodes 503 surrounded by the separators 507 and the negative electrodes 506 are alternately stacked and provided in the exterior body 509, whereby the thin storage battery 500 can be formed.

Described here is an example in which a particle containing the lithium-manganese composite oxide described in Embodiment 1 is used as the positive electrode active material, the electrode described in Embodiment 1 is used as the positive electrode 503, and an active material containing silicon is used as the negative electrode active material.

The capacity of the active material containing silicon, such as silicon or SiO, per weight and volume of the active material is high, and accordingly, capacity per weight and volume of the storage battery can be increased.

In some cases, in charging and discharging of the storage battery, a decomposition reaction of the electrolytic solution occurs as well as intercalation and deintercalation of carrier ions. The decomposition reaction occurs also in the positive electrode and the negative electrode in some cases. In particular, in the negative electrode, the electrolytic solution does not have tolerance to a low potential of its battery reaction and is decomposed in many cases. Such a decomposition reaction is an irreversible reaction in many cases and thus might lead to the low charge and discharge efficiency and the loss of the capacity of the power storage device.

In view of such a case, an irreversible reaction is caused in advance in a battery including the negative electrode 506 or the positive electrode 503, a counter electrode, and an electrolytic solution, and then, the negative electrode 506 or the positive electrode 503 is taken out of the battery and used for fabricating a storage battery. The storage battery fabricated in this manner is preferable because a decrease in the capacity of the storage battery due to an irreversible reaction can be suppressed. As the counter electrode, a material containing carrier ions may be used. For example, metal containing carrier ions and a compound containing carrier ions can be used. Examples of the metal containing carrier ions include lithium. Examples of the compound containing carrier ions include the materials given as the positive electrode active material and the negative electrode active material in Embodiment 1.

Next, aging after fabrication of a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where an electrolytic solution is decomposed and a gas is generated and accumulated in the cell, the electrolytic solution cannot be in contact with a surface of the electrode in some regions. That is to say, an effectual reaction area of the electrode is reduced and effectual current density is increased. Furthermore, the particle containing the lithium-manganese composite oxide of one embodiment of the present invention has a high reaction potential when used as the positive electrode active material. The high reaction potential of the positive electrode active material is preferable, because the voltage of the storage battery can be increased and the energy density of the storage battery can be increased.

In some cases, the electrolytic solution does not have tolerance to such a high reaction potential. In some cases, for example, the electrolytic solution is decomposed on the surface of the positive electrode to generate gas. In such cases, the gas is preferably released.

When the current density is extremely high, a voltage drop occurs depending on the resistance of the electrode, lithium is intercalated into graphite, and lithium is deposited on the surface of graphite. The lithium deposition might reduce capacity. For example, if a coating film or the like is grown on the surface after lithium deposition, lithium deposited on the surface cannot be dissolved again. Thus, the amount of lithium which does not contribute to capacity is increased. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

Aging may be performed while pressing is performed. For example, after a thin storage battery is fabricated, charging and discharging may be performed while pressing is performed with a press machine.

The lithium-manganese composite oxide of one embodiment of the present invention is preferable because of having high discharge capacity. Furthermore, the lithium-manganese composite oxide of one embodiment of the present invention has a high battery reaction potential and high energy density is therefore preferable.

When an active material having a high battery reaction potential is used as the positive electrode of the storage battery, the electrolytic solution is easily decomposed in some cases. By the decomposition of the electrolytic solution, gas is generated in the vicinity of the surface of the positive electrode in some cases.

Performing aging while pressing is performed is preferable, in which case the generated gas can be released to a region except a region subject to the pressing, e.g., a peripheral portion of the storage battery.

Here, pressing may be performed while heating is performed, for example. Pressing may be performed before and after aging, but performing aging while pressing is performed is more preferable.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour to 100 hours. In the initial charge, an electrolytic solution decomposed on the surface forms a coating film on the surface of graphite. The formed coating film may thus be densified when the charging state is held at a temperature higher than room temperature after the release of the gas, for example.

Figure 9A:
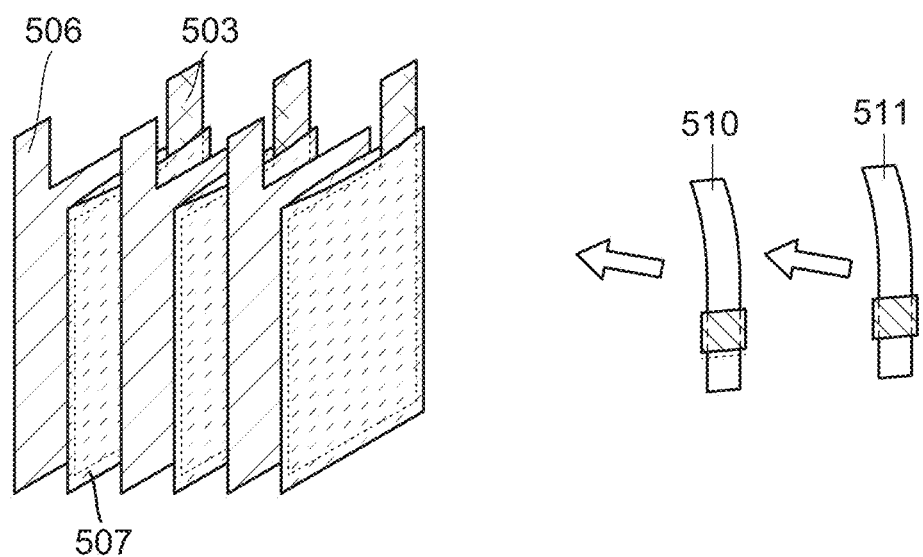
FIGS. 9A and 9B each illustrate a thin storage battery.
Figure 9B:
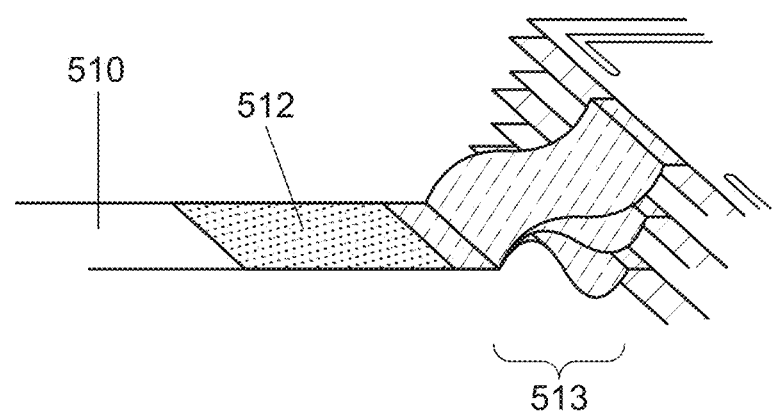

As shown in FIG. 9A, the positive electrode current collectors in the positive electrodes 503 are welded to the positive electrode lead electrode 510 in a welding region 512 by ultrasonic welding or the like. The negative electrode current collectors in the negative electrodes 506 are welded to the negative electrode lead electrode 511. FIG. 9B illustrates an example in which current collectors are welded to the positive electrode lead electrode 510. The positive electrode current collector includes a bent portion 513 as illustrated in FIG. 9B, and it is therefore possible to relieve stress due to external force applied after fabrication of the storage battery 500. Thus, the storage battery 500 can have high reliability.

In the thin storage battery 500 shown in FIG. 6 and FIGS. 7A and 7B, the positive electrode lead electrode 510 and a negative electrode lead electrode 511 are welded to the positive electrode current collectors 501 in the positive electrode 503 and the negative electrode current collectors 504 in the negative electrode 506, respectively, by ultrasonic welding such that part of the positive electrode lead electrode 510 and part of the negative electrode lead electrode 511 are exposed to the outside. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside the exterior body 509 without using lead electrodes.

Figure 10:
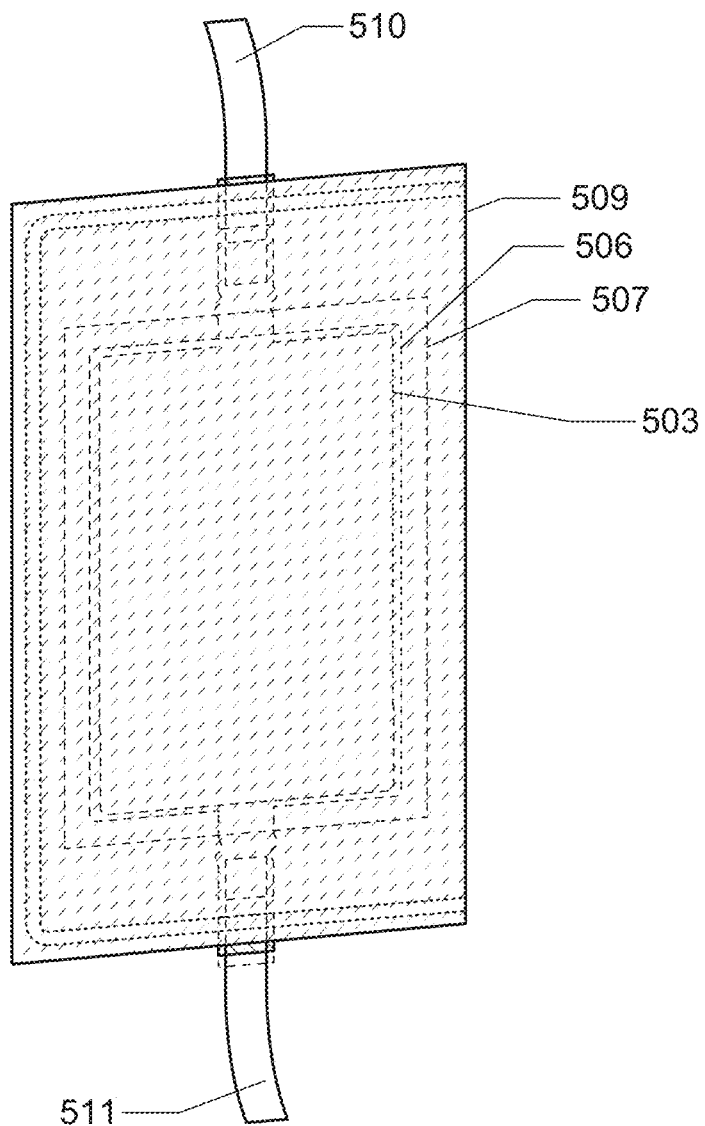
FIG. 10 illustrates a thin storage battery.

Although the positive electrode lead electrode 510 and the negative electrode lead electrode 511 are provided on the same side in FIG. 6, the positive electrode lead electrode 510 and the negative electrode lead electrode 511 may be provided on different sides as illustrated in FIG. 10. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

The example in FIG. 6 includes five positive electrode-negative electrode pairs (the positive and negative electrodes face each other). It is needless to say that the number of pairs of electrodes is not limited to five, and may be more than or less than five. In the case of using a large number of electrode layers, the storage battery can have high capacity. In contrast, in the case of using a small number of electrode layers, the storage battery can have a small thickness and high flexibility.

In the above structure, the exterior body 509 of the storage battery can change its form with a radius of greater than or equal to 30 mm, preferably greater than or equal to 10 mm. One or two films are used as the exterior body of the storage battery. In the case where the storage battery has a layered structure, the storage battery has a cross section sandwiched by two curved surfaces of the films when it is bent.

Figure 11A:
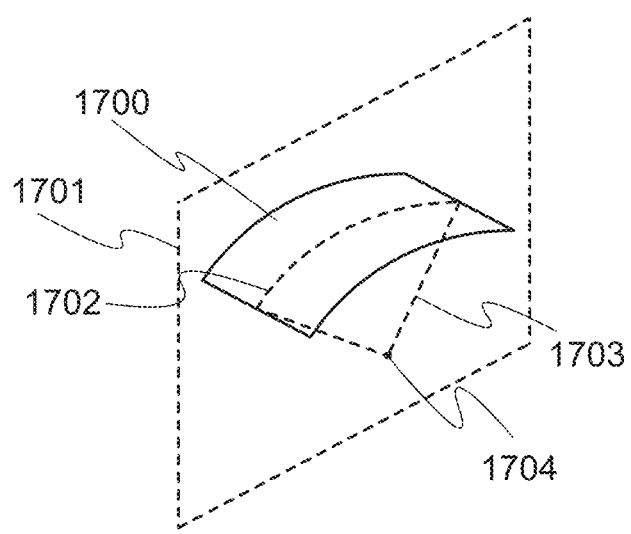
FIGS. 11A to 11C illustrate the radius of curvature of a surface.
Figure 11B:
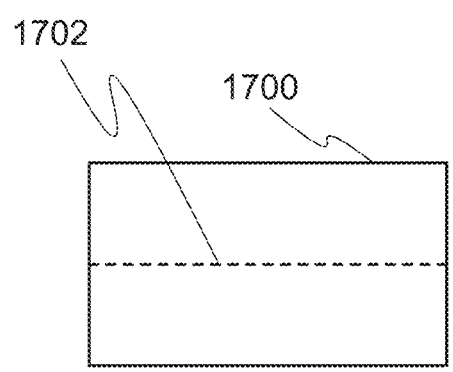
Figure 11C:
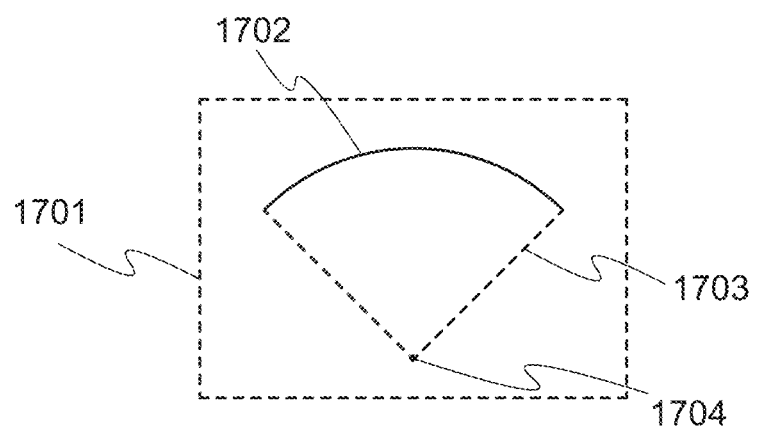

Description is given of the radius of curvature of a surface with reference to FIGS. 11A to 11C. In FIG. 11A, on a plane 1701 along which a curved surface 1700 is cut, part of a curve 1702 of the curved surface 1700 is approximate to an arc of a circle, and the radius of the circle is referred to as a radius of curvature 1703 and the center of the circle is referred to as a center 1704 of curvature. FIG. 11B is a top view of the curved surface 1700. FIG. 11C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 12A:
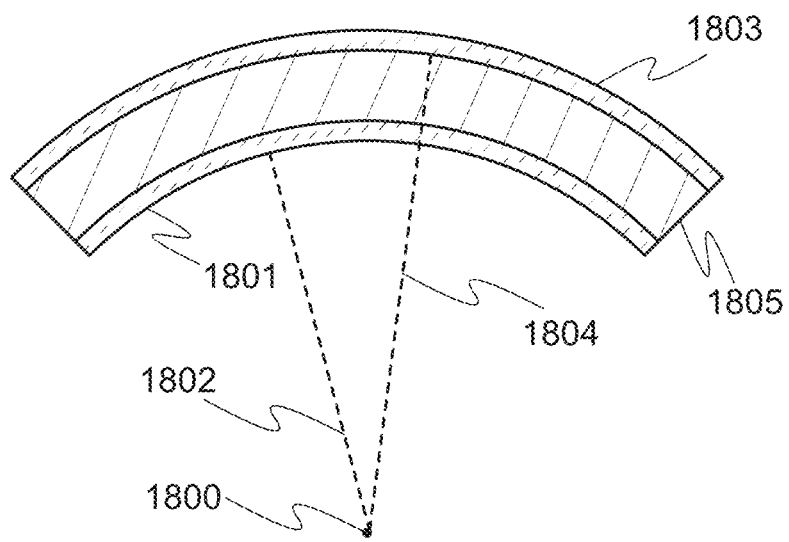
FIGS. 12A to 12D illustrate the radius of curvature of a film.
Figure 12B:
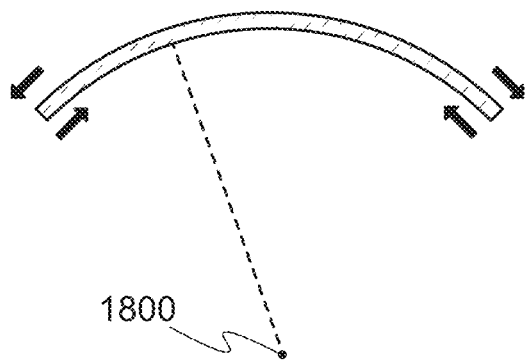

In the case of bending a secondary battery in which electrodes, an electrolytic solution, and the like which are denoted by reference numeral 1805 are sandwiched between two films as exterior bodies, a radius of curvature 1802 of a film 1801 close to a center of curvature 1800 of the secondary battery is smaller than a radius of curvature 1804 of a film 1803 far from the center of curvature 1800 (FIG. 12A). When the secondary battery is curved and has an arc-shaped cross section, compressive stress is applied to a surface of the film on the side closer to the center of curvature 1800 and tensile stress is applied to a surface of the film on the side farther from the center of curvature 1800 (FIG. 12B). However, by forming a pattern including convex portions or concave portions on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 30 mm, preferably greater than or equal to 10 mm.

Figure 12C:
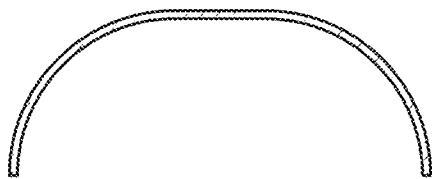
Figure 12D:

Note that the cross-sectional shape of the secondary battery is not limited to a simple arc shape, and the cross section can be partly arc-shaped; for example, a shape illustrated in FIG. 12C, a wavy shape illustrated in FIG. 12D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

<Coin-Type Storage Battery>

Figure 13A:
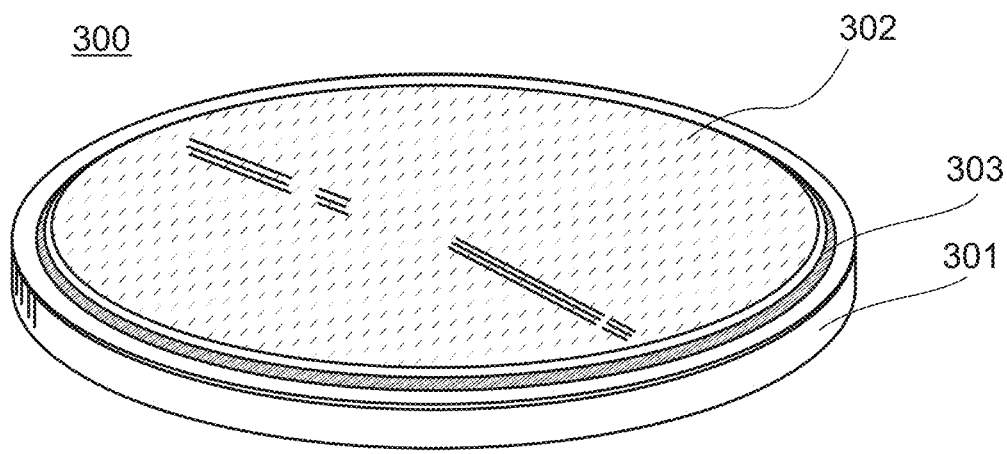
FIGS. 13A and 13B illustrate a coin-type storage battery.
Figure 13B:
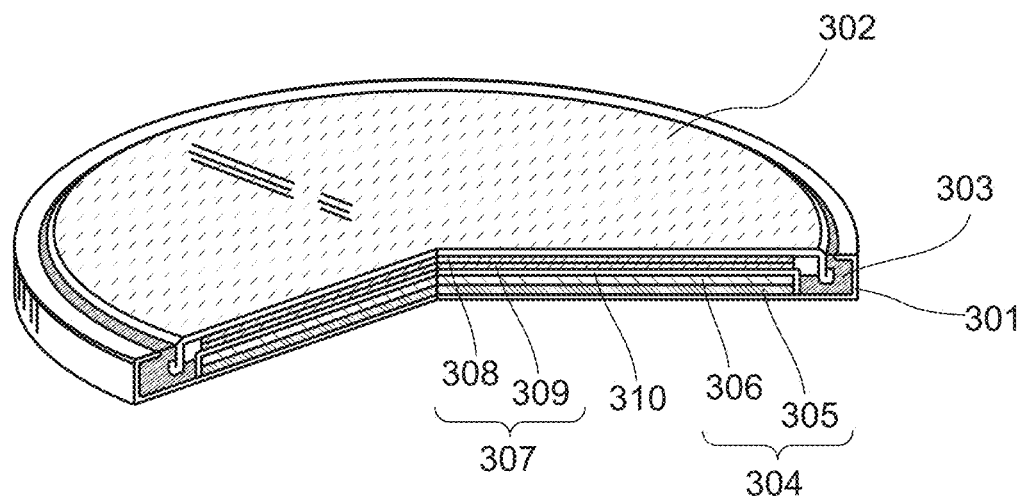

Next, an example of a coin-type storage battery will be described as an example of a power storage device with reference to FIGS. 13A and 13B. FIG. 13A is an external view of a coin-type (single-layer flat type) storage battery, and FIG. 13B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The description of the positive electrode active material layer 502 can be referred to for the positive electrode active material layer 306.

A negative electrode 307 includes a negative electrode current collector 308 and a negative electrode active material layer 309 provided in contact with the negative electrode current collector 308. The description of the negative electrode active material layer 505 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 13B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

<Cylindrical Storage Battery>

Figure 14A:
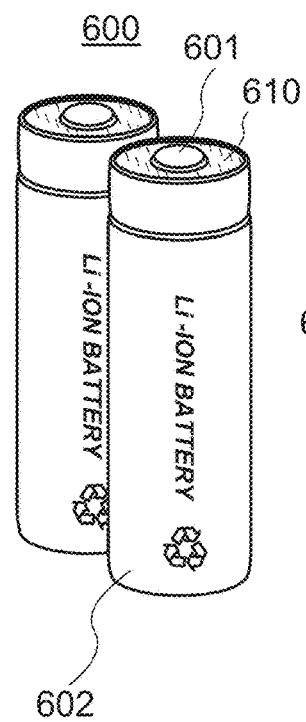
FIGS. 14A and 14B illustrate a cylindrical storage battery.

Next, an example of a cylindrical storage battery will be described as an example of a power storage device with reference to FIGS. 14A and 14B. As illustrated in FIG. 14A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 14B:
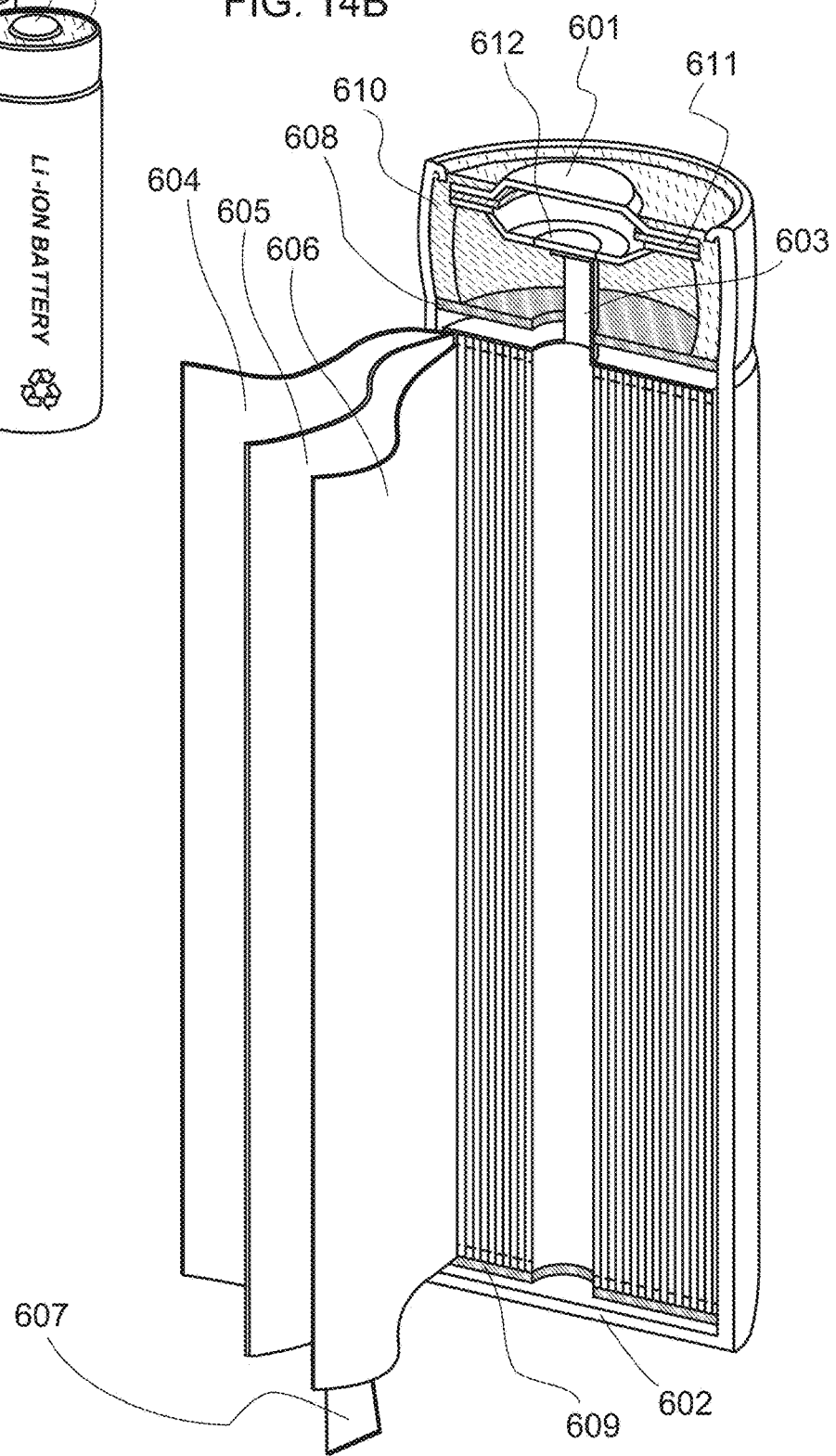

FIG. 14B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a non-aqueous electrolytic solution (not illustrated) is injected inside the battery can 602 provided with the battery element. As the nonaqueous electrolytic solution, a nonaqueous electrolytic solution that is similar to those of the coin-type storage battery can be used.

The positive electrode 604 and the negative electrode 606 can be formed in a manner similar to that of the positive electrode and the negative electrode of the thin storage battery described above. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

In the case where an electrode is wound as in the cylindrical storage battery illustrated in FIGS. 14A and 14B, a great stress is caused at the time of winding the electrode. In addition, an outward stress from an axis of winding is applied to the electrode all the time in the case where a wound body of the electrode is stored in a housing. However, the active material can be prevented from being cleaved even when such a great stress is applied to the electrode.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 15A to 15C, FIGS. 16A to 16C, FIGS. 17A and 17B, FIGS. 18A1, 18A2, 18B1, and 18B2, and FIGS. 19A and 19B illustrate examples of other storage batteries.

<Structural Example of Storage Battery>

FIGS. 15A to 15C and FIGS. 16A to 16C illustrate structural examples of thin storage batteries. A wound body 993 illustrated in FIG. 15A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 15A:
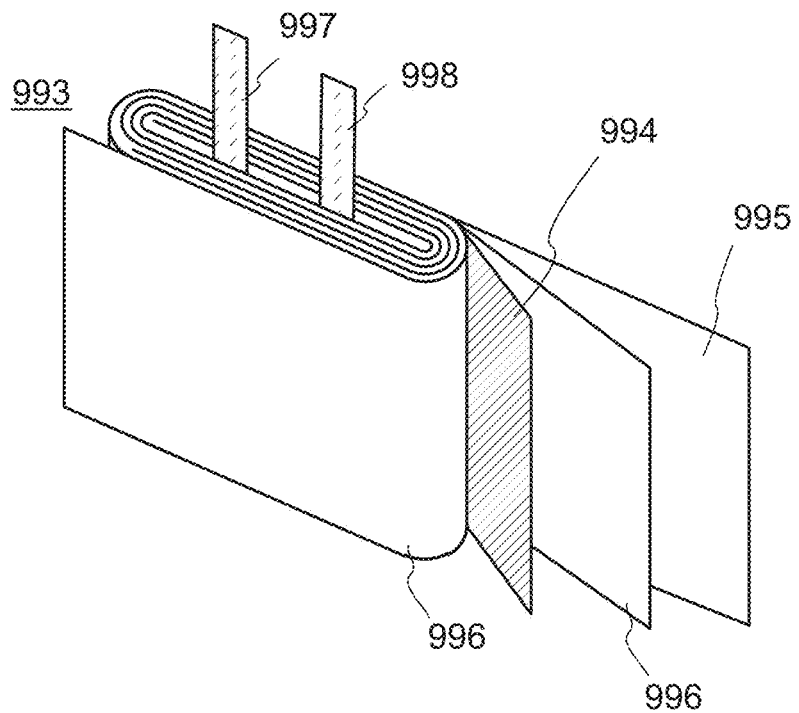
FIGS. 15A to 15C illustrate examples of power storage devices.
Figure 15B:
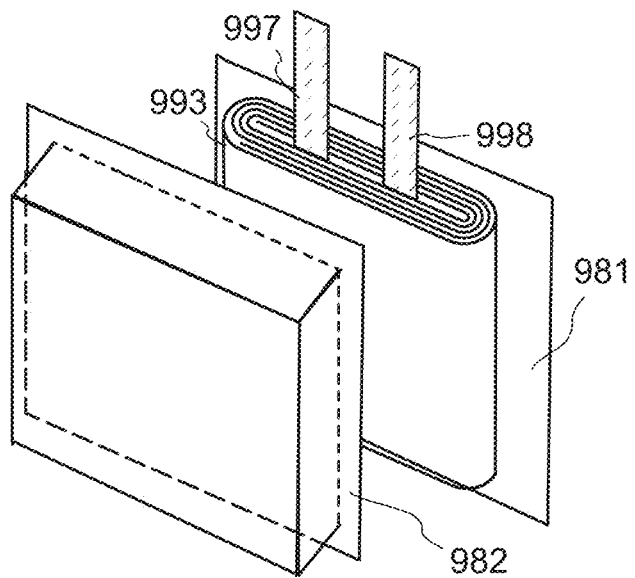
Figure 15C:
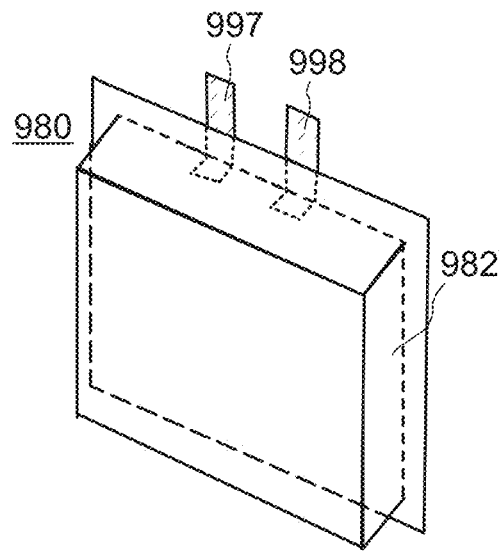

In a storage battery 990 illustrated in FIGS. 15B and 15C, the wound body 993 is packed in a space formed by bonding a film 981 and a film 982 having a concave portion that serve as exterior bodies by thermocompression bonding or the like. The wound body 993 includes the lead electrode 997 and the lead electrode 998, and is soaked in an electrolytic solution inside a space surrounded by the film 981 and the film 982 having a concave portion.

For the film 981 and the film 982 having a concave portion, a metal material such as aluminum or a resin material can be used, for example. With the use of a resin material for the film 981 and the film 982 having a concave portion, the film 981 and the film 982 having a concave portion can be changed in their forms when external force is applied; thus, a flexible storage battery can be fabricated.

Although FIGS. 15B and 15C illustrate an example where a space is formed by two films, the wound body 993 may be placed in a space formed by bending one film.

Furthermore, in manufacturing a flexible power storage device, a resin material or the like can be used for an exterior body and a sealed container of the thin storage battery. Note that in the case where a resin material is used for the exterior body and the sealed container, a conductive material is used for a portion connected to the outside.

For example, FIGS. 16B and 16C illustrate another example of a flexible thin storage battery. The wound body 993 illustrated in FIG. 16A is the same as that illustrated in FIG. 15A, and the detailed description thereof is omitted.

In the storage battery 990 illustrated in FIGS. 16B and 16C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

When the electrode containing the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the charge-discharge cycle characteristics of the battery can be improved.

<Structural Example of Power Storage System>

Structural examples of power storage systems will be described with reference to FIGS. 17A and 17B, FIGS. 18A1, 18A2, 18B1, and 18B2, and FIGS. 19A and 19B. Here, a power storage system refers to, for example, a device including a power storage device.

Figure 17A:
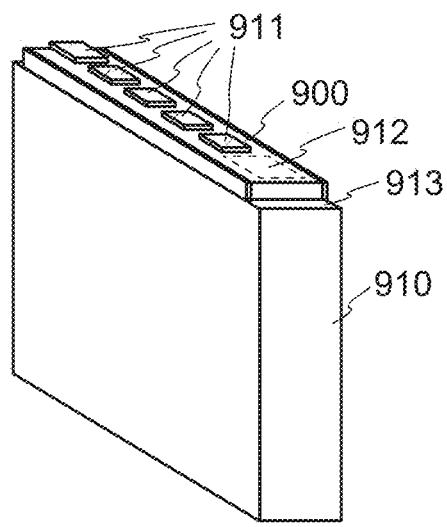
FIGS. 17A and 17B illustrate examples of power storage devices.
Figure 17B:
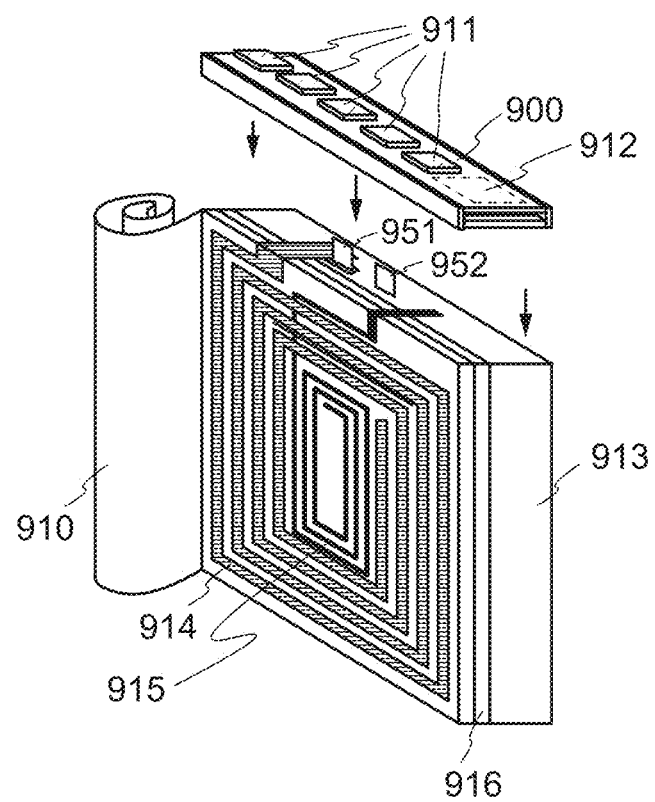

FIGS. 17A and 17B are external views of a power storage system. The power storage system includes a circuit board 900 and a storage battery 913. A label 910 is attached to the storage battery 913. As shown in FIG. 17B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that illustrated in FIGS. 17A and 17B.

For example, as shown in FIGS. 18A1 and 18A2, two opposite surfaces of the storage battery 913 in FIGS. 17A and 17B may be provided with respective antennas. FIG. 18A1 is an external view showing one side of the opposite surfaces, and FIG. 18A2 is an external view showing the other side of the opposite surfaces. For portions similar to those in FIGS. 17A and 17B, the description of the power storage system illustrated in FIGS. 17A and 17B can be referred to as appropriate.

As illustrated in FIG. 18A1, the antenna 914 is provided on one of the opposite surfaces of the storage battery 913 with the layer 916 interposed therebetween, and as illustrated in FIG. 18A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 18B1 and 18B2, two opposite surfaces of the storage battery 913 in FIGS. 17A and 17B may be provided with different types of antennas. FIG. 18B1 is an external view showing one side of the opposite surfaces, and FIG. 18B2 is an external view showing the other side of the opposite surfaces. For portions similar to those in FIGS. 17A and 17B, the description of the power storage system illustrated in FIGS. 17A and 17B can be referred to as appropriate.

As illustrated in FIG. 18B 1, the antennas 914 and 915 are provided on one of the opposite surfaces of the storage battery 913 with the layer 916 provided between the storage battery 913 and the antennas 914 and 915, and as illustrated in FIG. 18A2, an antenna 918 is provided on the other of the opposite surfaces of the storage battery 913 with the layer 917 provided therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 19A:
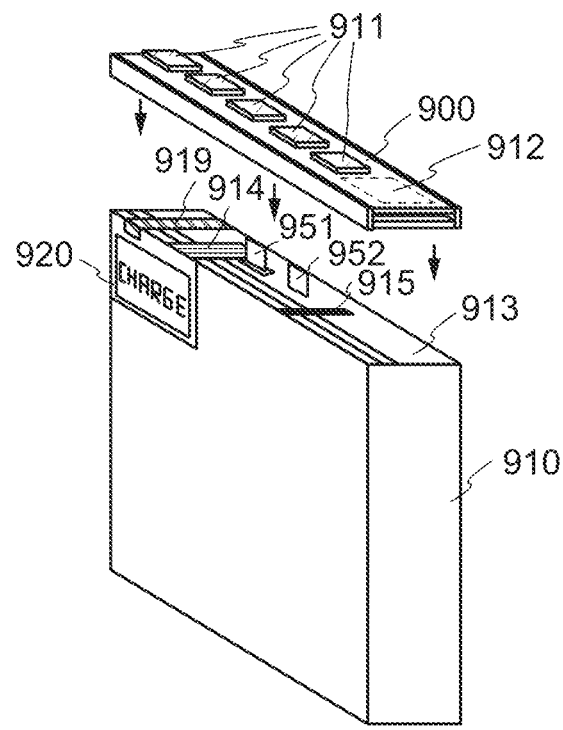
FIGS. 19A and 19B illustrate examples of power storage devices.

Alternatively, as illustrated in FIG. 19A, the storage battery 913 in FIGS. 17A and 17B may be provided with a display device 920. The display device 920 is electrically connected to the terminal 911 via a terminal 919. It is possible that the label 910 is not provided in a portion where the display device 920 is provided. For portions similar to those in FIGS. 17A and 17B, the description of the power storage system illustrated in FIGS. 17A and 17B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 19B:
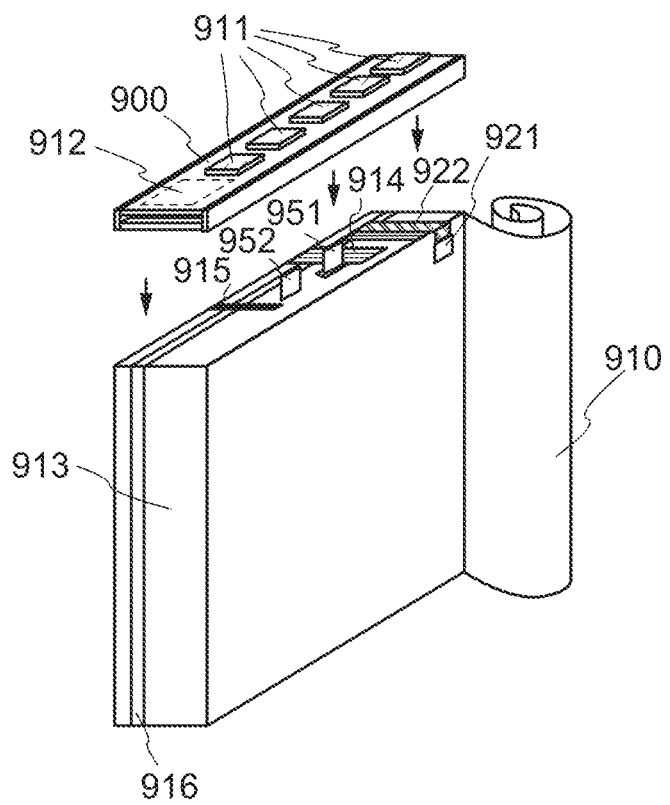

Alternatively, as illustrated in FIG. 19B, the storage battery 913 illustrated in FIGS. 17A and 17B may be provided with a sensor 921. The sensor 921 is electrically connected to the terminal 911 via a terminal 922. For portions similar to those in FIGS. 17A and 17B, the description of the power storage system illustrated in FIGS. 17A and 17B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 3

In this embodiment, an example of an electronic device including a flexible storage battery will be described.

FIGS. 20A to 20G illustrate examples of electronic devices including the flexible power storage device described in Embodiment 2. Examples of electronic devices each including the flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, the flexible power storage device can be incorporated along a curved inside/outside wall surface of a house or a building or a curved interior/exterior surface of a car.

Figure 20A:
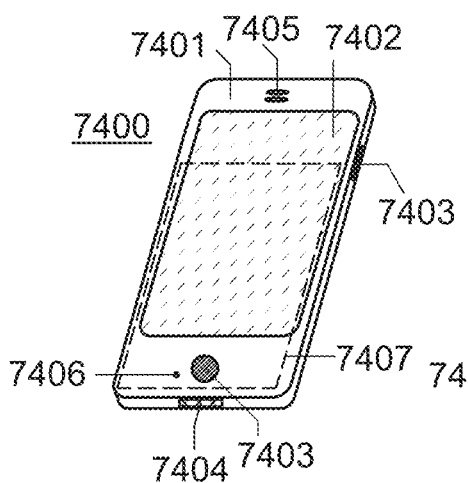
FIGS. 20A to 20G illustrate examples of electronic devices.

FIG. 20A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 20B:
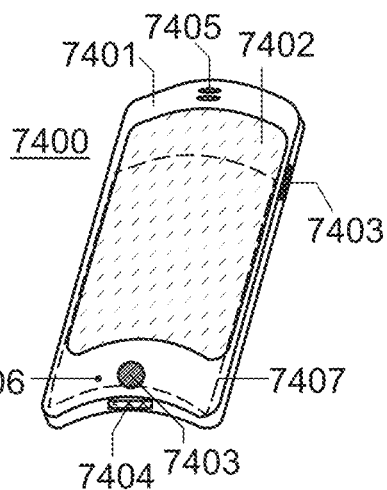
Figure 20C:
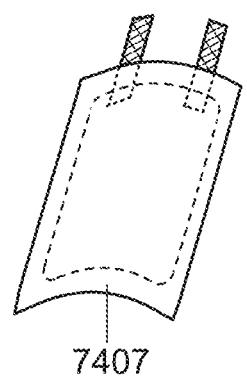

FIG. 20B illustrates the mobile phone 7400 that is bent. When the whole mobile phone 7400 is bent by the external force, the power storage device 7407 included in the mobile phone 7400 is also bent. FIG. 20C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409.

Figure 20D:
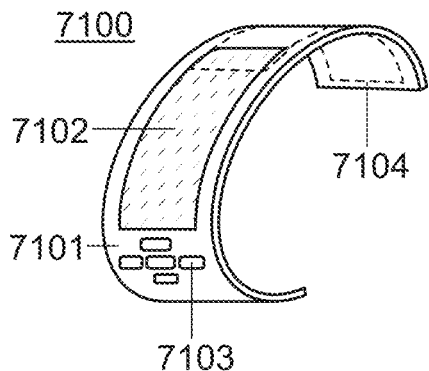
Figure 20E:
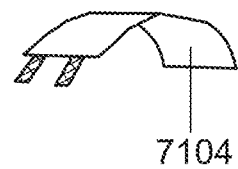

FIG. 20D illustrates an example of a bangle display device. A portable display device 7100 includes a housing 7101, a display portion 7102, an operation button 7103, and a power storage device 7104. FIG. 20E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 20F:
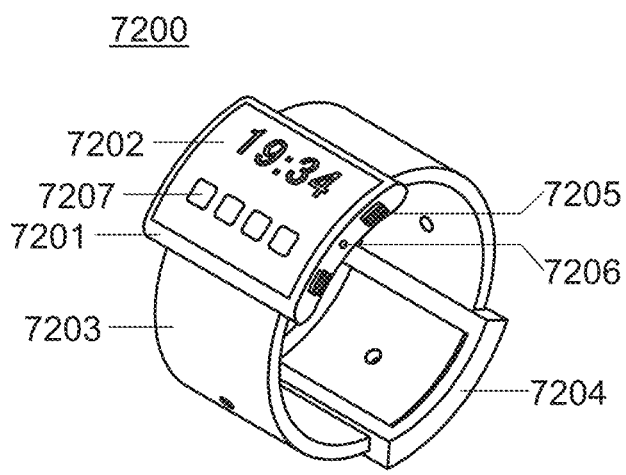

FIG. 20F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode member of one embodiment of the present invention. For example, the power storage device 7104 illustrated in FIG. 20E that is in the state of being curved can be provided in the housing 7201. Alternatively, the power storage device 7104 illustrated in FIG. 20E can be provided in the band 7203 such that it can be curved.

Figure 20G:
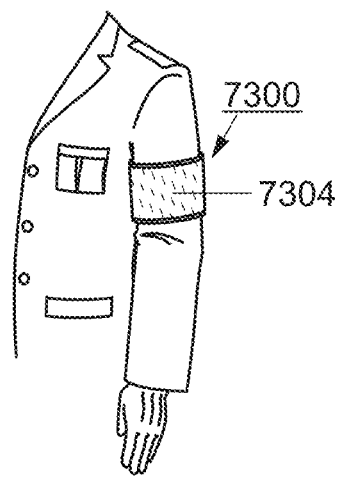

FIG. 20G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 4

In this embodiment, examples of electronic devices that can include power storage devices will be described.

Figure 21A:
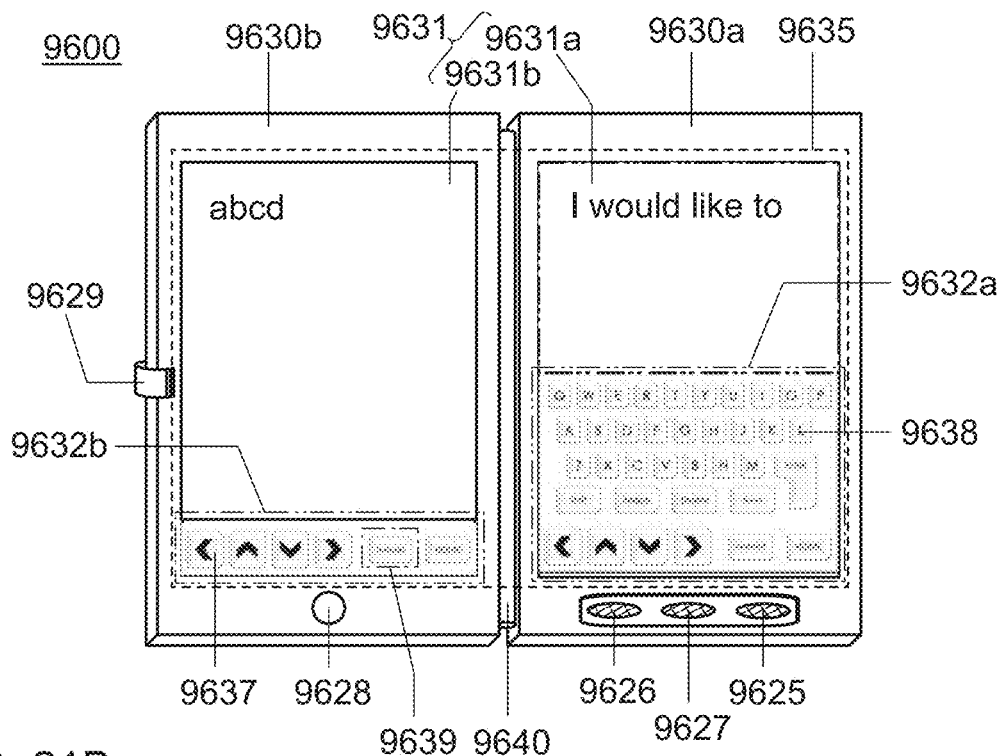
FIGS. 21A to 21C illustrate an example of an electronic device.
Figure 21B:
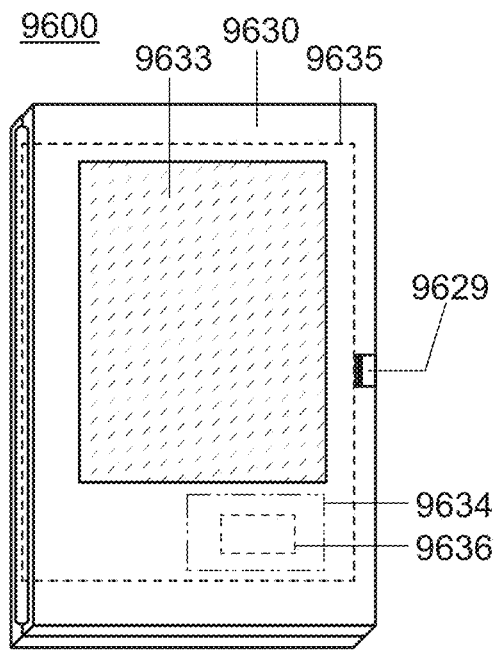

FIGS. 21A and 21B illustrate an example of a tablet terminal that can be folded in half. A tablet terminal 9600 illustrated in FIGS. 21A and 21B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 21A illustrates the tablet terminal 9600 that is opened, and FIG. 21B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a, and data can be input by touching operation keys 9638 that are displayed. Note that FIG. 21A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 21A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 21B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 21A and 21B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630, so that the power storage unit 9635 can be charged efficiently. The use of a lithium-ion battery as the power storage unit 9635 brings an advantage such as reduction in size.

Figure 21C:
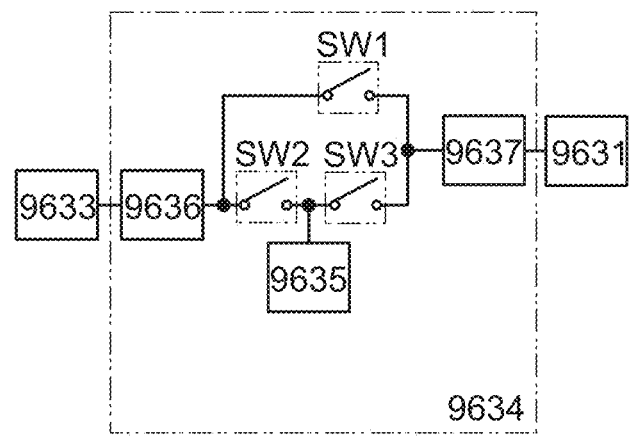

The structure and operation of the charge and discharge control circuit 9634 illustrated in FIG. 21B will be described with reference to a block diagram in FIG. 21C. The solar cell 9633, the power storage unit 9635, the DCDC converter 9636, a converter 9637, switches SW1 to SW3, and the display portion 9631 are illustrated in FIG. 21C, and the power storage unit 9635, the DCDC converter 9636, the converter 9637, and the switches SW1 to SW3 correspond to the charge and discharge control circuit 9634 in FIG. 21B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 operates with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 22:
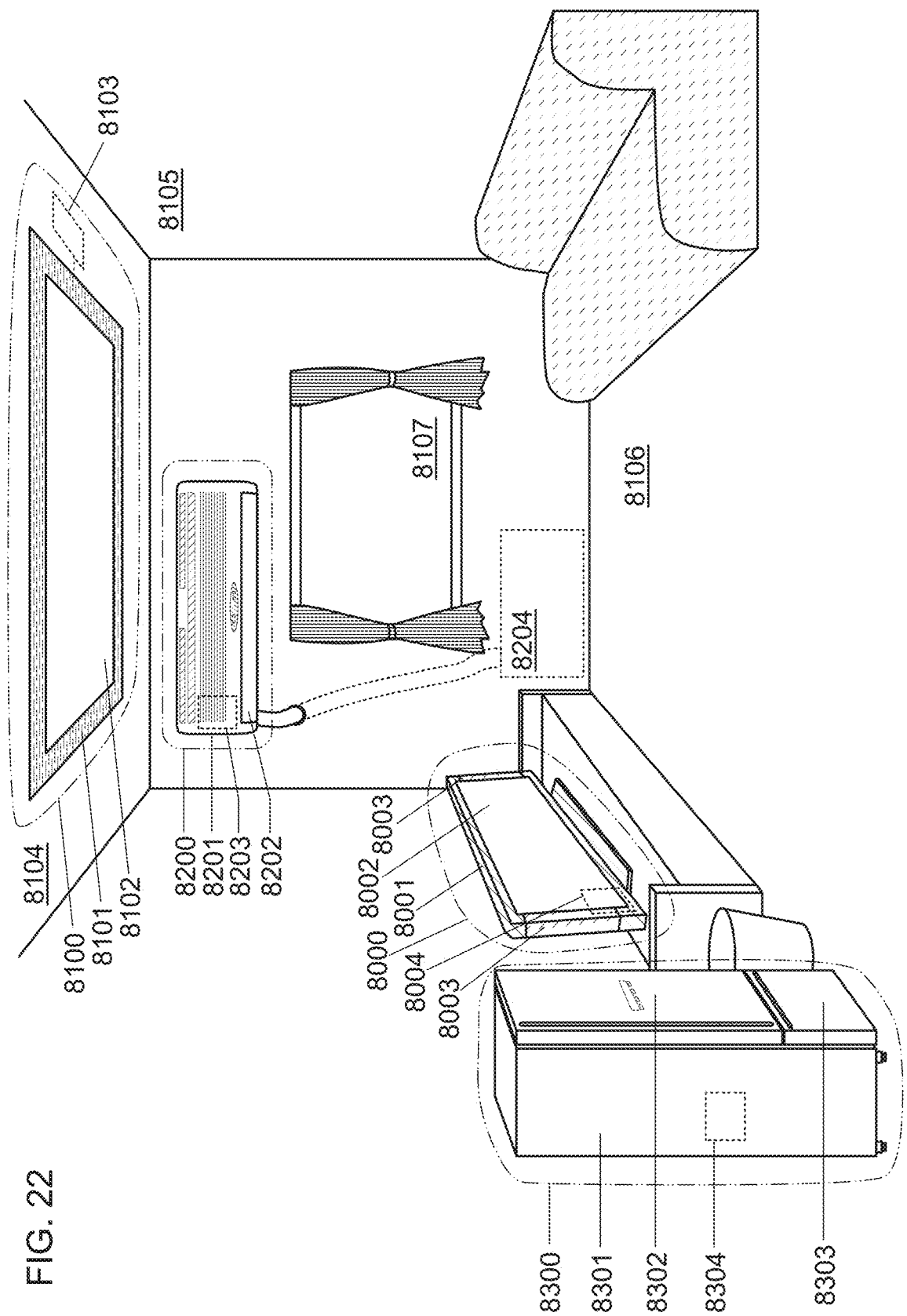
FIG. 22 illustrates examples of electronic devices.

FIG. 22 illustrates other examples of electronic devices. In FIG. 22, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 22, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 22 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 22 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 22, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 22 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 22 as an example, the power storage device of one embodiment of the present invention can be used in an air conditioner in which the functions of an indoor unit and an outdoor unit are integrated in one housing.

In FIG. 22, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, and the power storage device 8304. The power storage device 8304 is provided in the housing 8301 in FIG. 22. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can operate with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in nighttime when the temperature is low and the refrigerator door 8302 and the freezer door 8303 are not often opened or closed. On the other hand, in daytime when the temperature is high and the refrigerator door 8302 and the freezer door 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 5

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 23A:
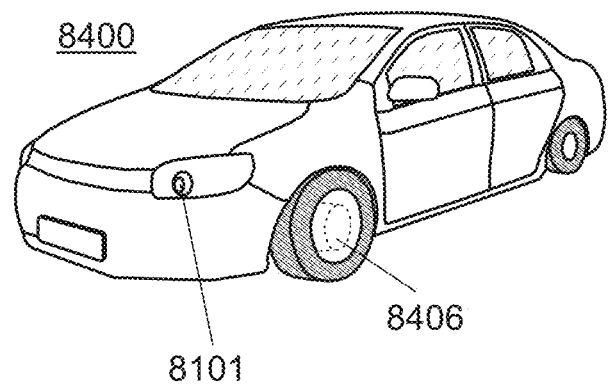
FIGS. 23A and 23B illustrate examples of electronic devices.
Figure 23B:
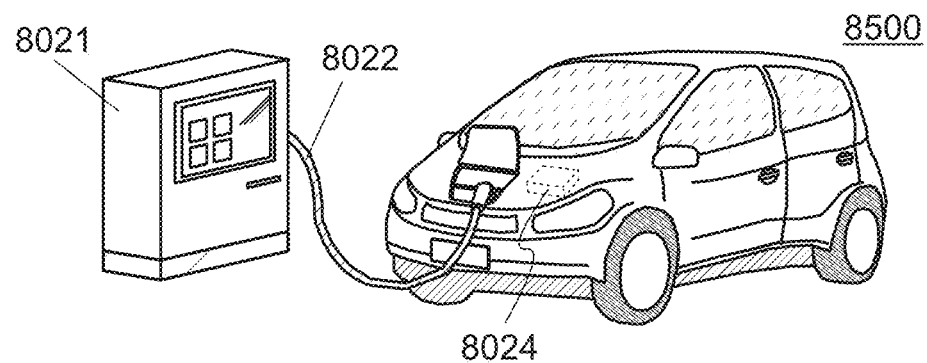

FIGS. 23A and 23B each illustrate an example of a vehicle using one embodiment of the present invention. An automobile 8400 illustrated in FIG. 23A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving an electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 23B illustrates an automobile 8500 including a power storage device 8024. The automobile 8500 can be charged when the power storage device 8024 is supplied with electric power through external charging equipment by a plug-in system, a contactless power feeding system, or the like. In FIG. 23B, the power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Embodiment 6

A battery management unit (BMU) which can be combined with a battery cell including the material described in the above embodiment and a transistor suitable for a circuit included in the battery management unit are described with reference to FIG. 24, FIGS. 25A to 25C, FIG. 26, FIG. 27, FIGS. 28A to 28C, FIG. 29, and FIG. 30. In this embodiment, a battery management unit of a power storage device including battery cells that are connected in series is particularly described.

When a plurality of battery cells connected in series are charged and discharged repeatedly, each battery cell has different capacity (output voltage) from one another due to the variation in charge and discharge characteristics among the battery cells. A discharge capacity of all of the plurality of battery cells connected in series depends on a battery cell with small capacity. The variation in capacities among the battery cells reduces the capacity of the all the battery cells at the time of discharging. Charging based on a battery cell with small capacity may cause insufficient charging. Charging based on a battery cell with high capacity may cause overcharge.

Thus, the battery management unit of the power storage device including battery cells connected in series has a function of reducing variation in capacities among the battery cells which causes insufficient charging or overcharge. Although circuit structures for reducing variation in capacities among the battery cells include a resistive type, a capacitor type, and an inductor type, here, a circuit structure which can reduce variation in capacities among the battery cells using transistors with a low off-state current is explained as an example.

As the transistor with a low off-state current, a transistor including an oxide semiconductor in its channel formation region (an OS transistor) is preferably used. When an OS transistor with a low off-state current is used in the circuit of the battery management unit of the power storage device, the amount of electric charge leaking from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to 1/3 and less than or equal to 6, further preferably greater than or equal to 1 and less than or equal to 6, and $z_1/y_1$ is preferably greater than or equal to 1/3 and less than or equal to 6, further preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface over which the CAAC-OS film is formed (hereinafter, a surface over which the CAAC-OS film is formed is referred to as a formation surface) or of a top surface of the CAAC-OS film, and is arranged parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since an OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 24:
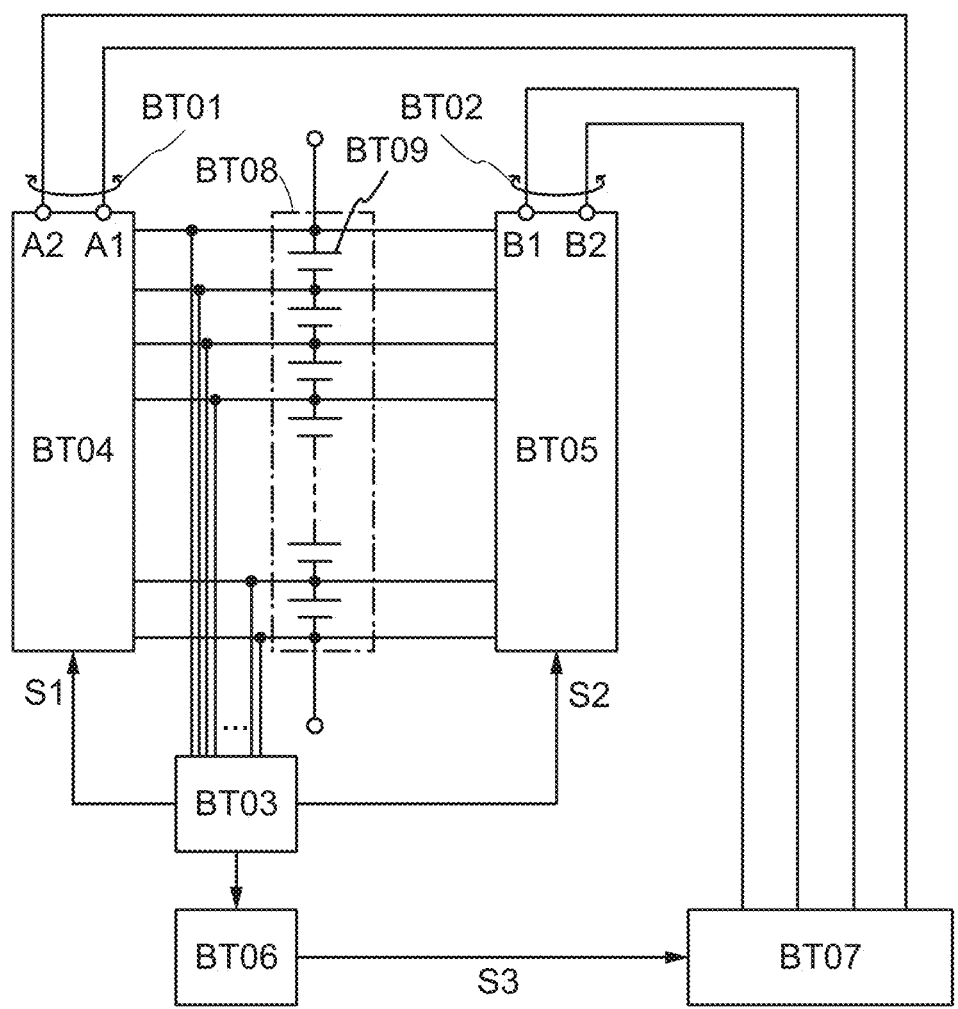
FIG. 24 is a block diagram illustrating one embodiment of the present invention.

FIG. 24 is an example of a block diagram of the power storage device. A power storage device BT00 illustrated in FIG. 24 includes a terminal pair BT01, a terminal pair BT02, a switching control circuit BT03, a switching circuit BT04, a switching circuit BT05, a voltage transformation control circuit BT06, a transformer circuit BT07, and a battery portion BT08 including a plurality of battery cells BT09 connected in series.

In the power storage device BT00 illustrated in FIG. 24, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BIOS so that the terminal pair BT02 and the charge battery cell group are connected.

The switching control circuit BT03 generates the control signal S1 and the control signal S2 on the basis of connection relation of the switching circuit BT04, the switching circuit BT05, and the voltage transformer circuit BT07 so that terminals having the same polarity are connected to each other in the terminal pair BT01 and the discharge battery cell group, or terminals having the same polarity are connected to each other in the terminal pair BT02 and the charge battery cell group.

An operation of the switching control circuit BT03 is described in detail.

First, the switching control circuit BT03 measures the voltage of each of the plurality of battery cells BT09. Then, the switching control circuit BT03 determines that a battery cell BT09 having a voltage higher than a predetermined threshold value is a high-voltage battery cell (high-voltage cell) and that a battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of a battery cell BT09 having the highest voltage or the lowest voltage among the plurality of battery cells BT09. In this case, the switching control circuit BT03 can determine whether each battery cell BT09 is a high-voltage cell or a low-voltage cell by determining whether or not a ratio of a voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are possibly mixed in various states in the plurality of battery cells BT09. The switching control circuit BT03 selects a portion having the largest number of consecutive high-voltage cells connected in series as the discharge battery cell group of mixed high-voltage cells and low-voltage cells, for example. Furthermore, the switching control circuit BT03 selects a portion having the largest number of consecutive low-voltage cells connected in series as the charge battery cell group. In addition, the switching control circuit BT03 may preferentially select battery cells BT09 which are nearly overcharged or overdischarged as the discharge battery cell group or the charge battery cell group.

Figure 25A:
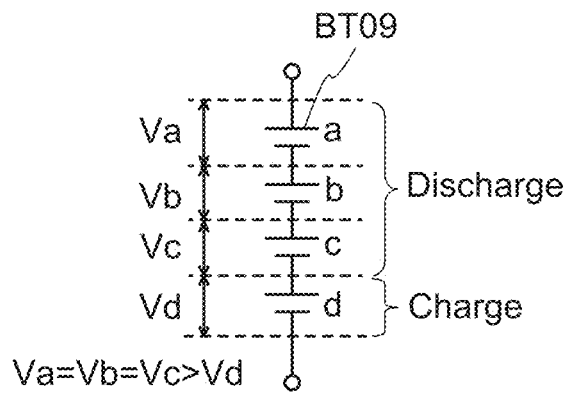
FIGS. 25A, 25B, and 25C are schematic views illustrating one embodiment of the present invention.
Figure 25B:
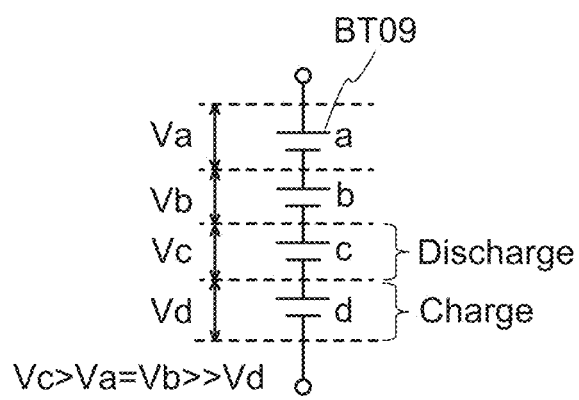
Figure 25C:
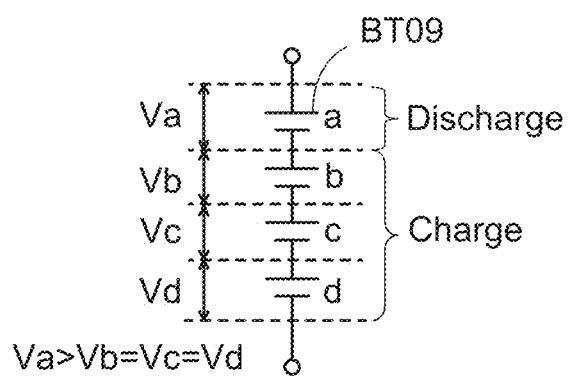

Here, operation examples of the switching control circuit BT03 in this embodiment are described with reference to FIGS. 25A to 25C. FIGS. 25A to 25C illustrate operation examples of the switching control circuit BT03. Note that FIGS. 25A to 25C each illustrate the case where four battery cells BT09 are connected in series as an example for convenience of explanation.

FIG. 25A shows the case where the relation of voltages Va, Vb, Vc, and Vd is Va=Vb=Vc>Vd where the voltages Va, Vb, Vc, and Vd are voltages of a battery cell a, a battery cell b, a battery cell c, and a battery cell d, respectively. That is, a series of three high-voltage cells a to c and a low-voltage cell d are connected in series. In that case, the switching control circuit BT03 selects the three consecutive high-voltage cells a to c as the discharge battery cell group. In addition, the switching control circuit BT03 selects the low-voltage cell d as the charge battery cell group.

Next, FIG. 25B shows the case where the relation of the voltages is Vc>Va=Vb>>Vd. That is, a series of two low-voltage cells a and b, one high-voltage cell c, and one low-voltage cell d which is nearly overdischarged are connected in series. In that case, the switching control circuit BT03 selects the high-voltage cell c as the discharge battery cell group. Since the low-voltage cell d is nearly overdischarged, the switching control circuit BT03 preferentially selects the low-voltage cell d as the charge battery cell group instead of the two consecutive low-voltage cells a and b.

Lastly, FIG. 25C shows the case where the relation of the voltages is Va>Vb=Vc=Vd. That is, one high-voltage cell a and a series of three low-voltage cells b to d are connected in series. In that case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 25A to 25C, the switching control circuit BT03 outputs the control signal S1 and the control signal S2 to the switching circuit BT04 and the switching circuit BT05, respectively. Information showing the discharge battery cell group being the connection destination of the switching circuit BT04 is set in the control signal S1. Information showing the charge battery cell group being a connection destination of the switching circuit BT05 is set in the control signal S2.

The above is the detailed description of the operation of the switching control circuit BT03.

The switching circuit BT04 sets the discharge battery cell group selected by the switching control circuit BT03 as the connection destination of the terminal pair BT01 in response to the control signal S1 output from the switching control circuit BT03.

The terminal pair BT01 includes a pair of terminals A1 and A2. The switching circuit BT04 sets the connection destination of the terminal pair BT01 by connecting one of the pair of terminals A1 and A2 to a positive electrode terminal of a battery cell BT09 positioned on the most upstream side (on the high potential side) of the discharge battery cell group, and the other to a negative electrode terminal of a battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the charge battery cell group selected by the switching control circuit BT03 as the connection destination of the terminal pair BT02 in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of a battery cell BT09 positioned on the most upstream side (on the high potential side) of the charge battery cell group, and the other to a negative electrode terminal of a battery cell BT09 positioned on the most downstream side (on the low potential side) of the charge battery cell group. Note that the switching circuit BT05 can recognize the position of the charge battery cell group on the basis of the information set in the control signal S2.

Figure 26:
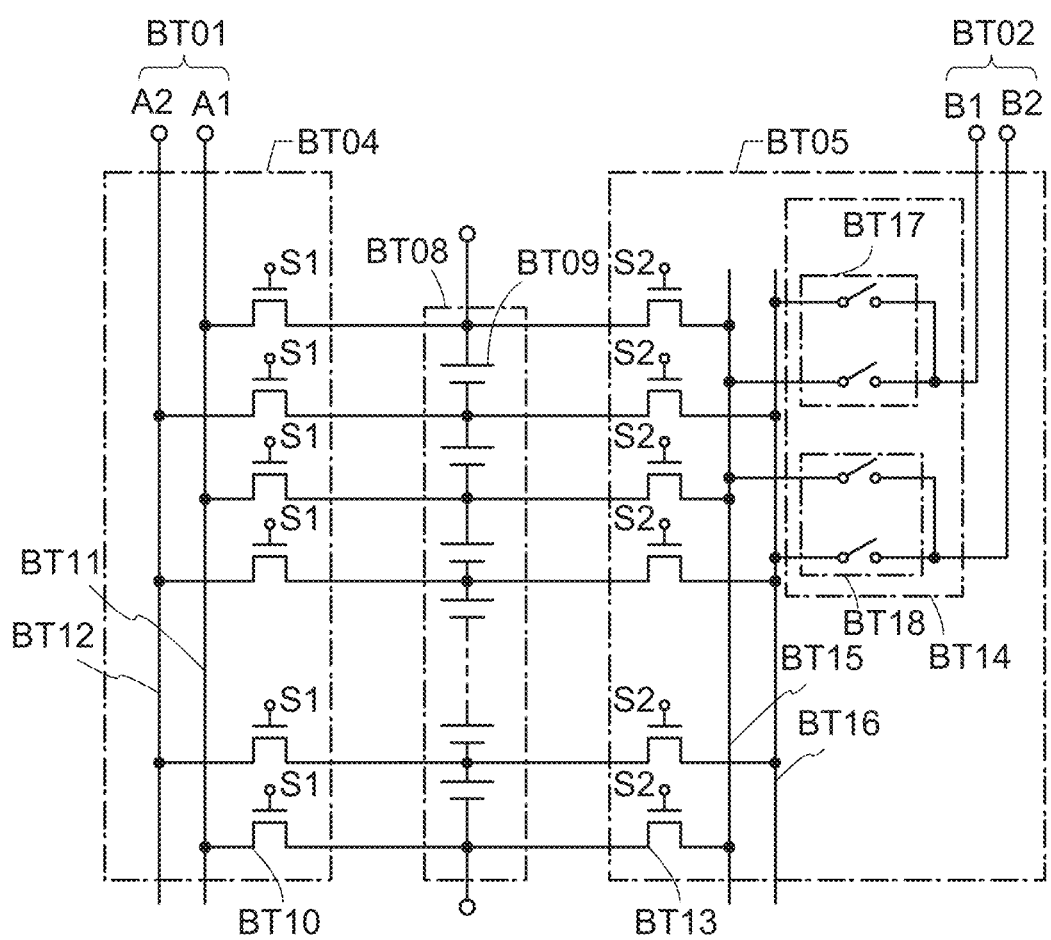
FIG. 26 is a circuit diagram illustrating one embodiment of the present invention.
Figure 27:
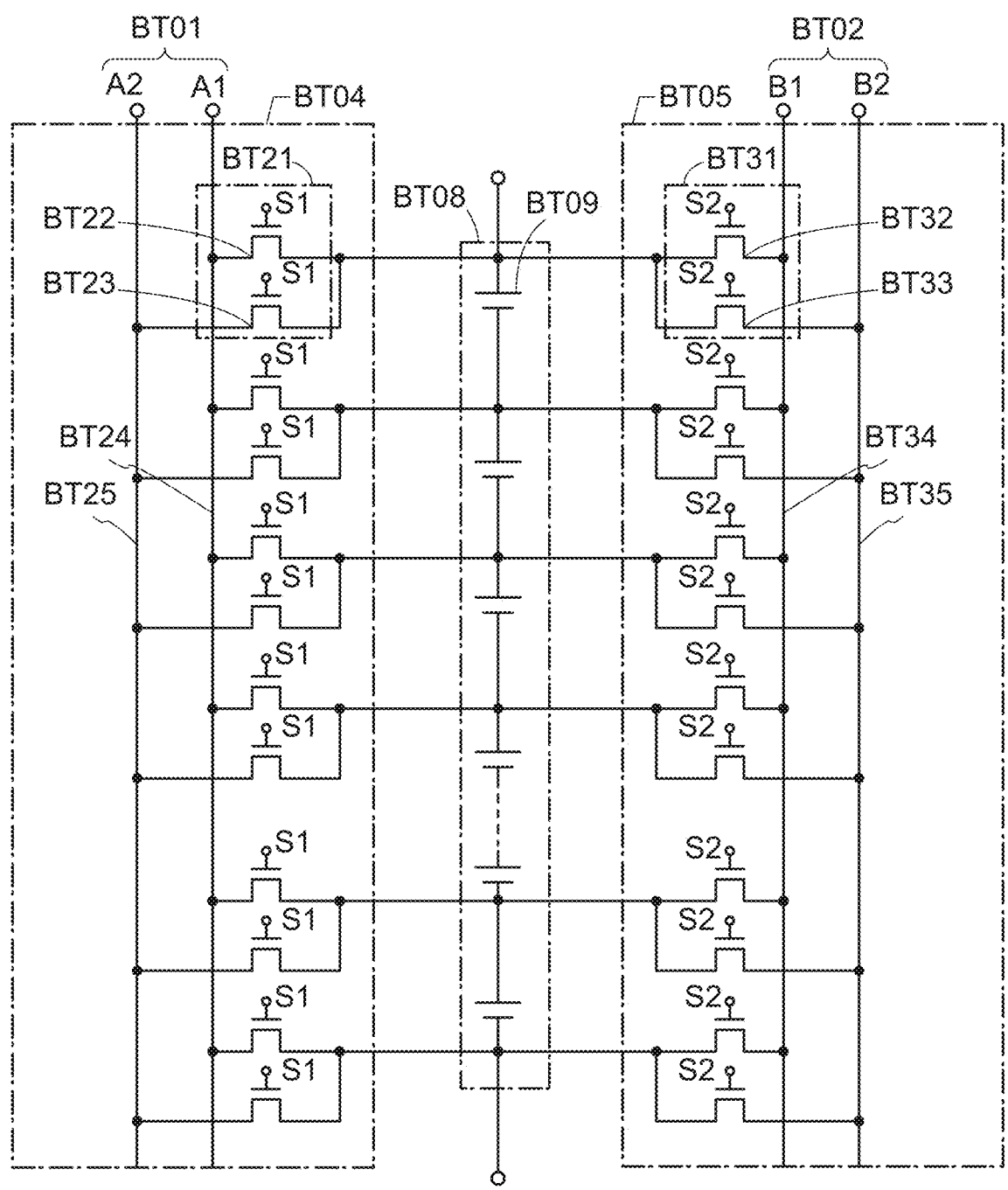
FIG. 27 is a circuit diagram illustrating one embodiment of the present invention.

FIG. 26 and FIG. 27 are circuit diagrams each showing a configuration example of the switching circuits BT04 and BT05.

In FIG. 26, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. Sources or drains which are not connected to the bus BT11 and the bus BT12 of the plurality of transistors BT10 are each connected between two adjacent battery cells BT09.

A source or a drain of a transistor BT10 which is not connected to the bus BT11 on the most upstream side of the plurality of transistors BT10 is connected to a positive electrode terminal of a battery cell BT09 on the most upstream side of the battery portion BT08. A source or a drain of a transistor BT10 which is not connected to the bus BT11 on the most downstream side of the plurality of transistors BT10 is connected to a negative electrode terminal of a battery cell BT09 on the most downstream side of the battery portion BT08.

The switching circuit BT04 connects the discharge battery cell group to the terminal pair BT01 by bringing one of the plurality of the transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of electric charge leaking from battery cells which do not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when an output voltage of the discharge battery cell group is high.

In FIG. 26, the switching circuit BIOS includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus 13116. Sources or drains which are not connected to the bus BT15 and the bus BT16 of the plurality of transistors BT13 are each connected between two adjacent battery cells BT09.

A source or a drain of a transistor BT13 which is not connected to the bus BT15 on the most upstream side of the plurality of transistors BT13 is connected to a positive electrode terminal of the battery cell BT09 on the most upstream side of the battery portion BT08. A source or a drain of a transistor BT13 which is not connected to the bus BT15 on the most downstream side of the plurality of transistors BT13 is connected to a negative electrode terminal of the battery cell BT09 on the most downstream side of the battery portion BT08.

An OS transistor is preferably used as the transistor BT13 like the transistors BT10. Since the off-state current of the OS transistor is low, the amount of electric charge leaking from the battery cells which do not belong to the charge battery cell group can be reduced, and reduction in capacity due to the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. One end of the switch pair BT17 is connected to the terminal B1. The other end of the switch pair BT17 extends from two switches. One switch is connected to the bus BT15, and the other switch is connected to the bus BT16. One end of the switch pair BT18 is connected to the terminal B2. The other end of the switch pair BT18 extends from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to a positive electrode terminal of a battery cell BT09 on the most upstream side of the charge battery cell group into an on state in response to the control signal S2 supplied to gates of the plurality of the transistors BT13. In addition, the switching circuit BT05 brings a transistor BT13 connected to a negative electrode terminal of a battery cell BT09 on the most downstream side of the charge battery cell group into an on state in response to the control signal S2 supplied to gates of the plurality of the transistors BT13.

The polarities of voltages applied to the terminal pair BT02 can vary in accordance with the connection structures of the discharge battery cell group connected to the terminal pair BT01 and the voltage transformer circuit BT07. In order to supply current in a direction for charging the charge battery cell group, terminals with the same polarity are required to be connected to each other in the terminal pair BT02 and the charge battery cell group. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode is described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off.

In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity are connected to each other in the terminal pair BT02 and the charge battery cell group. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows to the charge battery cell group from the terminal pair BT02.

FIG. 27 is a circuit diagram illustrating structure examples of the switching circuit BT04 and the switching circuit BT05 which are different from those of FIG. 26.

In FIG. 27, the switching circuit BT04 includes a plurality of transistor pairs BT21, a bus BT24, and a bus BT25. The bus BT24 is connected to the terminal A1. The bus BT25 is connected to the terminal A2. One ends of the plurality of transistor pairs BT21 extend from transistors BT22 and transistors BT23. Sources or drains of the transistors B122 are connected to the bus BT24. Sources or drains of the transistors BT23 are connected to the bus BT25. In addition, the other ends of the plurality of the transistor pairs BT21 are each connected between two adjacent battery cells BT09. The other end of the transistor pair BT21 on the most upstream side of the plurality of transistor pairs BT21 is connected to the positive electrode terminal of the battery cell BT09 on the most upstream side of the battery portion BT08. The other end of the transistor pair BT21 on the most downstream side of the plurality of transistor pairs BT21 is connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34 and a bus BT35. The bus BT34 is connected to the terminal B1. The bus BT35 is connected to the terminal B2. One ends of the plurality of transistor pairs BT31 extend from transistors BT32 and transistors BT33. One end extending from the transistor BT32 is connected to the bus BT34. One end extending from the transistor BT33 is connected to the bus BT35. The other ends of the plurality of the transistor pairs BT31 are each connected between two adjacent battery cells BT09. The other end of the transistor pair BT31 on the most upstream side of the plurality of transistor pairs BT31 is connected to a positive electrode terminal of a battery cell BT09 on the most upstream side of the battery portion BT08. The other end of the transistor pair BT31 on the most downstream side of the plurality of transistor pairs BT31 is connected to a negative electrode terminal of a battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor B133 is turned off, so that the connection destination of the transistor pair BT31 is the terminal B1. On the other hand, when the transistor B133 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the ease where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity are connected to each other in the terminal pair BT02 and the charge battery cell group. In addition, the current which flows from the terminal pair BT02 is controlled to be supplied in a direction for charging the charge battery cell group.

The voltage transformation control circuit BT06 controls operation of the voltage transformer circuit BT07. The voltage transformation control circuit BT06 generates a voltage transformation signal S3 for controlling the operation of the voltage transformer circuit BT07 on the basis of the number of battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a voltage necessary for charging the charge battery cell group needs to be secured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 28A:
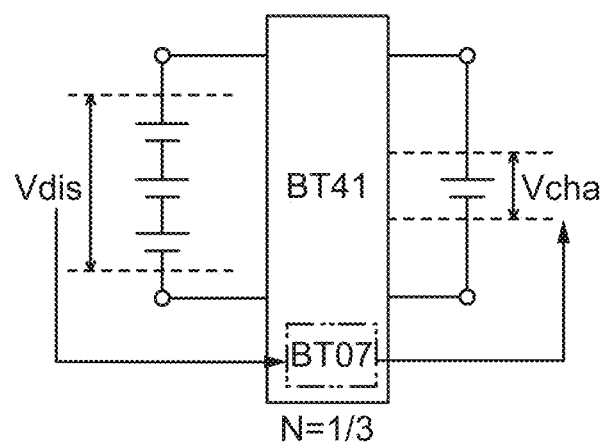
FIGS. 28A, 28B, and 28C are schematic views illustrating one embodiment of the present invention.
Figure 28B:
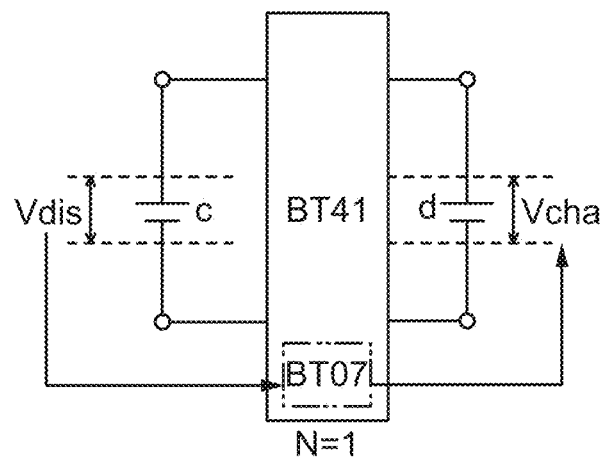
Figure 28C:
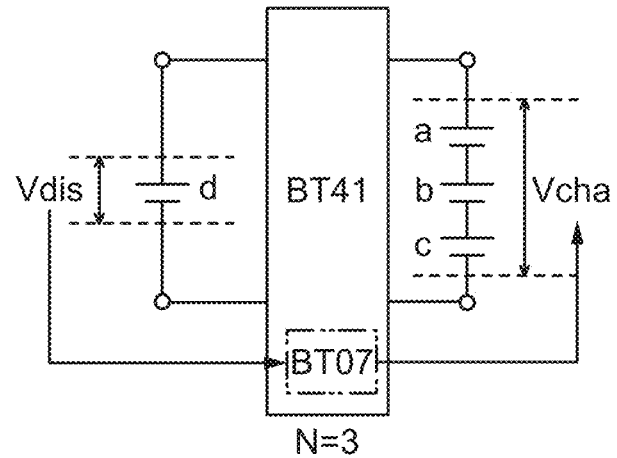

Here, an operation example of the voltage transformation control circuit BT06 in this embodiment is described with reference to FIGS. 28A to 28C. FIGS. 28A to 28C are conceptual diagrams for explaining the operation examples of the voltage transformation control circuit BT06 corresponding to the discharge battery cell group and the charge battery cell group described in FIGS. 25A to 25C. FIGS. 28A to 28C illustrate a battery management unit BT41. As described above, the battery management unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 28A, the series of three high-voltage cells a to c and one low-voltage cell d are connected in series as described in FIG. 25A. In that case, as described using FIG. 25A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) to the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, overvoltage may be applied to the battery cells BT09 included in the charge battery cell group through the terminal pair BT02. Thus, in the case of FIG. 28A, it is necessary that a charging voltage (Vcha) applied to the terminal pair BT02 be lowered than the discharging voltage. In addition, in order to charge the charge battery cell group, it is necessary that the charging voltage be larger than the total voltage of the battery cells BT09 included in the charge battery cell group. Thus, the voltage transformation control circuit BT06 sets the ratio N for raising or lowering voltage larger than the ratio of the number of the battery cells BT09 included in the charge battery cell group to the number of the battery cells BT09 included in the discharge battery cell group.

Thus, the voltage transformation control circuit BT06 preferably sets the ratio N for raising or lowering voltage larger than the ratio of the number of the battery cells BT09 included in the charge battery cell group to the number of the battery cells BT09 included in the discharge battery cell group by about 1% to 10%. Here, the charging voltage is made larger than the voltage of the charge battery cell group, but the charging voltage is equal to the voltage of the charge battery cell group in reality. Note that the voltage transformation control circuit BT06 feeds a current for charging the charge battery cell group in accordance with the ratio N for raising or lowering voltage in order to make the voltage of the charge battery cell group equal to the charging voltage. The value of the current is set in the voltage transformation control circuit BT06.

In the example illustrated in FIG. 28A, since the number of the battery cells BT09 included in the discharge battery cell group is three and the number of the battery cells BT09 included in the charge battery cell group is one, the voltage transformation control circuit BT06 calculates a value which is slightly larger than ⅓ as the ratio N for raising or lowering voltage. Then, the voltage transformation control circuit BT06 outputs the voltage transformation signal S3, which lowers the discharging voltage in accordance with the ratio N for raising or lowering voltage and converting the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 28B and 28C, the ratio N for raising or lowering voltage is calculated in a manner similar to that of FIG. 28A. In each of the examples illustrated in FIGS. 28B and 28C, since the number of the battery cells BT09 included in the discharge battery cell group is less than or equal to the number of the battery cells BT09 included in the charge battery cell group, the ratio N for raising or lowering voltage is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage on the basis of the voltage transformation signal S3. The voltage transformer circuit BT07 applies the converted charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage on the basis of the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 29:
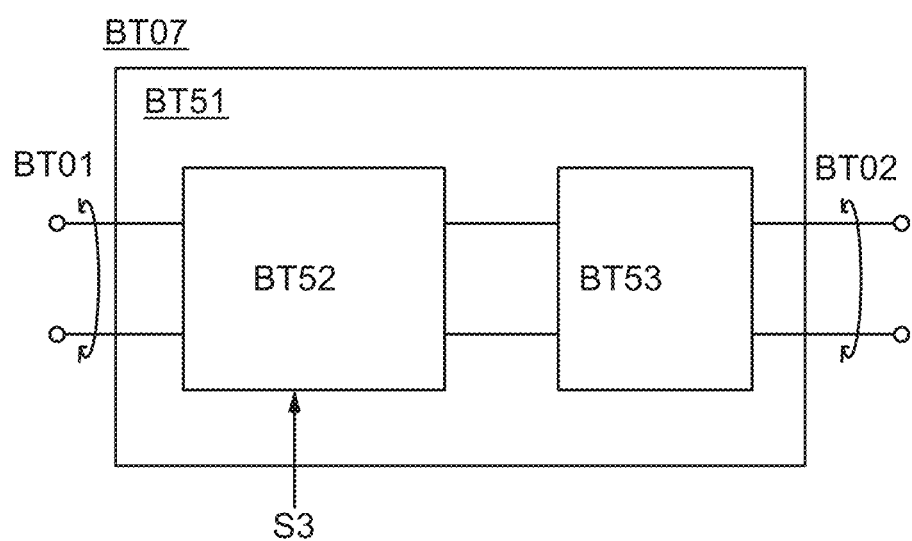
FIG. 29 is a block diagram illustrating one embodiment of the present invention.

The structure of the voltage transformer circuit BT07 including the insulated DC-DC converter is illustrated in FIG. 29. An insulated DC-DC converter BT51 includes a switch portion BT52 and a transformer BT53. The switch portion BT52 is a switch for switching on/off of the operation of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in accordance with the voltage transformation signal S3 controlling the on/off ratio which is output from the voltage transformation control circuit BT06. The switch portion BT52 can have various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 30:
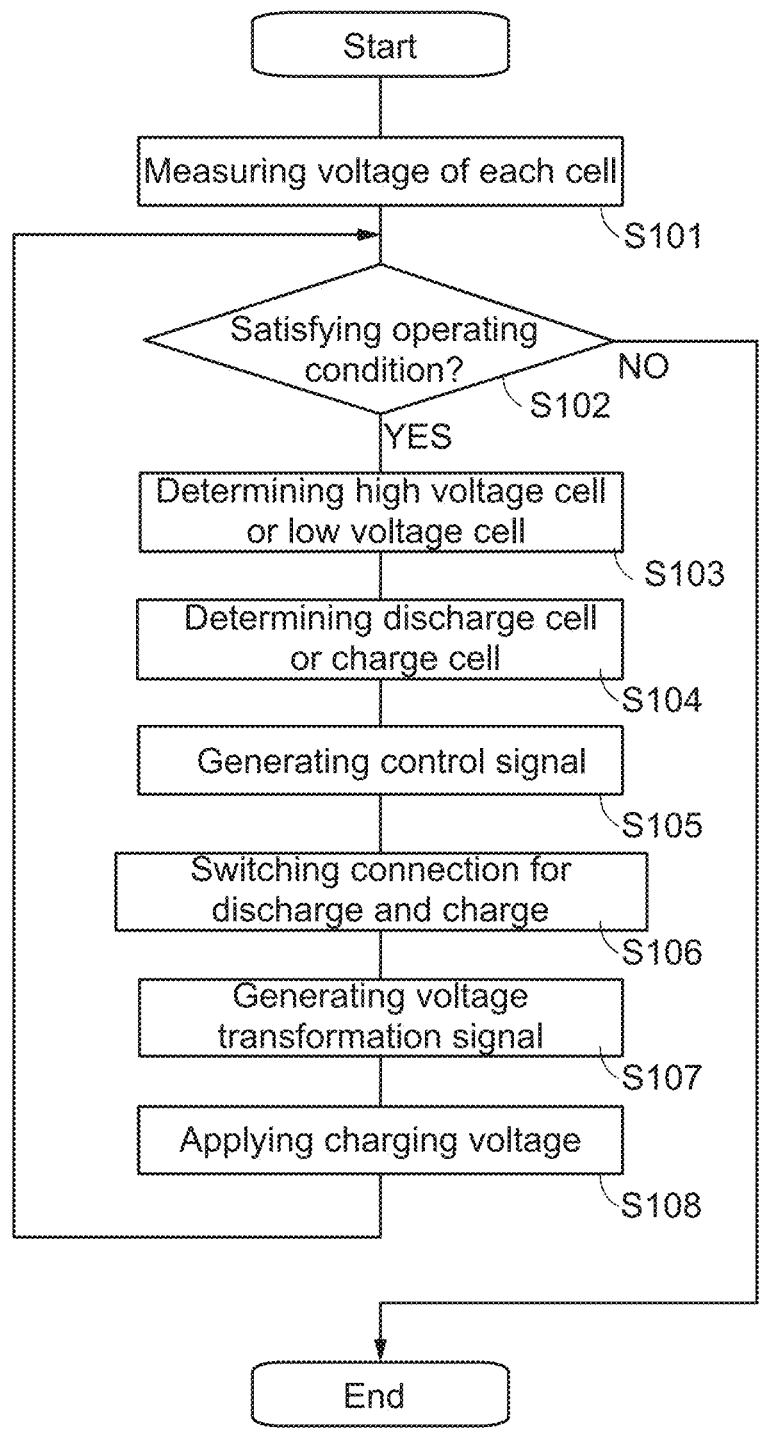
FIG. 30 is a flow chart illustrating one embodiment of the present invention.

A flow of operation of the power storage device BT00 in this embodiment is described with reference to FIG. 30. FIG. 30 is a flow chart illustrating the flow of the operation of the power storage device BT00.

First, the power storage device BT00 obtains a voltage measured for each of the plurality of battery cells BT09 (step S101). Then, the power storage device BT00 determines whether or not the condition for starting the operation of reducing variation in voltages of the plurality of the battery cells BT09 is satisfied (step S102). An example of the condition can be that the difference between the maximum value and the minimum value of the voltage measured for each of the plurality of the battery cells BT09 is higher than or equal to the predetermined threshold value. In the case where the condition is not satisfied (step S102: NO), the power storage device BT00 does not perform the following operation because voltages of the battery cells 13109 are well balanced. In contrast, in the case where the condition is satisfied (step S102: YES), the power storage device BT00 performs the operation of suppressing variation in the voltages of the battery cells BT09. In this operation, the power storage device BT00 determines whether each battery cell BT09 is a high voltage cell or a low voltage cell on the basis of the measured voltage of each cell (step S103). Then, the power storage device BT00 determines a discharge battery cell group and a charge battery cell group on the basis of the determination result (step S104). In addition, the power storage device BT00 generates the control signal S1 for setting the determined discharge battery cell group as the connection destination of the terminal pair BT01, and the control signal S2 for setting the determined charge battery cell group as the connection destination of the terminal pair BT02 (step S105). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S106). The power storage device BT00 generates the voltage transformation signal S3 based on the number of battery cells BT09 included in the discharge battery cell group and the number of the battery cells BT09 included in the charge battery cell group (step S107). Then, the power storage device BT00 converts the discharging voltage applied to the terminal pair BT01 into a charging voltage based on the voltage transformation signal S3 and applies the charging voltage to the terminal pair BT02 (step S108). In this way, electric charge of the discharge battery cell group is transferred to the charge battery cell group.

Although the plurality of steps are shown in order in the flow chart of FIG. 30, the order of performing the steps is not limited to the order.

According to the above embodiment, when an electric charge is transferred from the discharge battery cell group to the charge battery cell group, a structure where an electric charge from the discharge battery cell group is temporarily stored, and the stored electric charge is sent to the charge battery cell group is unnecessary, unlike in the a capacitor type circuit. Accordingly, the charge transfer efficiency per unit time can be increased. In addition, the switching circuit BT04 and the switching circuit BT05 determine which battery cell in the discharge battery cell group and the charge battery cell group to be connected to the transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, even when any battery cell BT09 is selected as the discharge battery cell group and the charge battery cell group, an electric charge can be transferred without any problems.

Furthermore, the use of OS transistors as the transistor BT10 and the transistor BT13 can reduce the amount of electric charge leaking from the battery cells BT09 which do not belong to the charge battery cell group or the discharge battery cell group. Accordingly, a decrease in capacity of the battery cells BT09 which do not contribute to charging or discharging can be suppressed. In addition, the variation in characteristics of the OS transistor due to heat is smaller than that of an Si transistor. Accordingly, even when the temperature of the battery cells BT09 is increased, an operation such as turning on or off the transistors in response to the control signals S1 and S2 can be performed normally.

Example 1

In this example, a "particle containing a lithium-manganese composite oxide" of one embodiment of the present invention was formed, and characteristics thereof were evaluated. The formation process is described using the flow chart in FIG. 1.

<Synthesis>

The particle containing a lithium-manganese composite oxide was formed.

(Step S11)

First, $Li_2CO_3$, $MnCO_3$, and NiO were weighed as starting materials so that the ratio (molar ratio) of $Li_2CO_3$ to $MnCO_3$ and NiO became 0.84:0.8062:0.318.

(Step S12)

Ethanol was added to the starting materials. Then, ethanol and the starting materials were mixed for 30 minutes in a chamber of a bead mill rotating at a peripheral speed of 10 m/s to obtain a mixed material.

(Step S13)

Next, heat treatment was performed on the mixed material at 75° C. in an air atmosphere to evaporate ethanol contained in the mixed material, and a mixed material was obtained.

(Step S14)

Subsequently, the mixed material was put in a crucible and firing was performed at 1000° C. in a dry air atmosphere at a flow rate of 10 L/min for 10 hours, whereby a lithium-manganese composite oxide was synthesized.

(Step S15)

Then, crushing treatment was performed to separate sintered lithium-manganese composite oxide. After ethanol was added to the sintered lithium-manganese composite oxide, the crushing was performed for 4 hours in a chamber of a bead mill rotating at a peripheral speed of 12 m/s; as a result, a powdery lithium-manganese composite oxide was obtained.

(Step S16)

After that, heat treatment was performed on the lithium-manganese composite oxide subjected to the crushing treatment. The heat treatment was performed at 75° C. in an air atmosphere so that ethanol contained in the mixed material was evaporated. Next, the obtained lithium-manganese composite oxide was put in a crucible and firing was performed at 800° C. in a dry air atmosphere at 10 L/min. for 3 hours. The resulting powder is referred to as a sample A. Although the sample A is represented by a composition formula $Li_{1.68}Mn_{0.8062}Ni_{0.318}O_3$, the composition of the sample A might be different from this.

<Coating Layer>

Next, a layer containing carbon was formed on the sample A. To 0.1 g of graphene oxide, 1 g of water was added. The water and the graphene oxide were mixed in a mixer to form a dispersion solution of the graphene oxide. Five-minute mixing was performed at 2000 rpm four times. In the first mixing, 3/10 of the water was used, another 3/10 of the water was added in the second mixing, another 3/10 of the water was added in the third mixing, and 1/10 of the water was added in the fourth mixing.

(Step S17)

Then, 5 g of the sample A and 1.1 g of water were put in the formed dispersion solution, and the mixture was kneaded four times. Five-minute kneading was performed at 2000 rpm in a mixer. The obtained mixture was dried under a reduced pressure in a bell jar at 50° C. and then ground in an alumina mortar, so that a sample B (lithium manganese composite oxide coated with graphene oxide) was obtained.

(Step S18)

Then, the graphene oxide coating the surface of the lithium manganese composite oxide was reduced. Ascorbic acid was used as a reducing agent, and a mixed solution of ethanol and water was used as a solvent. In the mixed solution, the concentration of ethanol was 80 vol %. A reducing solution was formed by adding 16.87 wt % of the ascorbic acid and 3.9 wt % of lithium hydroxide, the weight percentages were with respect to the weight of the lithium-manganese composite oxides coated with graphene oxide. The obtained powder was put in the reducing solution, and reduction was performed at 60° C. for 3 hours.

(Step S19)

Then, the obtained solution was filtered by suction filtration. For the filtration, filter paper with a particle retention capability of 1 μm was used. After that, washing and another filtration were performed.

Then, the powder obtained by the filtration was ground in a mortar. After that, drying was performed at 170° C. under a reduced pressure for 10 hours.

Through the above steps, a powdery lithium-manganese composite oxide (sample C) in which graphene was formed on a surface was formed.

<Manufacture of Electrode>

Next, an electrode was manufactured using the obtained sample C. The sample C was used as an active material, acetylene black (AB) was used as a conductive additive, and PVdF was used as a binder.

First, PVdF and AB were mixed with N-methyl-2-pyrrolidone (NMP) which was a polar solvent. Note that five-minute mixing was performed at 2000 rpm. Then, the sample C was added as an active material and five-minute mixing was performed at 2000 rpm five times. After that, NMP was added and ten-minute mixing was performed at 2000 rpm twice. Through the above steps, a slurry electrode binder composition was obtained. The compounding ratio of the sample C to AB and PVdF in the electrode binder composition was 90:5:5 (weight ratio).

Next, the electrode binder composition was applied to aluminum foil which was a current collector. Note that a surface of the aluminum foil was covered with an undercoat in advance. After that, drying was performed at 80° C. for 30 minutes in a circulation drying furnace.

Then, the electrode was pressed with a roller press machine while the press pressure was adjusted so that the thickness after application of the electrode was reduced by 20%. The press temperature was 120° C.

After that, another heat treatment was performed at 270° C. under a reduced pressure atmosphere (1 kPa) for 10 hours. Through the above process, an electrode X including the "particle containing the lithium-manganese composite oxide" of one embodiment of the present invention was obtained.

<Half Cell Characteristics>

Next, a half cell was fabricated using the electrode X. For the cell, a coin cell was used. Lithium was used for a counter electrode of the half cell. An electrolytic solution was formed by dissolving $LiPF_6$ as an electrolyte in a mixed solution containing EC and DEC, which are aprotic organic solvents, at a volume ratio of 1:1. As the separator, polypropylene (PP) was used.

Then, aging was performed on the fabricated half cell at 25° C. Specifically, constant current charging was performed at a rate of 0.1 C (current density of 30 mA/g) with a capacity of 150 mAh/g and constant current discharging was performed at a rate of 0.1 C with the lower voltage limit set to 2 V in the first cycle, constant current charging was performed at a rate of 0.1 C with a capacity of 180 mAh/g and constant current discharging was performed at a rate of 0.1 C with the lower voltage limit set to 2 V in the second cycle, constant current charging was performed at a rate of 0.1 C with a capacity of 210 mAh/g and constant current discharging was performed at a rate of 0.1 C with the lower voltage limit set to 2 V in the third cycle, constant current charging was performed at a rate of 0.1 C with a capacity of 240 mAh/g and constant current discharging was performed at a rate of 0.1 C with the lower voltage limit set to 2 V in the fourth cycle, and constant current charging was performed at a rate of 0.1 C with a capacity of 270 mAh/g and constant current discharging was performed at a rate of 0.1 C with the lower voltage limit set to 2 V in the fifth cycle.

Figure 31:
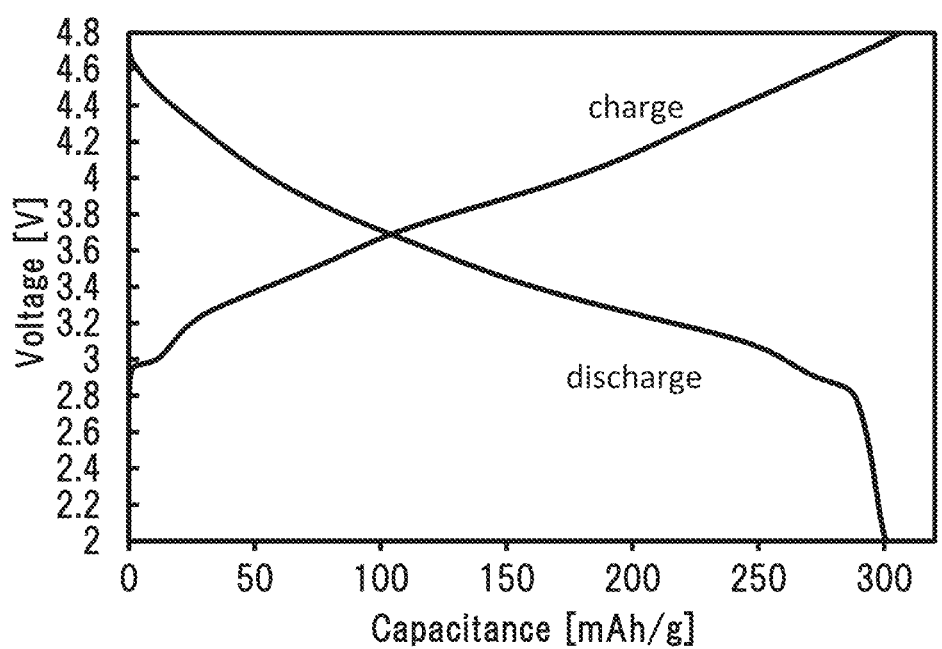
FIG. 31 is a graph showing charge and discharge characteristics.

The charge and discharge characteristics were measured at 25° C. after the above aging. Constant current charging was performed at a rate of 0.1 C with the upper voltage limit set to 4.8 V and constant current discharging was performed at a rate of 0.1 C with the lower voltage limit set to 2 V. FIG. 31 shows charge and discharge curves. The results show that a high discharge capacity higher than 300 mAh/g is achieved when the particle containing the lithium-manganese composite oxide of one embodiment of the present invention is used.

Example 2

In this example, the "particle containing a lithium-manganese composite oxide" of one embodiment of the present invention was evaluated by scanning transmission electron microscopy (STEM), energy dispersive x-ray spectroscopy (EDX), and a nanobeam electron diffraction method.

First, a sample H-1 and an electrode H-3 for observation were formed.

Step S11 to Step S17 shown in FIG. 1 were performed to obtain the sample H-1. Example 1 is referred to for conditions of each of Step S11 to Step S17.

The electrode H-3 was formed using a sample (sample H-2) obtained by performing Step S11 to Step S19 shown in FIG. 1. The formation conditions of the electrode X described in Example 1 is referred to for formation conditions of the electrode.

Figure 32A:
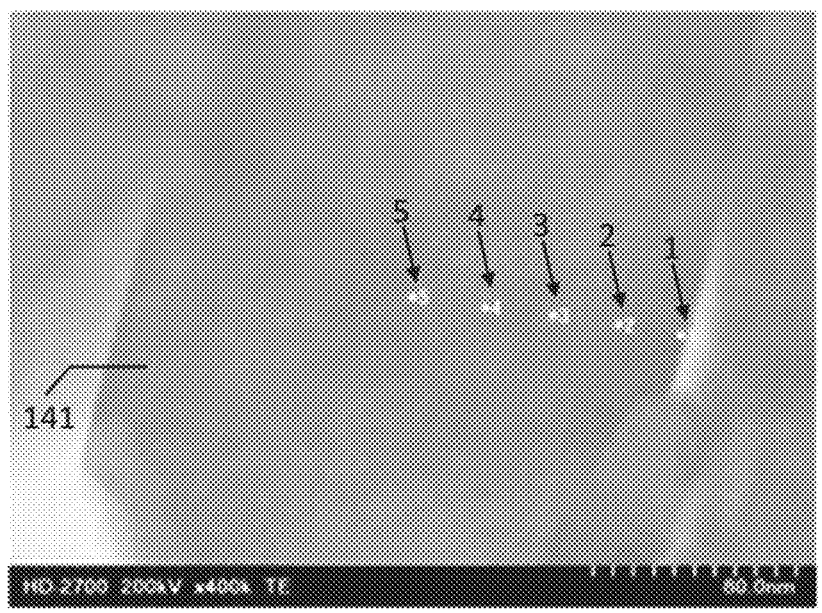
FIGS. 32A and 32B each illustrate a particle of one embodiment of the present invention.
Figure 32B:
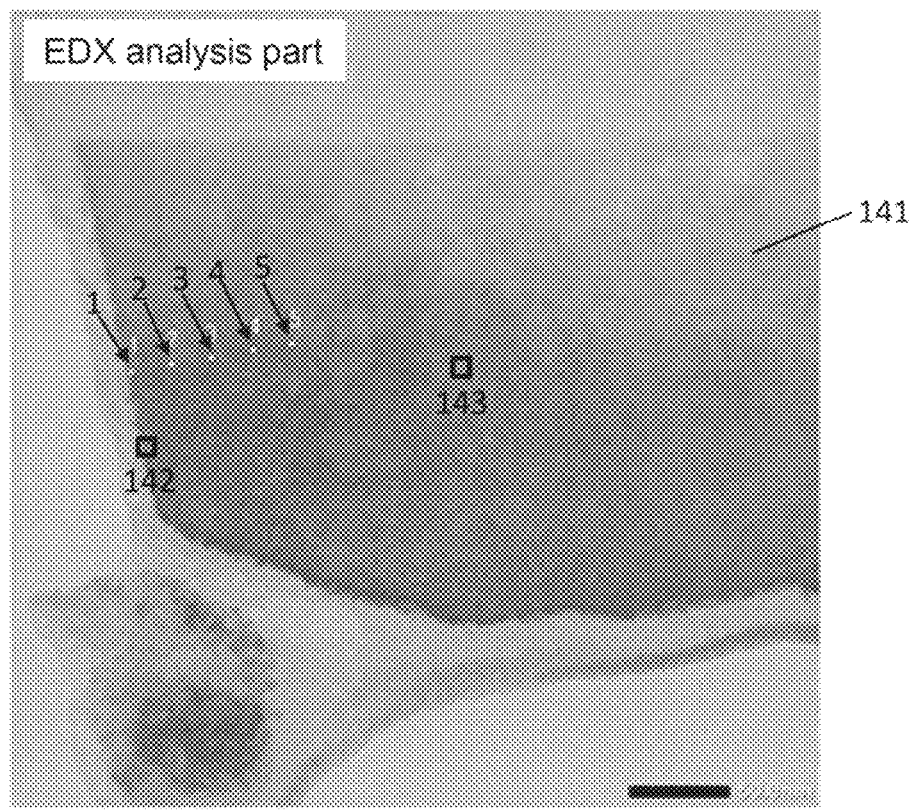

The sample H-1 and the electrode H-3 were sliced using a focused ion beam system (FIB) and then observation was performed by STEM. FIGS. 32A and 32B show TEM images. FIG. 32A shows the observation result of the sample H-1, and FIG. 32B shows the observation result of the electrode H-3. In each of FIGS. 32A and 32B, a cross section of a particle 141 containing the lithium-manganese composite oxide of one embodiment of the present invention was observed.

Next, points 1 to 5 shown in FIGS. 32A and 32B were evaluated by EDX. Table 1 shows the evaluation results of the sample H-1 and Table 2 shows the evaluation results of the electrode H-3. The distance from a surface of the particle to each measurement point is shown in Table 1 and Table 2. FIGS. 47A and 47B, FIGS. 48A and 48B, FIGS. 49A and 49B, FIGS. 50A and 50B, and FIGS. 51A and 51B show spectra of the measurement points. FIG. 47A, FIG. 47B, FIG. 48A, FIG. 48B, and FIG. 49A respectively show spectra of the measurement point 1, the measurement point 2, the measurement point 3, the measurement point 4, and the measurement point 5 of the sample H-1. FIG. 49B, FIG. 50A, FIG. 50B, FIG. 51A, and FIG. 51B respectively show spectra of the measurement point 1, the measurement point 2, the measurement point 3, the measurement point 4, and the measurement point 5 of the electrode H-3.

TABLE 1

| Measurement point | Distance from surface [nm] | Atomic porportion [atomic %] | | |
|---|---|---|---|---|
| | | O | Mn | Ni |
| 1 | 1.2 | 61.8 | 23.1 | 15.2 |
| 2 | 26 | 71 | 20.1 | 8.9 |
| 3 | 52 | 71.3 | 20.3 | 8.3 |
| 4 | 78 | 71 | 20.4 | 8.6 |
| 5 | 108 | 70.7 | 20.2 | 9.1 |

TABLE 2

| Measurement point | Distance from surface [nm] | Atomic proportion [atomic %] | | |
|---|---|---|---|---|
| | | O | Mn | Ni |
| 1 | 2.2 | 65.8 | 23.7 | 10.5 |
| 2 | 22 | 74.3 | 18.4 | 7.3 |
| 3 | 43 | 75.2 | 18.2 | 6.6 |
| 4 | 64 | 75.6 | 17.5 | 6.9 |
| 5 | 83 | 74.8 | 18.3 | 6.9 |

In Table 1 and Table 2, numerical values of atomic proportions were normalized so that the sum of the atomic proportions of manganese, nickel, and oxygen became approximately 100%.

Figure 33:
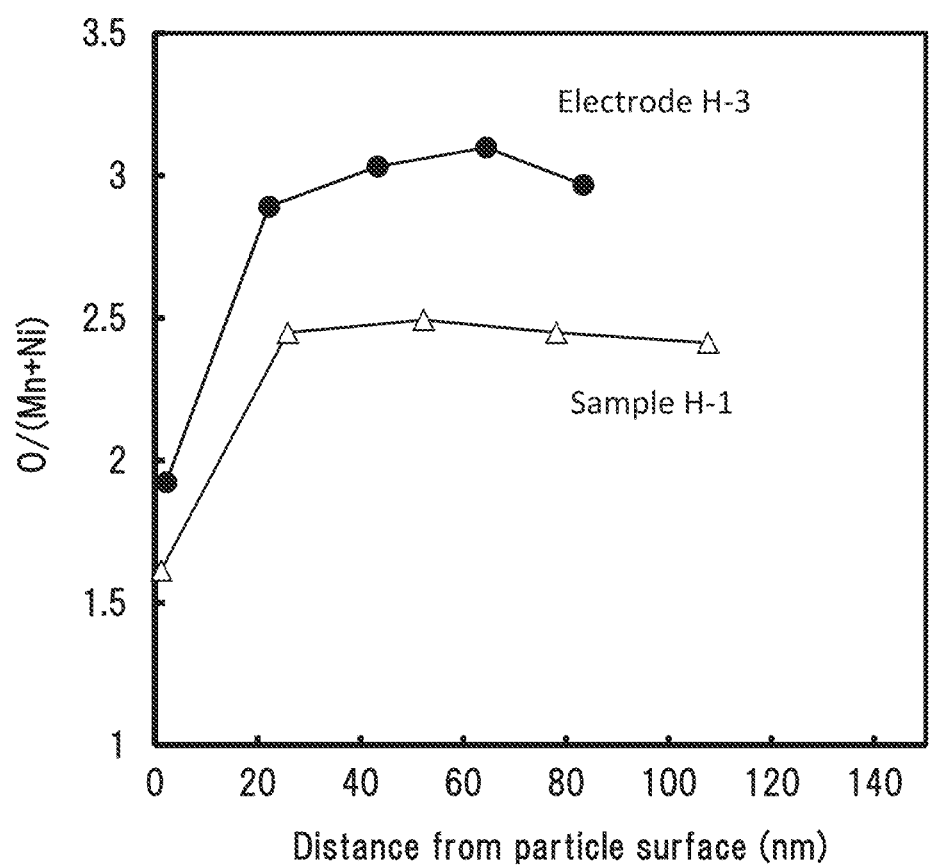
FIG. 33 shows EDX measurement results.

Next, a value of $d/(b+c)$ (=A) at each measurement point was calculated. Note that b, c, and d respectively represent the atomic proportions of manganese, nickel, and oxygen which were obtained by EDX. FIG. 33 shows a graph where, regarding the sample H-1 and the electrode H-3, the distance from the surface of the particle is plotted on the horizontal axis and a value of A is plotted on the vertical axis.

First, regions at a distance shorter than 10 nm from the surface are described. In the sample H-1, a value of A at a distance of 1.2 nm from the surface was 1.6. In the electrode H-3, a value of A at a distance of 2.2 nm from the surface was 1.9.

Next, regions at a distance longer than or equal to 20 nm from the surface are described. In the sample H-1, a value of A at a distance of 26 nm from the surface was 2.4, and each value of A at a distance longer than 26 nm from the surface was greater than 2.4. In the electrode H-3, a value of A at a distance of 22 nm from the surface was 2.9, and each value of A at a distance longer than 22 nm from the surface was greater than 2.9.

As described above, a value of A representing the ratio of oxygen atoms to the sum of manganese atoms and nickel atoms differs between a region in the vicinity of the surface and a region closer to the center of the particle than the region in the vicinity of the surface. The particle containing the lithium-manganese composite oxide of one embodiment of the present invention includes at least two regions differing in a value of A, and a value of A in the region closer to the surface is smaller than that of A in the other region in some cases.

A value of A in a region in the vicinity of the surface, e.g., a region at a distance shorter than 10 nm from the surface, is smaller than a value of A in the region closer to the center of the particle than the region in the vicinity of the surface, e.g., a region at a distance longer than or equal to 20 nm from the surface.

Figure 34A:
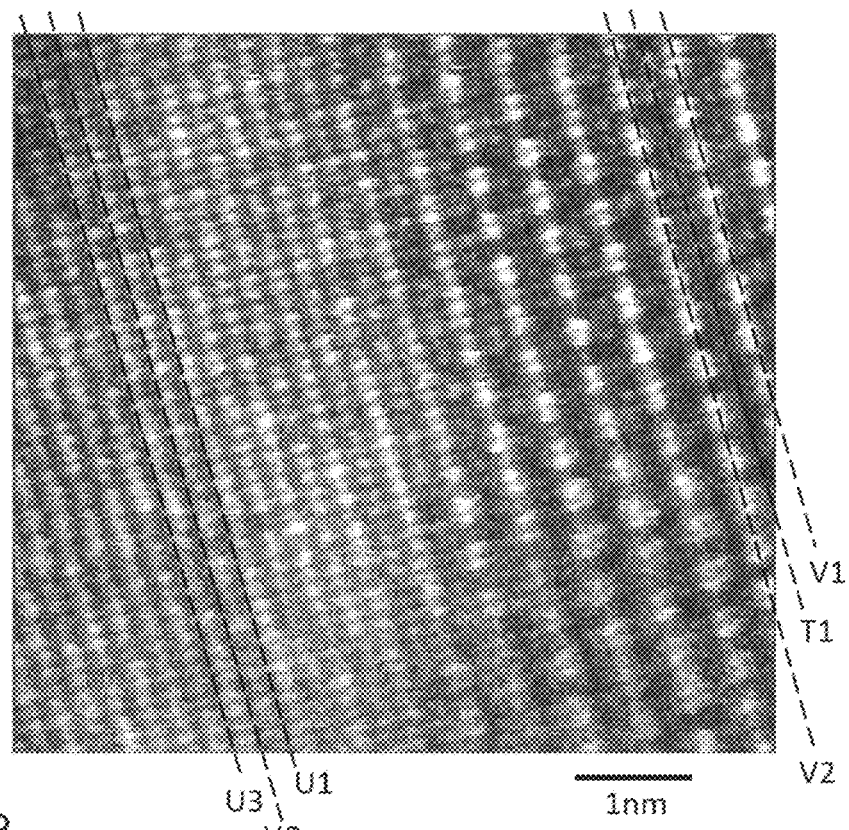
FIGS. 34A and 34B show HAADF-STEM observations.
Figure 34B:
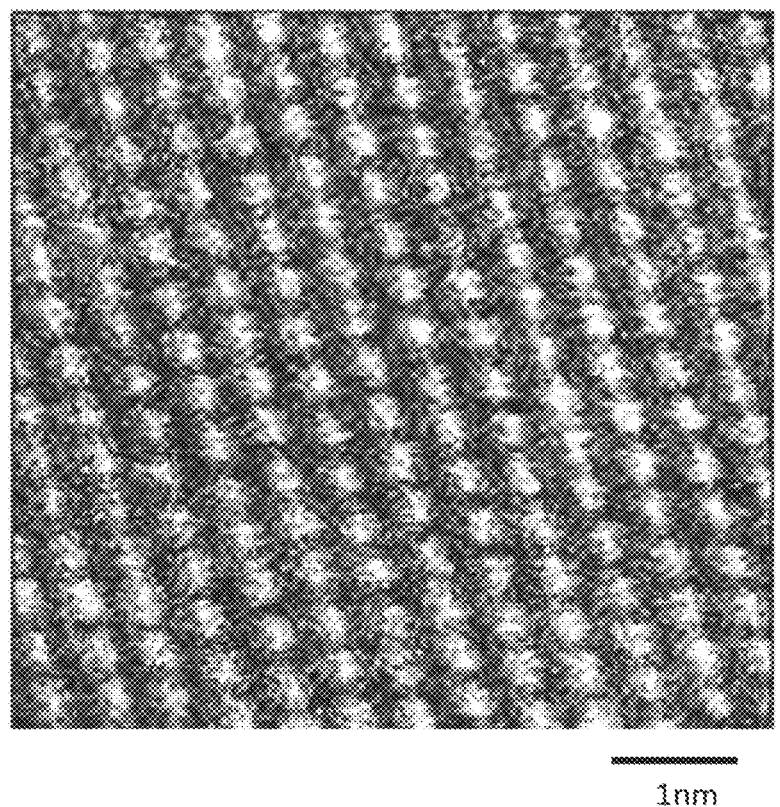

FIGS. 34A and 34B show images of the electrode H-3 which are obtained by high-angle annular dark field scanning transmission electron microscopy (HAADF-STEM). FIG. 34A shows the observation result of a region 142 surrounded by the solid line in FIG. 32B. FIG. 34B shows the observation result of a region 143 surrounded by the solid line in FIG. 32B. The HAADF-STEM images were obtained with a spherical aberration corrector function. Note that a combined analysis image of a bright-field image which is obtained by TEM analysis and a diffraction pattern is referred to as a high-resolution plan-view TEM image. Furthermore, a high-resolution TEM image obtained with a spherical aberration corrector function is particularly referred to as a Cs-corrected high-resolution TEM image. The Cs-corrected high-resolution TEM image was obtained using an atomic resolution analytical electron microscope JEM-ARM200F manufactured by JEOL Ltd. The accelerating voltage was 200 kV. In FIG. 34A, layers V1 and V2 formed of bright spots and a layer T1 formed of spots darker than those of the layers V1 and V2 and located between the layers V1 and V2 are shown in a region far from the surface of the particle. The distance between the layer V1 and the layer T1 is approximately equal to the distance between the layer T1 and the layer V2. Here, for example, lithium in the HAADF-STEM image appears darker than manganese and nickel because the atomic number of lithium is smaller than that of manganese and that of nickel. Therefore, for example, the layer T1 is probably a layer which mainly contains lithium and which is in a (001) plane in a layered rock-salt structure.

Next, layers U1 to U3 located in a region closer to the surface of the particle than the layers V1, V2, and T1 are described. The layers U1 to U3 are each formed of spots with approximately the same level of brightness. The distance between the layer U1 and the layer U3 is approximately the same as the distance between the layer V1 and the layer V2. Spots in the layer U2 located between the layers U1 and U3 appear brighter than those in the layer T1. Therefore, for example, there is a possibility that the atomic proportion of manganese or nickel in the layer U2 is larger than that in the layer T1.

Figure 35A:
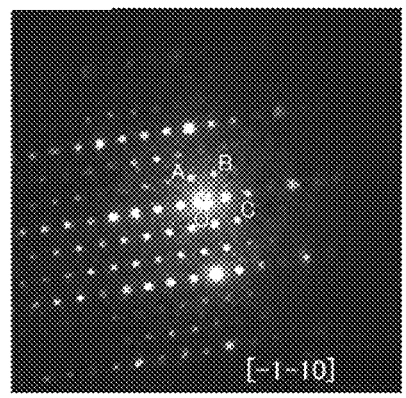
FIGS. 35A and 35B show electron diffraction patterns.
Figure 35B:
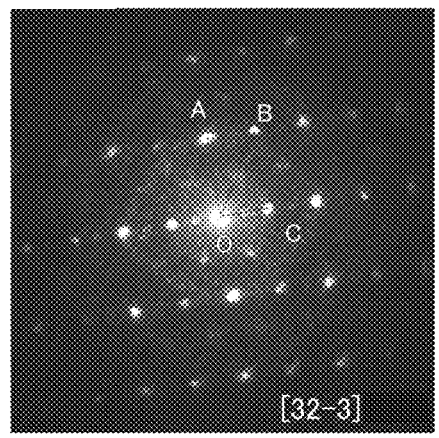
Figure 39:
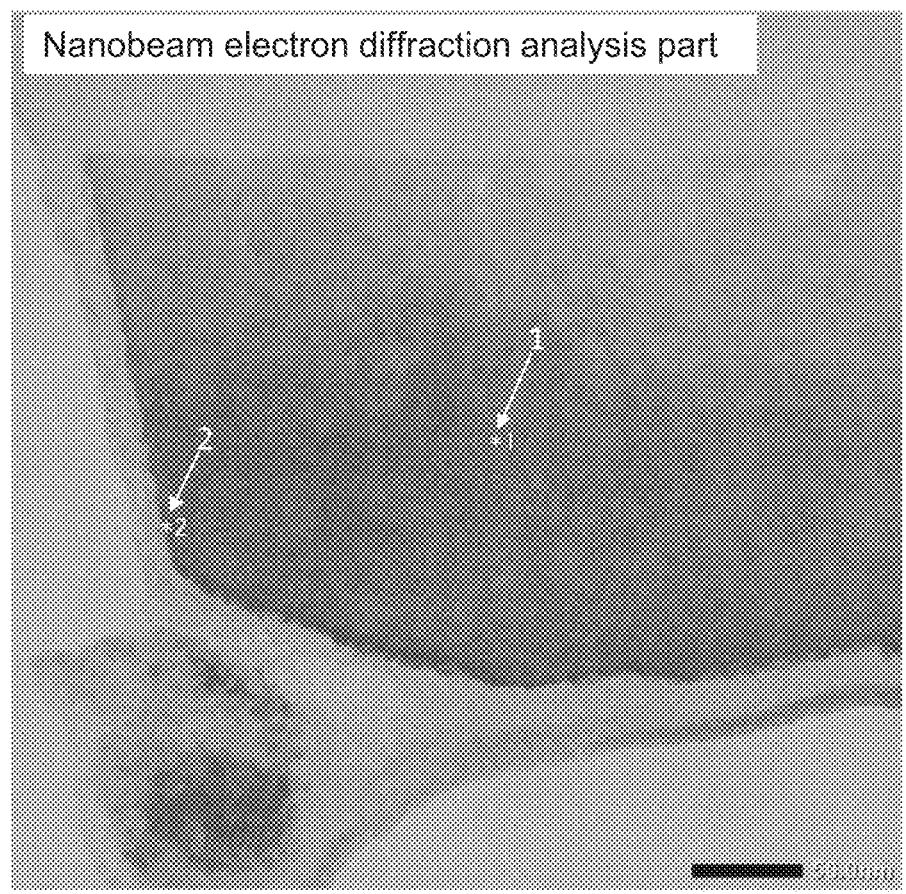
FIG. 39 shows an observation result obtained with a transmission electron microscope.

Next, a measurement point 1 (*1) and a measurement point 2 (*2) in a TEM image shown in FIG. 39 were evaluated by nanobeam electron diffraction. The measurement point 2 shown in FIG. 39 is in a region at a distance shorter than or equal to 10 nm from the surface of the particle and is closer to the surface of the particle than the measurement point 1. The measurement point 1 is in a region closer to the center of the particle than the measurement point 2 is. FIGS. 35A and 35B show nanobeam electron diffraction results of the measurement points. FIG. 35A shows the nanobeam electron diffraction result of the measurement point 1 in FIG. 39, and FIG. 35B shows the nanobeam electron diffraction result of the measurement point 2 in FIG. 39.

Measured values concerning positional relations (distances and angles) between spots in each obtained diffraction pattern correspond well with values concerning positional relations in a crystal structure of $Li_2MnO_3$ in JCPDS card No. 84-1634. Specifically, the diffraction pattern at the measurement point 1 (FIG. 35A) corresponds well with the diffraction pattern in the case of an incident direction [−1 −1 0], and the diffraction pattern at the measurement point 2 (FIG. 35B) corresponds well with the diffraction pattern in the case of an incident direction [3 2 −3]. Distances and angles in JCPDS card No. 84-1634 are described on the right side of each of FIGS. 35A and 35B. Distances and angles described on the left side of each of FIGS. 35A and 35B are measured values.

Figure 40:
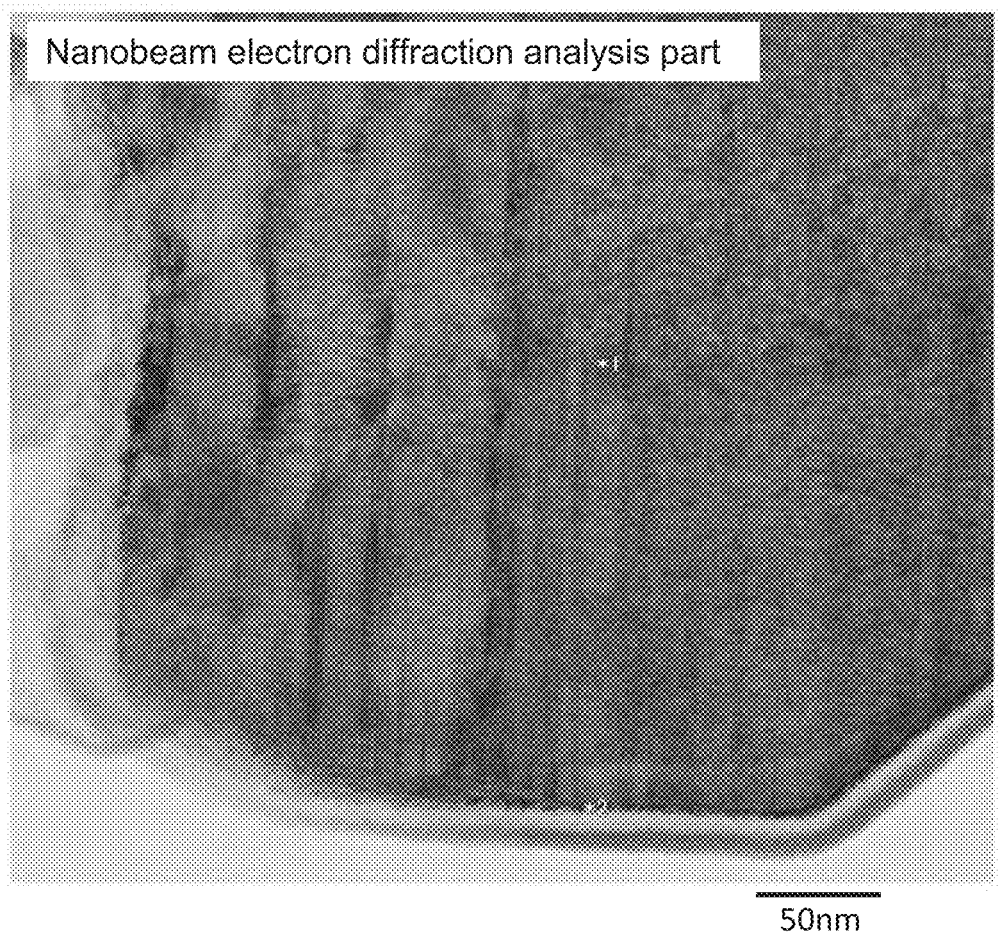
FIG. 40 shows an observation result obtained with a transmission electron microscope.
Figure 41A:
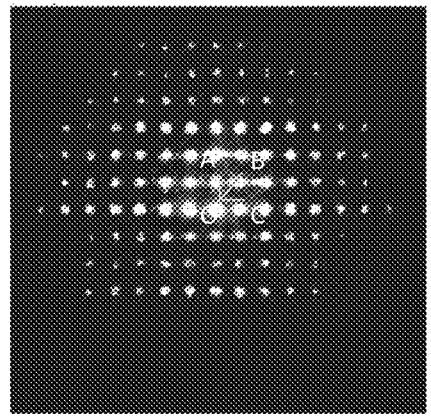
FIGS. 41A and 41B show electron diffraction patterns.
Figure 41B:
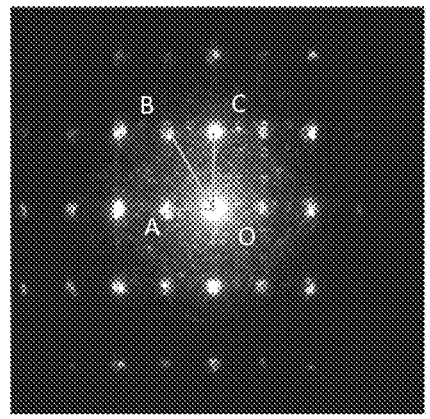

A particle different from that shown in FIG. 39 was observed by electron diffraction. Specifically, a measurement point 1 (*1) and a measurement point 2 (*2) in a TEM image shown in FIG. 40 were evaluated by nanobeam electron diffraction. The measurement point 2 shown in FIG. 40 is in a region at a distance shorter than or equal to 10 nm from the surface of the particle and is closer to the surface of the particle than the measurement point 1. The measurement point 1 is in a region closer to the center of the particle than the measurement point 2 is. FIGS. 41A and 41B show nanobeam electron diffraction results of the measurement points. FIG. 41A shows the nanobeam electron diffraction result of the measurement point 1 in FIG. 40, and FIG. 41B shows the nanobeam electron diffraction result of the measurement point 2 in FIG. 40.

Measured values concerning positional relations (distances and angles) between spots in each obtained diffraction pattern correspond well with values concerning positional relations in a crystal structure of $Li_2MnO_3$ in JCPDS card No. 84-1634. Specifically, the diffraction pattern at the measurement point 1 (FIG. 41A) corresponds well with the diffraction pattern in the case of an incident direction [1 0 0], and the diffraction pattern at the measurement point 2 (FIG. 41B) corresponds well with the diffraction pattern in the case of an incident direction [3 2 −3]. Distances and angles in JCPDS card No. 84-1634 are described on the right side of each of FIGS. 41A and 41B. Distances and angles described on the left side of each of FIGS. 41A and 41B are measured values.

As described in Embodiment 1, it is preferable that the first region and the second region have a layered rock-salt structure and that a<1 1 0> orientation in the first region be parallel to a<3 2 −3> orientation in the second region. Since these orientations are parallel, the two regions can be joined while the arrangement in a plane of a layer containing lithium and manganese or a layer of oxygen is approximately kept. Therefore, it can be said that the compatibility of the two regions is favorable.

Example 3

In this example, the relation between the surface area of a particle of one embodiment of the present invention and characteristics thereof is described.

In Example 3, the crushing in Step S15 described in Example 1 was performed under different conditions, and the relation between the surface area and the crushing conditions of the obtained particles was evaluated.

The particles of one embodiment of the present invention were formed by Step S11 through Step S19 shown in FIG. 1. The crushing in Step S15 was performed under crushing conditions shown in Table 2, so that samples Z-1 to Z-6 were formed. Each of the samples Z-4 to Z-6 did not include the coating layer.

TABLE 3

| Sample | Coating layer | Crushing conditions | | | Specific surface area (m2/g) | 1st discharge capacity (mAh/g) |
| --- | --- | --- | --- | --- | --- | --- |
| | | Peripheral speed (m/s) | Time (hrs.) | Crushed amount (g) | | |
| Z-1 | Formed | 4 | 10 | 240 | 8.9 | 251 |
| Z-2 | Formed | 8 | 24 | 480 | 14.0 | 274 |
| Z-3 | Formed | 12 | 6 | 120 | 14.8 | 291 |
| Z-4 | Not formed | 4 | 10 | 240 | 8.5 | 250 |

TABLE 3-continued

| Sample | Coating layer | Crushing conditions | | | Specific surface area (m2/g) | 1st discharge capacity (mAh/g) |
| --- | --- | --- | --- | --- | --- | --- |
| | | Peripheral speed (m/s) | Time (hrs.) | Crushed amount (g) | | |
| Z-5 | Not formed | 8 | 24 | 480 | 14.6 | 91 |
| Z-6 | Not formed | 12 | 6 | 120 | 30.3 | 101 |

Specific surface areas of the obtained samples Z-1 to Z-6 were evaluated. Table 3 shows the evaluation results.

Next, electrodes were formed using the samples Z-1 to Z-6. Example 1 is referred to for the formation conditions of the electrodes.

Then, half cells of coin cells including the electrodes were fabricated. Electrolytic solutions, separators, and counter electrodes in the half cells were similar to those described in Example 1.

Next, the fabricated half cells were charged and discharged. The charging was performed at a constant current of 30 mA/g with the upper voltage limit set to 4.8 V. The discharging was performed at a constant current of approximately 30 mA/g with the lower voltage limit set to 2.0 V. Table 3 shows obtained discharge capacity.

The specific surface area tends to become larger as the peripheral speed becomes higher. In addition, the capacity becomes higher as the specific surface areas in the half cells including the coating layers become larger. In the case of using the sample Z-2, the specific surface area is 14.0 m$^2$/g and the discharge capacity is 274 mAh/g. In the case of using the sample Z-3, the specific surface area is 14.8 m$^2$/g and the discharge capacity is 291 mAh/g. In either case, the discharge capacity was extremely high.

In the case of using the samples without the coating layer, the specific surface area is larger as the peripheral speed is higher. However, discharge capacity of the half cells including the sample Z-5 and the sample Z-6 is low. In the case of using the sample Z-5, the discharge capacity is 91 mAh/g while the specific surface area is 14.6 m$^2$/g. In the case of using the sample Z-6, the discharge capacity is 101 mAh/g while the specific surface area is 30.3 m$^2$/g. Possible reasons for this are as follows: by the crushing treatment using the bead mill, the surface of the particle was damaged, or a part of the surface of the particle was removed. The formation of the coating layer achieved both a large surface area and high capacity.

Example 4

In this example, the thin storage battery described in Embodiment 2 was fabricated using a "particle containing a lithium-manganese composite oxide" of one embodiment of the present invention.

<Manufacture of Positive Electrode>

First, the "particle containing the lithium-manganese composite oxide" of one embodiment of the present invention was formed.

First, Step S11 through Step S14 in Example 1 were performed.

(Step S15)

Next, crushing treatment was performed. The treatment in a bead mill was performed on each 240 g of lithium-manganese composite oxide at a peripheral speed of 8 m/s for 12 hours. Ethanol was used as the solvent.

(Step S16)

After that, heat treatment and drying were performed on the lithium-manganese composite oxide subjected to the crushing treatment. Powder obtained by the drying is referred to as a sample A2. Then, the lithium-manganese composite oxide was put in a crucible and firing was performed at 800° C. in a dry air atmosphere at 10 L/min. for 3 hours.

(Step S17)

Next, a layer containing carbon was formed on the sample A2. First, 50 ml of water was added to 4 g of graphene oxide, and the water and the graphene oxide were mixed in a mixer to form a dispersion solution of the graphene oxide. Next, 200 g of the sample A2 and 90 ml of water were put in the formed dispersion solution, and the mixture was kneaded two times. Thirty-minute kneading was performed at 80 rpm in a mixer two times. The obtained mixture was dried in a circulation drying furnace at 50° C. and then ground in an alumina mortar, so that a sample B2 (lithium manganese composite oxide coated with graphene oxide) was obtained.

(Step S18)

Then, the graphene oxide coating the surface of the lithium manganese composite oxide was reduced. Ascorbic acid was used as a reducing agent, and an ethanol water solution at a concentration of 80 vol % was used as a solvent. A reducing solution was formed by adding 16.87 wt % of the ascorbic acid and 3.9 wt % of lithium hydroxide, the weight percentages were with respect to the weight of the lithium-manganese composite oxides coated with graphene oxide. The obtained sample B2 was put in the reducing solution, and reduction was performed at 60° C. for 3 hours.

(Step S19)

Next, a solvent was separated from the obtained solution with a centrifuge, and a separated liquid was removed. After that, a step in which the resulting object was washed with pure water, centrifugation was performed, and a separated liquid was removed was repeated four times. The centrifugation was performed at 9000 rpm for three minutes. Next, pure water was added to the sample from which the solvent was separated to obtain a solution at a concentration of 121 g/l. The obtained solution was heated at 150° C. to perform spray dry treatment.

Then, powder obtained by the spray dry treatment was dried under a reduced pressure for 10 hours.

Through the above steps, a powdery lithium-manganese composite oxide (sample C2) in which graphene was formed on a surface was formed.

Next, a positive electrode of the storage battery was manufactured using the sample C2. The sample C2 was used as an active material, acetylene black (AB) was used as a conductive additive, and PVdF was used as a binder. The ratio of the active material to the AB and the PVdF was 90:5:5 (weight %).

The active material, the AB, the PVdF, and NMP were mixed with a mixer to form slurry. Then, with a continuous coater, the slurry was applied to one surface of 20-μm-thick undercoated aluminum foil. After drying was performed in a drying furnace at 70° C. for 10 minutes, further drying was performed at 90° C. for 10 minutes.

After that, another heat treatment was performed at 250° C. in a reduced pressure atmosphere (1 kPa) for 10 hours. Then, pressing was performed with a pressure of 1.5 MPa at a temperature of 120° C. Through the above-described steps, an electrode X2 including the "particle containing a lithium-manganese composite oxide" of one embodiment of the present invention was obtained. The active material content in the obtained positive electrode was 7.2 mg/cm$^2$.

Next, a storage battery A, which is the thin storage battery described in Embodiment 2, was fabricated using the positive electrode X2 and a negative electrode including graphite as an active material, and the positive electrode X2 was subjected to aging.

An aluminum film covered with a heat sealing resin was used as an exterior body of the storage battery A. In an electrolytic solution, LiPF$_6$ was used as a salt and a mixture of EC, DEC, and EMC was used as a solvent. Furthermore, PP was used as a separator.

Next, charging and discharging were repeated three times while the fabricated storage battery A was pressed with a pressure of 20 MPa with a press machine. The lower voltage limit of the discharging was 2 V.

<Manufacture of Negative Electrode>

Next, a negative electrode to be used in a storage battery was manufactured. SiO, AB, and polyimide were used as an active material, a conductive additive, and a binder, respectively.

First, SiO, AB, and a precursor of polyimide were weighed so that the proportion of the SiO, the AB, and the precursor of polyimide became 80:5:15 (weight %). A solution at a concentration of 13.7 weight % using NMP as a solvent was used as the precursor of polyimide.

The SiO and the AB were mixed with a mixer. Then, the NMP was added thereto little by little, and kneading was performed in a planetary mixer to form a paste. The total amount of NMP added to form the paste was determined so that the proportion of the solid content in the paste became approximately 60%. The kneading means mixing of a mixture with high viscosity. The kneading can increase the dispersibility of the active material and the conductive additive.

Next, a polyimide precursor solution containing NMP as a solvent was added to the paste, and mixing was performed with a mixer. Through the above steps, slurry was formed. The proportion of the solid content in the slurry was 40 weight %.

Next, the slurry was applied to one surface of 18-μm-thickness rolled copper foil with a continuous coater. Then, the solvent was evaporated by heat treatment using a drying furnace. As the heat treatment, heating was performed at 50° C. for 180 seconds, and further heating was performed at 75° C. for 180 seconds. A negative electrode obtained by the above-described process is referred to as a negative electrode Y. The active material content in the obtained negative electrode Y was 1.9 mg/cm$^2$.

Next, a thin storage battery B was fabricated using the negative electrode Y and a positive electrode including lithium cobaltate as an active material, and the negative electrode Y was subjected to aging.

An aluminum film covered with a heat sealing resin was used as an exterior body of the storage battery B. In an electrolytic solution, LiPF$_6$ was used as a salt and a mixture of EC and DEC was used as a solvent. Furthermore, PP was used as a separator.

Next, charging and discharging of the storage battery B were performed.

<Fabrication of Storage Battery C>

The exterior body of the storage battery A was unsealed to take out the positive electrode X2. In addition, the exterior body of the storage battery B was unsealed to take out the negative electrode Y.

Then, a storage battery C was fabricated using the positive electrode X2 and the negative electrode Y which were taken out.

An aluminum film covered with a heat sealing resin was used as an exterior body of the storage battery C. An electrolytic solution was formed by dissolving LiPF$_6$ as an electrolyte in a mixed solution containing EC and DEC, which are aprotic organic solvents, at a volume ratio of 3:7. Furthermore, PP was used as a separator.

Figure 36:
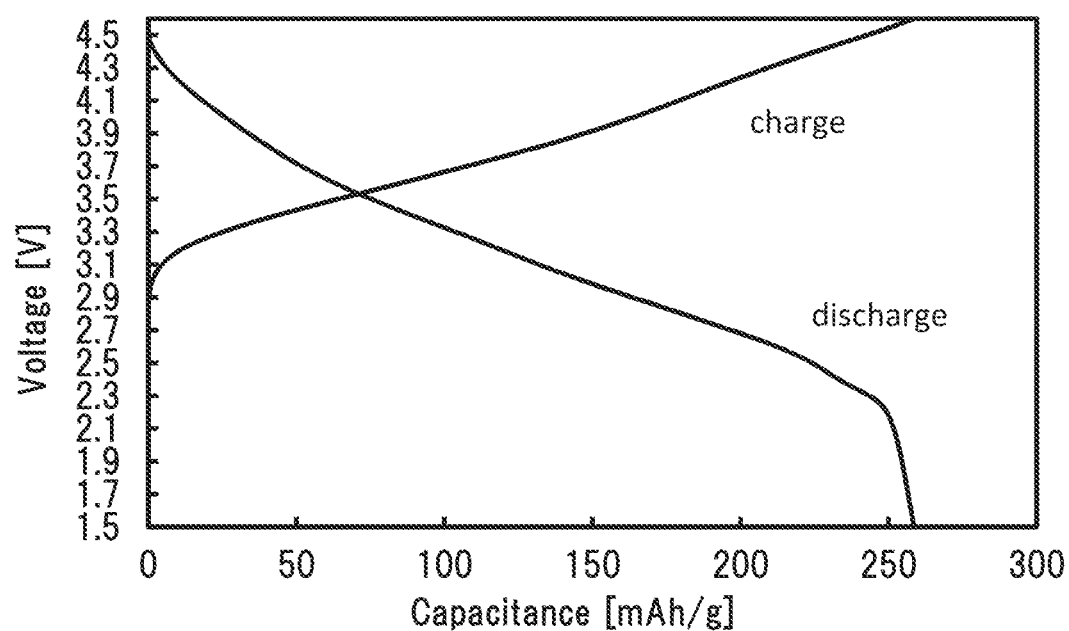
FIG. 36 shows charge and discharge characteristics.

Next, charging and discharging of the storage battery C were performed. The charging and discharging were performed with the upper voltage limit set to 4.6 V and the lower voltage limit set to 1.5 V at a constant current of 0.1 C (current density of 25 mA/g) at 25° C. FIG. 36 shows charge and discharge curves. In FIG. 36, the horizontal axis indicates capacity per unit weight of the positive electrode active material.

The storage battery can have high capacity by using a material which provides high capacity per unit weight for each of the positive electrode active material and the negative electrode active material.

Example 5

In this example, the thin storage battery described in Embodiment 2 was fabricated using a "particle containing a lithium-manganese composite oxide" of one embodiment of the present invention. In the thin storage battery formed in this example, a plurality of positive electrode active material layers and a plurality of negative electrode active material layers are stacked to have higher capacity.

<Manufacture of Positive Electrode>

A positive electrode active material used for the storage battery was synthesized. First, Step S11 through Step S14 in Example 1 were performed.

(Step S15)

Next, crushing treatment was performed. The treatment in a bead mill was performed on 600 g of lithium-manganese composite oxide at a peripheral speed of 12 m/s for 10 hours.

(Step S16)

After that, the lithium-manganese composite oxides subjected to the crushing treatment were heated at 75° C. using a hot plate and dried at 100° C. in a reduced pressure atmosphere. Then, the obtained lithium-manganese composite oxides were put in a crucible and firing was performed at 800° C. in a dry air atmosphere at 10 L/min. for 3 hours. The resulting powder is referred to as a sample A3.

(Step S17)

Next, a layer containing carbon was formed on the sample A3. First, an aqueous dispersion of graphene oxide was formed. To form the aqueous dispersion of graphene oxide, the total amount of water was divided into 3 equal parts, and mixing was performed with a mixer every time the part of the water was added to graphene oxide. Note that 150 ml of water was added to each 10 g of the graphene oxide. Next, the sample A2 and water were added to the formed aqueous dispersion. Note that 500 g of the sample A2 and 200 mL of water were added to each 150 ml of the formed aqueous dispersion. Then, kneading was performed. The obtained mixture was dried at 70° C. in a circulation drying furnace and then ground in an alumina mortar, so that a sample B3 (lithium manganese composite oxide coated with graphene oxide) was obtained.

(Step S18)

Then, the graphene oxide coating the surface of the lithium manganese composite oxide was reduced. Ascorbic acid was used as a reducing agent, and an ethanol water solution at a concentration of 80 vol % was used as a solvent. A reducing solution was formed by adding 16.87 wt % of the ascorbic acid and 3.9 wt % of lithium hydroxide, the weight percentages were with respect to the weight of the lithium-manganese composite oxides coated with graphene oxide. The obtained sample B3 was put in the reducing solution, and reduction was performed at 60° C. for 3 hours.

(Step S19)

Next, a solvent was separated from the obtained solution with a centrifuge, and a separated liquid was removed. After that, a step in which the resulting object was washed with pure water, centrifugation was performed, and a separated liquid was removed was repeated five times. The centrifugation was performed at a speed of 2000 rpm to 6000 rpm for three minutes. Pure water was added to the sample from which the solvent was separated to obtain a solution. Note that 1 L of water was added to each 80 g of the sample B3 before reduction. The obtained solution was heated at 150° C. to perform spray dry treatment.

Then, powder obtained by the spray dry treatment was dried at 170° C. under a reduced pressure for 10 hours.

Through the above steps, a powdery lithium-manganese composite oxide (sample C3) in which graphene was formed on a surface was formed.

Next, a positive electrode of the storage battery was manufactured using the sample C3. The sample C3 was used as an active material, acetylene black (AB) was used as a conductive additive, and PVdF was used as a binder. The weight ratio of the active material to the AB and the PVdF was 90:5:5.

The active material, the AB, the PVdF, and NMP were mixed with a mixer to form slurry. Then, with a continuous coater, the slurry was applied to one surface of 20-µm-thick undercoated aluminum foil. A positive electrode in which an active material layer was formed on both surfaces of aluminum foil and a positive electrode in which an active material layer was formed on one surface of aluminum foil were prepared. After the evaporation of the solvent was performed in a drying furnace at 70° C. for 10 minutes, the evaporation of the solvent was performed at 90° C. for 10 minutes.

After that, heat treatment was performed at 250° C. in a reduced pressure atmosphere (1 kPa) for 10 hours. Then, pressing was performed with a press machine. Through the above-described steps, an electrode X3 including the "particle containing a lithium-manganese composite oxide" of one embodiment of the present invention was obtained. The active material content in the obtained positive electrode was 15.5 mg/cm$^2$ on one surface.

Next, charging and discharging were performed using the positive electrode X3 and a counter electrode made of a lithium metal. In an electrolytic solution, LiPF$_6$ and polyethylene carbonate (PC) were used as a salt and a solvent, respectively. The discharging was performed with the lower voltage limit set to 2 V.

Then, the positive electrode X3 was taken out from the electrolytic solution.

<Manufacture of Negative Electrode>

Next, a negative electrode to be used in a storage battery was manufactured. SiO, AB, and polyimide were used as an active material, a conductive additive, and a binder, respectively.

First, SiO, AB, and a precursor of polyimide were weighed so that the proportion of the SiO, the AB, and the precursor of polyimide became 80:5:15 (weight %). A solution at a concentration of 13.7% using NMP as a solvent was used as the precursor of polyimide.

Then, the SiO, the AB, the precursor of polyimide, and NMP were mixed to form slurry. For the formation of the slurry, the process in <Manufacture of Negative electrode> in Example 4 is referred to.

Next, the slurry was applied to 18-µm-thickness rolled copper foil with a continuous coater. A negative electrode active material layer was provided on both surfaces of the copper foil. After that, drying was performed using a drying furnace. As the drying, heat treatment was performed at 50° C. for 180 seconds, and further heat treatment was performed at 75° C. for 180 seconds. A negative electrode obtained by the above-described process is referred to as a negative electrode Y2. The active material content in the obtained negative electrode Y was 1.8 mg/cm$^2$.

Next, charging was performed using the negative electrode Y2 and a counter electrode made of a lithium metal. In an electrolytic solution, LiPF$_6$ and polyethylene carbonate (PC) were used as a salt and a solvent, respectively. Then, the negative electrode Y2 was taken out from the electrolytic solution.

<Fabrication of Storage Battery>

Next, a thin storage battery C2 described in Embodiment 2 was fabricated. One positive electrode X3 in which an active material layer was formed on both surfaces and two positive electrodes X3 in each of which an active material layer was formed on one surface were prepared as positive electrodes. Two negative electrodes Y2 in which an active material layer was formed on both surfaces were prepared as negative electrodes.

Figure 37:
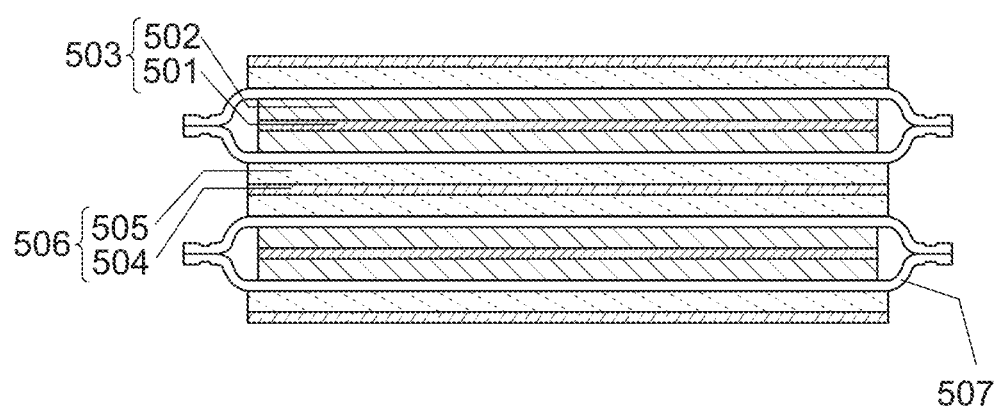
FIG. 37 is a cross-sectional view of an electrode and a separator.

The positive electrodes X3, the negative electrodes Y2, and the separators 507 were stacked as shown in FIG. 37. The separator 507 was provided between the positive electrode X3, which includes the positive electrode active material layer 502 and aluminum foil serving as the positive electrode current collector 501, and the negative electrode Y2, which includes the negative electrode active material layer 505 and copper foil serving as the negative electrode current collector 504.

An aluminum film covered with a heat sealing resin was used as an exterior body of the storage battery C2. An electrolytic solution was formed by dissolving LiPF$_6$ as an electrolyte in a mixed solution containing EC, DEC, and ethyl methyl carbonate (EMC) at a weight ratio of 3:6:1. As a separator, polypropylene (PP) was used. Furthermore, 1% or lower of vinylene carbonate (VC) and 1% or lower of propanesultone (PS) were added as additives.

Figure 38A:
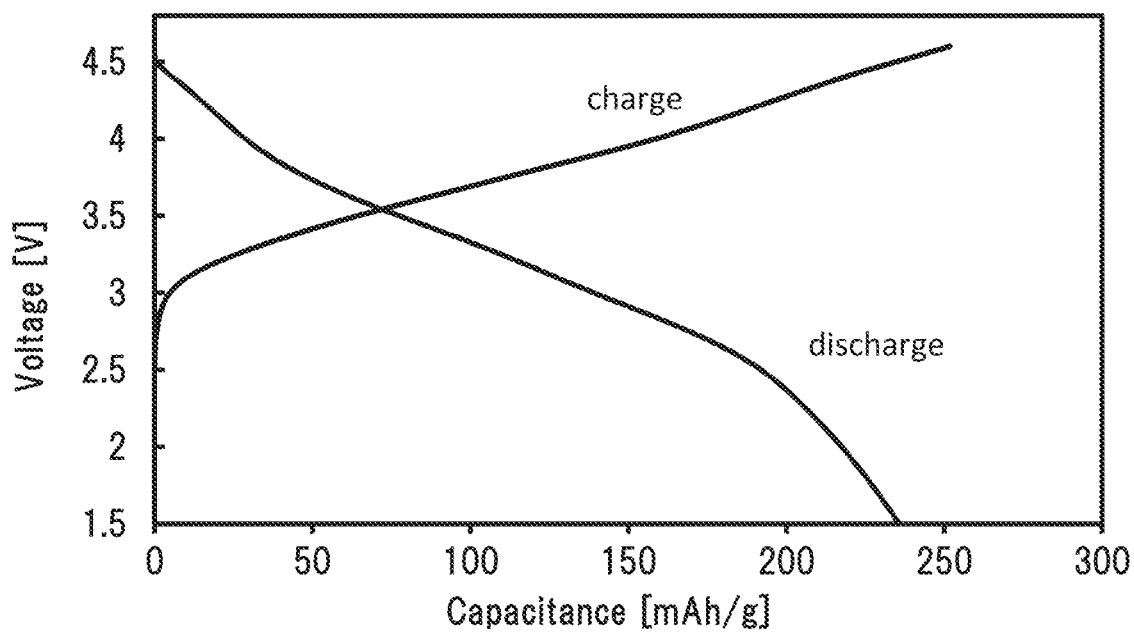
FIGS. 38A and 38B show charge and discharge characteristics.
Figure 38B:
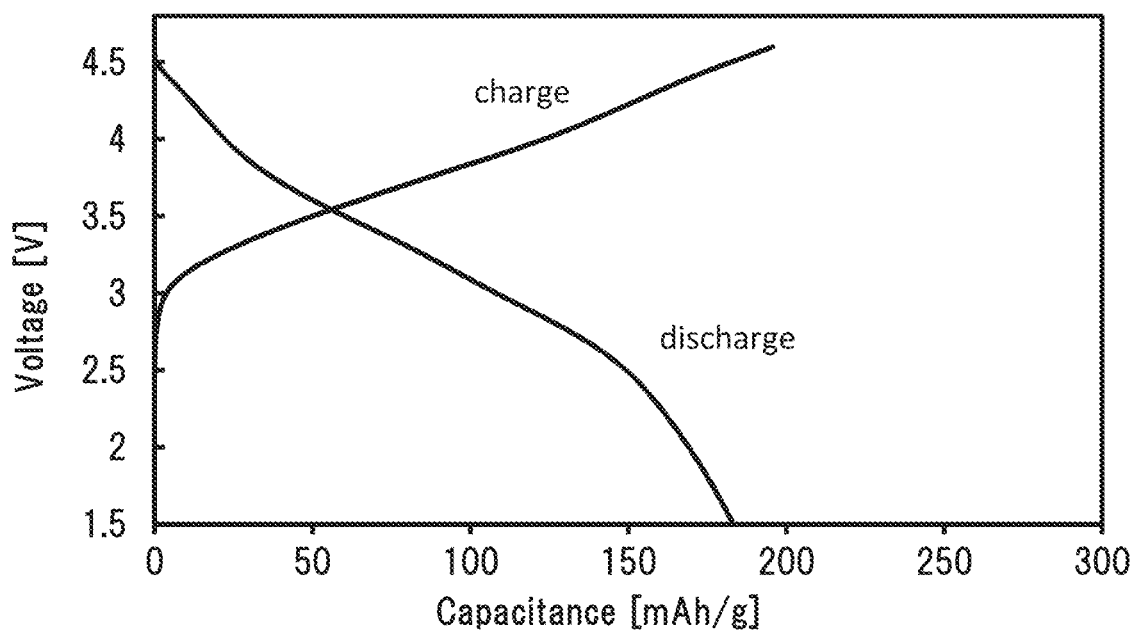

Next, charging and discharging of the storage battery C2 were performed. The charging and discharging were performed with the upper voltage limit set to 4.6 V and the lower voltage limit set to 1.5 V at a constant current of 0.1 C (current density of 12 mA/g) at 25° C. FIGS. 38A and 38B show charge and discharge curves. In FIG. 38A, the horizontal axis indicates capacity per unit weight of the positive electrode active material. In FIG. 38B, the horizontal axis indicates capacity normalized using a value obtained by subtracting the sum of the weight of the positive electrode current collector and the weight of the negative electrode current collector from the sum of the weight of the positive electrode and the weight of the negative electrode.

The storage battery can have high capacity by using a material which provides high capacity per unit weight for each of the positive electrode active material and the negative electrode active material.

Example 6

In this example, the case where the particles of one embodiment of the present invention form a secondary particle is described.

First, Step S11 through Step S16 shown in FIG. 1 were performed to obtain a sample A4 which is a lithium-manganese composite oxide. Example 1 can be referred to for Step S11 to Step S16. Detailed conditions will be described below.

In Step S11, $Li_2CO_3$, $MnCO_3$, and NiO were weighed as starting materials so that the weight ratio of $Li_2CO_3$ to $MnCO_3$ and NiO was 0.84:0.8062:0.318.

In Step S12, the treatment in the bead mill was performed at a peripheral speed of 10 m/s for 30 minutes.

In Step S13, drying was performed in an air atmosphere at 75° C., and then drying was performed at 100° C. under a reduced pressure for 1 hour.

In Step S14, firing was performed at 10 L/min in a dry air atmosphere at 1000° C. for 10 hours.

In Step S15, the treatment in the bead mill was performed for 25 hours at a peripheral speed of 4 m/s with respect to 600 g of the lithium-manganese composite oxide. After that, drying was performed at 75° C., and then, drying was performed at 100° C.

In Step S16, firing was performed at 10 L/min. in a dry air atmosphere at 800° C. for 3 hours. Powder obtained in Step S16 is referred to as the sample A4.

(Step S17)

Next, a layer containing carbon was formed on the sample A4. First, an aqueous dispersion of graphene oxide was formed. To form the aqueous dispersion of graphene oxide, the total amount of water was divided into 3 equal parts, and mixing was performed with a mixer every time the part of the water was added to graphene oxide. Note that in total, 150 ml of water was added to each 10 g of graphene oxide. Next, the sample A4 and water were added to the formed aqueous dispersion. Note that 500 g of the sample A4 and 200 ml of water added to the formed aqueous dispersion. Then, kneading was performed. The obtained mixture was dried at 70° C. in a circulation drying furnace and then ground in an alumina mortar, so that a sample B4 (lithium manganese composite oxide coated with graphene oxide) was obtained.

(Step S18)

Next, the graphene oxide in the sample B4 was reduced. Ascorbic acid was used as a reducing agent, and an ethanol water solution at a concentration of 80 vol % was used as a solvent. A reducing solution was formed by adding 16.87 wt % of the ascorbic acid and 3.9 wt % of lithium hydroxide, the weight percentages were with respect to the weight of the lithium-manganese composite oxides coated with graphene oxide. The obtained sample B4 was put in the reducing solution, and reduction was performed at 60° C. for 3 hours.

(Step S19)

Next, a solvent was separated from the resulting solution with a centrifuge, and a separated liquid was removed. After that, a step in which the resulting object was washed with pure water, centrifugation was performed, and a separated liquid was removed was repeated five times. The centrifugation was performed at 6000 rpm for three minutes. Next, pure water was added to the sample from which the solvent was separated, and four kinds of solutions with different concentrations were obtained. The solutions with different concentrations are referred to as solutions A, B, C, and D.

To obtain the solution A, the amount of the sample B4 with respect to pure water was adjusted to be 10 g/L. The concentration of the solution B was adjusted to be 100 g/L. The concentration of the solution C was adjusted to be 300 g/L. The concentration of the solution D was adjusted to be 500 g/L. Then, the solutions A to D were heated to 60° C. An inlet of a spray dry apparatus was set to 150° C., and spray dry treatment was performed on each solution.

Powders obtained by performing the spray dry treatment on the solutions were dried at 170° C. under a reduced pressure for 10 hours. The dried samples were each dissolved in NMP to form solutions, and the particle diameter distribution of the solutions was measured. Note that here, the measured particle diameter mainly belonged to a secondary particle. Particle size distribution was measured using a laser diffraction particle size analyzer (SALD-2200 manufactured by Shimadzu Corporation). A laser diffraction and scattering method was used as a method for calculating the particle diameter. The average particle diameters and the values of D90 (the particle diameter when the integrated amount of particle size distribution in the accumulated particle curve obtained as a result of particle size measurement was 90%) were evaluated from the obtained results.

Figure 42:
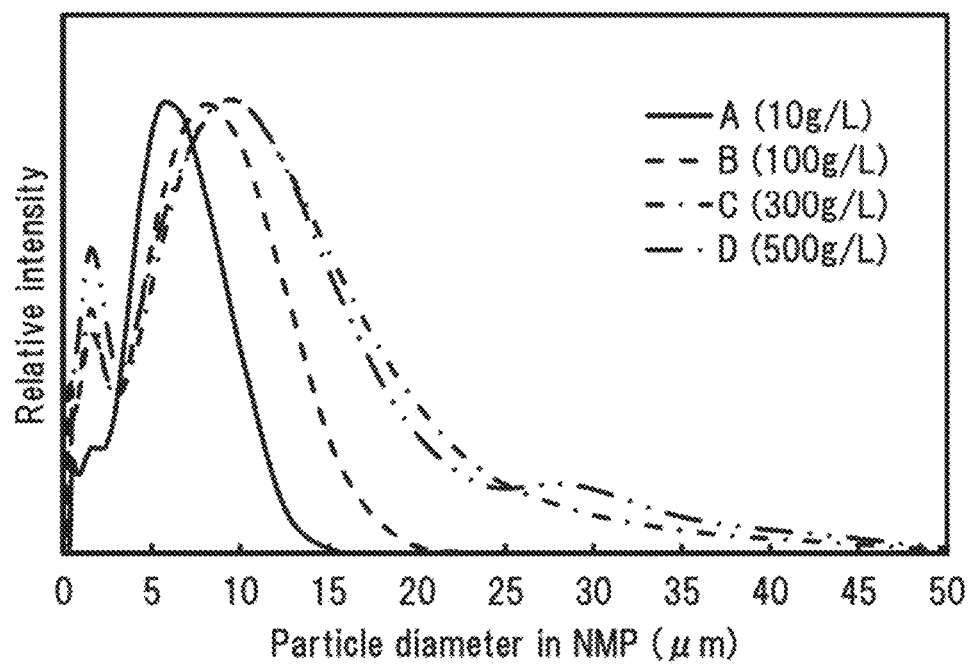
FIG. 42 shows the distribution of particle diameter.
Figure 43A:
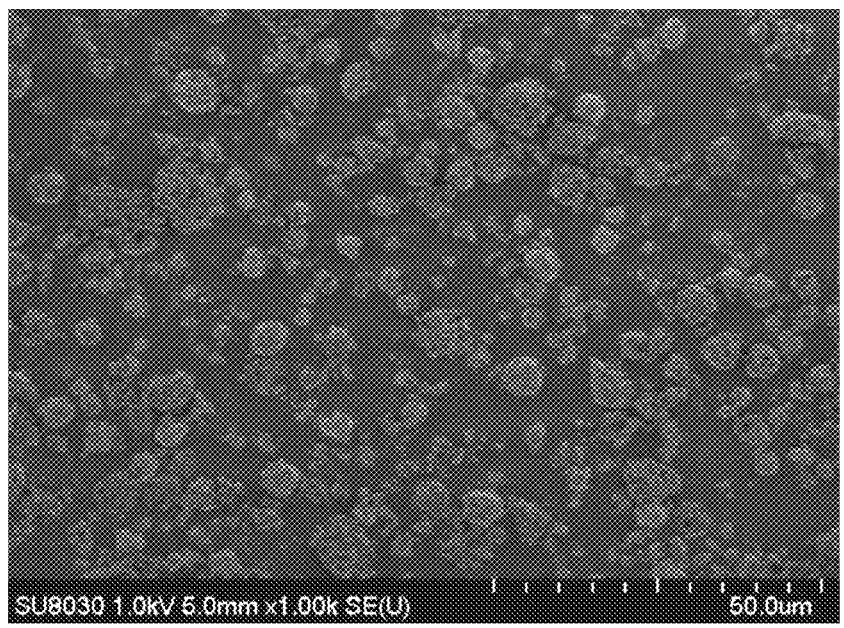
FIGS. 43A and 43B show observation results obtained with a scanning electron microscope.
Figure 43B:
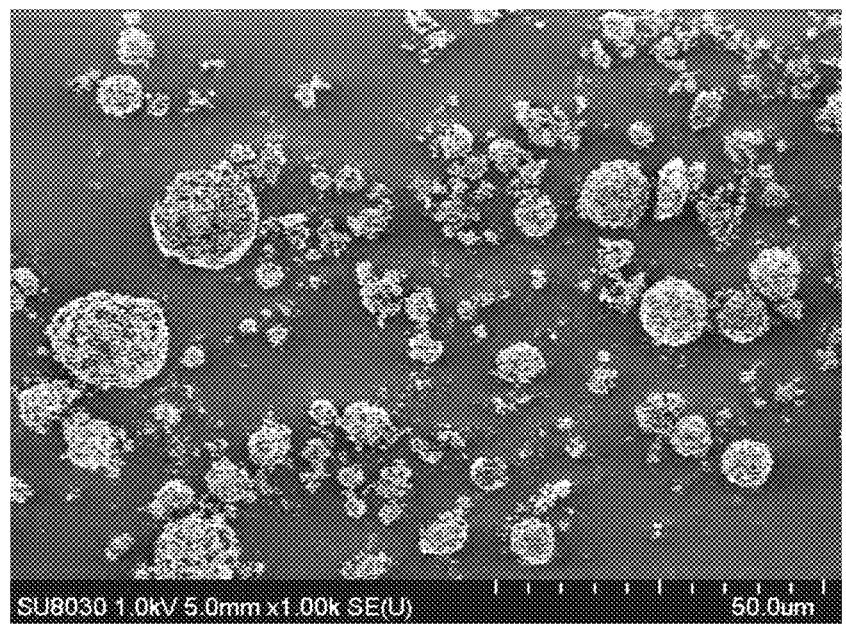
Figure 44A:
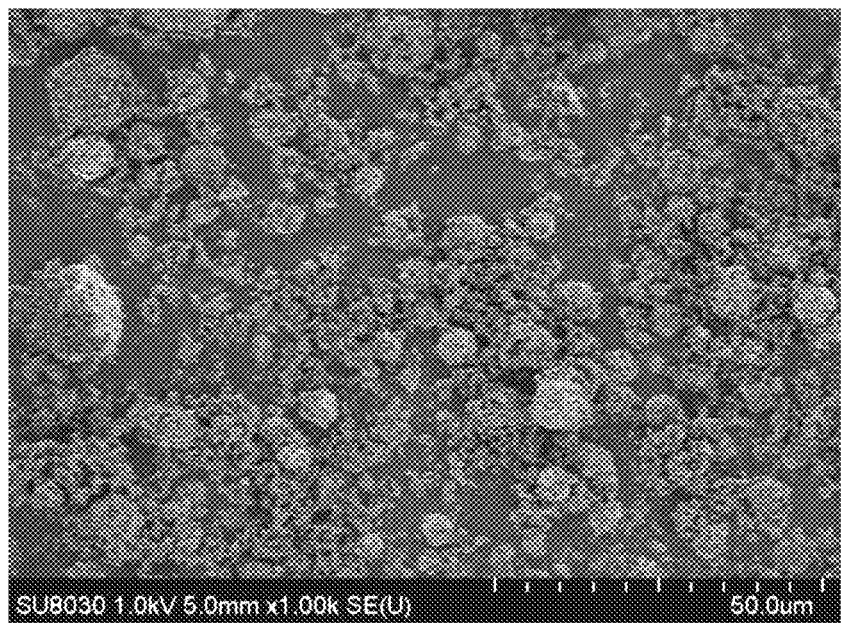
FIGS. 44A and 44B show observation results obtained with a scanning electron microscope.
Figure 44B:
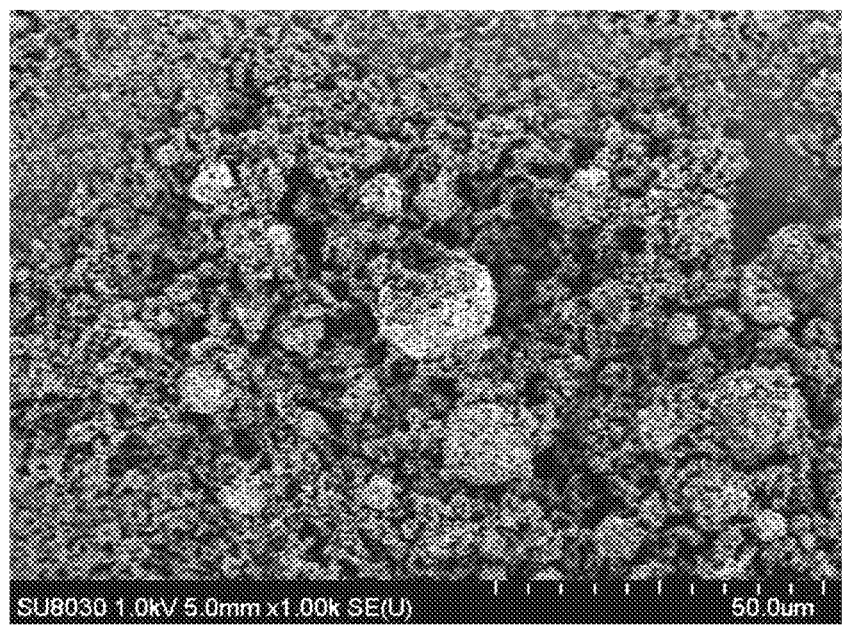

FIG. 42 is a graph where a particle diameter and frequency were plotted on the horizontal axis and the vertical axis, respectively. In FIG. 42, the solid line, the dashed line, the dashed-dotted line, and the dashed-double dotted line indicate the results of the samples collected from the solution A, the solution B, the solution C, and the solution D, respectively.

The average particle diameters of the samples collected from the solution A, the solution B, the solution C, and the solution D were 3.26 μm, 2.45 μm, 3.84 μm, and 3.40 μm, respectively.

The values of D90 of the samples collected from the solution A, the solution B, the solution C, and the solution D were 7.94 μm, 9.73 μm, 13.92 μm, and 13.18 μm, respectively.

The values of D90 of the samples collected from the solutions C and D were greater than or equal to 13 μm, and, as shown in FIG. 42, the curves of the solutions C and D have tails in a range greater than or equal to 20 μm.

FIG. 43A, FIG. 43B, FIG. 44A, and FIG. 44B show SEM observation results of the samples obtained from the solution A, the solution B, the solution C, and the solution D, respectively. In the solutions B to D, a secondary particle with a particle diameter of larger than 15 μm was observed.

From the results shown in FIG. 42, FIGS. 43A and 43B, and FIGS. 44A and 44B, it is probable that the concentration of a solution to be subjected to the spray dry treatment is, for example, preferably less than or equal to 100 g/L, more preferably less than or equal to 10 g/L.

Example 7

In this example, the release of gases from a storage battery in charging and discharging was measured.

<Manufacture of Positive Electrode>

A positive electrode active material used for the storage battery was synthesized. First, Step S11 through Step S14 in Example 6 were performed.

(Step S15)

Next, crushing treatment was performed. The treatment in a bead mill was performed on 480 g of lithium-manganese composite oxide at a peripheral speed of 8 m/s for 20 minutes and then performed thereon at a peripheral speed of 12 m/s for 10 hours. After that, drying was performed.

(Step S16)

Then, firing was performed at 10 L/min. in a dry air atmosphere at 800° C. for 3 hours. Powder obtained in Step S16 is referred to as a sample A5.

(Step S17)

Next, a layer containing carbon was formed on the sample A5. First, water and graphene oxide were mixed to form an aqueous dispersion of graphene oxide. The total amount of water added to 2 g of graphene oxide was 10 mL. Next, 100 g of the sample A5 and 20 mL of water were mixed into the formed aqueous dispersion, and kneading was performed. The obtained mixture was dried and then ground in an alumina mortar, so that a sample B5 (the lithium manganese composite oxide coated with graphene oxide) was obtained.

(Step S18)

Next, the graphene oxide in the sample B5 was reduced. Ascorbic acid was used as a reducing agent, and a mixed solvent of ethanol and water was used as a solvent. In the mixed solvent, the concentration of ethanol was 80 vol %. A reducing solution was formed by adding 16.87 wt % of the ascorbic acid and 3.9 wt % of lithium hydroxide, the weight percentages were with respect to the weight of the lithium-manganese composite oxides coated with graphene oxide. The obtained sample B5 was put in the reducing solution, and reduction was performed at 60° C. for 3 hours.

(Step S19)

Then, the resulting solution was filtered to obtain a sample from which the solvent was separated. After that, drying was performed. Thus, a sample C5 was obtained.

Next, a positive electrode was manufactured using the obtained sample C5. The sample C5 was used as an active material, acetylene black (AB) was used as a conductive additive, and PVdF was used as a binder. The weight ratio of the active material to the AB and the PVdF was 90:5:5, and NMP was used as a solvent to form slurry.

Next, the formed slurry was applied to one surface of 20-µm-thick aluminum foil subjected to undercoating. Then, heat treatment was performed to evaporate the solvent. Pressing was performed, and then heat treatment was performed at 250° C. under a pressure of 1 kPa for 10 hours.

A positive electrode obtained by the above-described process is referred to as a positive electrode X4. The active material content in the positive electrode X4 was 6.5 mg/cm$^2$.

<Manufacture of Negative Electrode>

A negative electrode was manufactured using graphite as an active material. Graphene, carbon fiber, CMC, SBR, and water were mixed with a mixer to form slurry. The ratio of graphite to carbon fiber, CMC, and SBR was 96:1:1:2 (weight %).

The formed slurry was applied to one surface of 18-µm-thick rolled copper foil, and then, drying was performed. Thus, a negative electrode active material layer was formed. The obtained negative electrode is referred to as a negative electrode Y3. The active material content in the negative electrode Y3 was 8.8 mg/cm$^2$.

<Manufacture of Comparative Electrode>

Next, a positive electrode including LiFePO$_4$ as an active material was manufactured as a comparative electrode. Aluminum foil was used as a current collector. The manufactured positive electrode is referred to as a positive electrode X5. The active material content in the positive electrode X5 was 10.8 mg/cm$^2$.

<Manufacture of Negative Electrode>

A negative electrode was manufactured using graphite as an active material. Graphene, carbon fiber, CMC, SBR, and water were mixed with a mixer to form slurry. The ratio of graphite to carbon fiber, CMC, and SBR was 96:1:1:2 (weight %). The formed slurry was applied to one surface of 18-µm-thick rolled copper foil, and then, drying was performed. Thus, a negative electrode active material layer was formed. The obtained negative electrode is referred to as a negative electrode Y4. The active material content in the negative electrode Y4 was 7.5 mg/cm$^2$.

<Fabrication of Storage Battery>

A storage battery C3 was fabricated using six positive electrodes X4 and six negative electrodes Y3. A storage battery C4 was manufactured using six positive electrodes X5 as comparative electrodes and six negative electrodes Y4.

An aluminum film covered with a heat sealing resin was used as an exterior body of each of the storage batteries C3 and C4. An electrolytic solution was formed by dissolving LiPF$_6$ as an electrolyte in a mixed solution containing EC, DEC, and EMC as solvents at a volume ratio of 3:6:1, and PS and VC were used as additives. PP was used as a separator.

The manufactured storage battery included six positive electrode active material layers and six negative electrode active material layers. The positive electrode active material layers and the negative electrode active material layers were alternately stacked with the separator provided between every two active material layers.

Next, charging and discharging of the manufactured storage battery C3 were performed. Constant current charging was performed at a rate of 0.1 C (current density of 17 mA/g) at 25° C. with the upper voltage limit set to 4.6 V, and then, charging was terminated at a constant voltage of 4.6 V and a rate of 0.01 C. After that, constant current discharging was performed with the lower voltage limit set to 2.0 V. Discharge capacity was 207 mAh/g. High capacity was obtained by using the particle of one embodiment of the present invention as the positive electrode active material.

Charging and discharging of the storage battery C4 were performed. Constant current charging was performed at 25° C. at a rate of 0.01 C (current density of 24 mA/g) with the upper voltage limit set to 3.2 V, and then, constant current charging was performed at a rate of 0.1 C with the upper voltage limit set to 4 V. After that, constant current discharging was performed at a rate of 0.2 C with the lower voltage limit set to 2.0 V. Next, constant current charging was performed at a rate of 0.2 C with the upper voltage limit set to 4 V, and then, constant current discharging was performed at a rate of 0.2 C with the lower voltage limit set to 2 V. Here, the current density and the capacity of each of the storage batteries C3 and C4 were normalized per weight of the positive electrode active material. First discharge capacity was 109 mAh/g, and second discharge capacity was 123 mAh/g.

Next, gases in the storage battery C3 and the storage battery C4 after the charging and discharging were obtained.

The obtained gases were measured with a gas chromatography—thermal conductivity detector (GC-TCD). Table 4 shows the kinds and the proportions of the gases. In Table 4, the sum of the proportions of eight kinds of gases (H$_2$, O$_2$, N$_2$, CO, CH$_4$, CO$_2$, C$_2$H$_4$, and C$_2$H$_6$) is defined as 100%. In Table 4, proportions of some kinds of gases are not shown because the amounts of the gases were less than or equal to the limit of detection or too small to be quantified although they were detected. Here, $CO_2$ was detected in the storage battery C4 but its amount was extremely small.

TABLE 4

| Kind of gas | Proportion [%] | |
|---|---|---|
| | Storage battery C3 | Storage battery C4 |
| $H_2$ | 45 | 64 |
| $O_2$ | 5 | — |
| $N_2$ | — | — |
| CO | 18 | 13 |
| $CH_4$ | 0.2 | 3 |
| $CO_2$ | 30 | — |
| $C_2H_4$ | 1 | 19 |
| $C_2H_6$ | 0.1 | 0.9 |

Table 4 shows that the proportion of $CO_2$ in the storage battery C3 using the sample C5 as the positive electrode was as high as 30%, whereas the amount of $CO_2$ in the storage battery C4 including $LiFePO_4$ as the positive electrode was extremely small. The proportion of hydrogen detected in the storage battery C3 was 45%, and the proportion of hydrogen detected in the storage battery C4 was 64%. The total amount of generated gases in the storage battery C3 was larger than that in the storage battery C4.

The storage battery C3 is preferable, because the potentials of charging and discharging are high and therefore energy density as a storage battery can be increased. On the other hand, when the potentials of charging and discharging are high, oxidation decomposition of the electrolytic solution easily occurs in some cases. It is probable that, in the storage battery C3, the electrolytic solution was decomposed in a charging process or the like and gas such as $CO_2$ was easily generated because the upper limit of charging voltage was as high as 4.6 V. Thus, in the case where the particle of one embodiment of the present invention is used as the positive electrode active material, the storage battery is preferably unsealed after charging and discharging of the positive electrode of the storage battery as described in Examples 4 and 5 to release generated gas and a storage battery is fabricated using the positive electrode. This can reduce the influence of the generation of gas on the characteristics of the storage battery.

Example 8

In this example, the influence on the characteristics of a storage battery due to a graphene oxide coating and treatment using a reducing solution was examined.

First, the particle containing the lithium-manganese composite oxide was formed. Step S11 through Step S14 in Example 6 were performed.

(Step S15)

Next, crushing treatment was performed. The treatment in a bead mill was performed on 240 g of lithium-manganese composite oxide at a peripheral speed of 8 m/s for 10 minutes and then performed thereon at a peripheral speed of 4 m/s for 10 hours. After that, drying was performed. The resulting powder is referred to as a sample A6.

Next, the sample A6 was subjected to treatment using a reducing solution to obtain a sample B6, another sample A6 was coated with graphene oxide to obtain a sample C6, and another sample A6 was coated with graphene oxide and subjected to reduction treatment to obtain a sample D6.

(Step S17)

A layer containing carbon was formed on the sample A6. First, water and graphene oxide were mixed to form an aqueous dispersion of graphene oxide. The amount of graphene oxide was 0.3 g, and the total amount of added water was 3 mL. Next, 15 g of the sample A6 and 3 mL of water were added to the formed aqueous dispersion, and kneading was performed. The obtained mixture was dried and then ground in an alumina mortar, so that a sample C6 was obtained.

(Step S18 and Step S19)

Next, the sample C6 and the sample A6 were treated using solutions of ascorbic acid. A mixed solvent of ethanol and water was used as a solvent. In the mixed solvent, the concentration of ethanol was 80 vol %. Reducing solutions were formed by adding approximately 17 wt % of ascorbic acid and approximately 4 wt % of lithium hydroxide, the weight percentages were with respect to the weight of the sample C6 and the sample A6.

The sample C6 was put in the reducing solution and treated at 60° C. for 3 hours. Then, the solution was filtered and drying was performed to obtain the sample D6. The sample A6 was put in the reducing solution and treated at 60° C. for 3 hours. Then, a solution was filtered and drying was performed to obtain the sample B6.

<Manufacture of Electrode>

Electrodes were manufactured using the samples A6, B6, C6, and D6 as active materials. Acetylene black (AB) was used as a conductive additive, and PVdF was used as a binder. The weight ratio of the active material to the AB and the PVdF was 90:5:5, and NMP was used as a solvent to form slurry.

Next, the formed slurry was applied to one surface of 20-µm-thick aluminum foil subjected to undercoating. Then, drying was performed, and pressing was performed. After that, heat treatment was performed at 250° C. under a pressure of 1 kPa for 10 hours.

The electrodes manufactured using the sample A6, the sample B6, the sample C6, and the sample D6 are referred to as an electrode A6, an electrode B6, an electrode C6, and an electrode D6, respectively. The active material contents in the electrodes A6, B6, C6, and D6 were 3.2 mg/cm$^2$, 4.1 mg/cm$^2$, 3.0 mg/cm$^2$, and 3.7 mg/cm$^2$, respectively.

<Half Cell Characteristics>

Next, half cells were fabricated using the electrodes A6, B6, C6, and D6. For the cell, a coin cell was used. Lithium was used for a counter electrode of the half cell. An electrolytic solution was formed by dissolving $LiPF_6$ as an electrolyte in a mixed solution containing EC and DEC, which are aprotic organic solvents, at a volume ratio of 1:1. As the separator, polypropylene (PP) was used.

Figure 45:
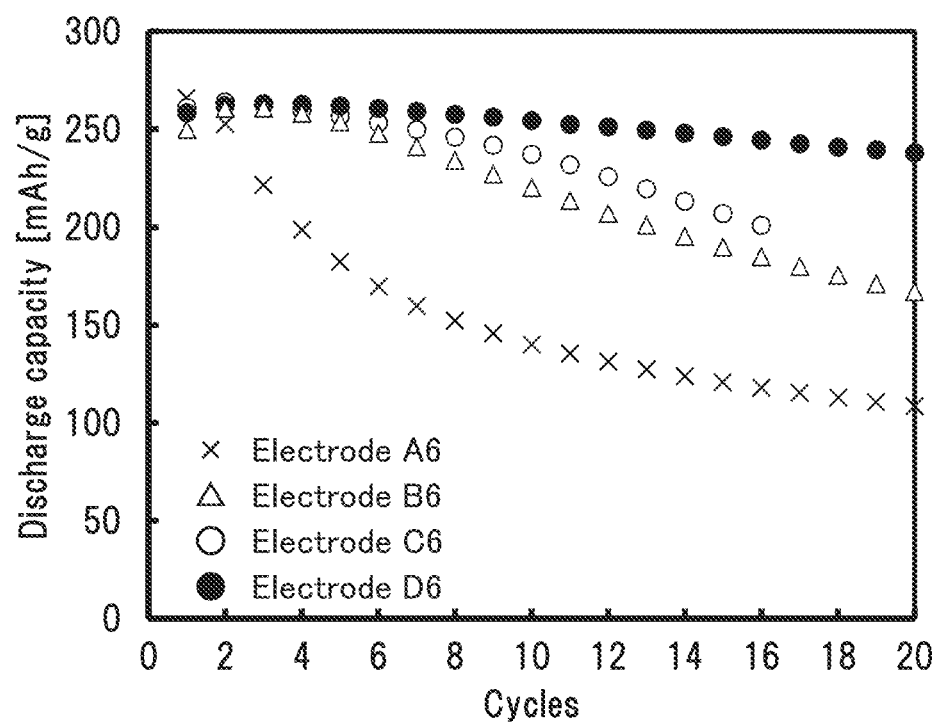
FIG. 45 is a graph showing the relation between the number of charge and discharge cycles and discharge capacity.

Next, the charge and discharge cycle performance of each of the fabricated half cells was evaluated. Constant current charging was performed at a rate of 0.1 C with the upper voltage limit set to 4.8 V and constant current discharging was performed at a rate of 0.1 C with the lower voltage limit set to 2 V. In FIG. 45, the number of charge and discharge cycles is plotted on the horizontal axis, and discharge capacity is plotted on the vertical axis.

In the electrode A6 in which the graphene oxide coating and the treatment using the solution of ascorbic acid were not performed, the capacity was significantly lowered in the third cycle. In the electrode B6 subjected to the treatment using the solution of ascorbic acid, lowering of the capacity can be suppressed, and the capacity in the tenth cycle was 88% of its initial capacity. In the electrode C6 in which the graphene oxide coating was performed, lowering of the capacity was further suppressed, and the capacity in the tenth cycle was higher than or equal to 90% of its initial capacity. In the electrode D6 in which the graphene oxide coating was performed and then the reduction treatment using the reducing solution was performed, the capacity in the tenth cycle was 98% of its initial capacity, which is the highest value.

As described above, in the case where the treatment using the solution of ascorbic acid is performed on the particle of one embodiment of the present invention, a more stable region than the inside of the particle can be formed in at least a part of a surface of the particle. Furthermore, it is suggested that a coating layer including graphene oxide or reduced graphene oxide is more stable than a coated region inside the particle and that the stability of charging and discharging of the storage battery is improved.

Example 9

In this example, a "particle containing a lithium-manganese composite oxide" of one embodiment of the present invention was formed, and characteristics thereof were evaluated. The formation process is described using a flow chart in FIG. 1.

<Synthesis>

The particle containing a lithium-manganese composite oxide was formed.

(Step S11)

First, $Li_2CO_3$, $MnCO_3$, and NiO were weighed as starting materials so that the ratio (molar ratio) of $Li_2CO_3$ to $MnCO_3$ and NiO became 0.84:0.8062:0.318.

(Step S12)

Ethanol was added to the starting materials. Then, ethanol and the starting materials were mixed in a chamber of a bead mill rotating at a peripheral speed of 10 m/s.

(Step S13)

Next, heat treatment was performed on the mixed material at 75° C. in an air atmosphere so that ethanol contained in the mixed material was evaporated, and a mixed material was obtained.

(Step S14)

Subsequently, the mixed material was put in a crucible and firing was performed at 1000° C. in a dry air atmosphere at a flow rate of 10 L/min for 10 hours, whereby a lithium-manganese composite oxide was synthesized.

(Step S15)

Then, crushing treatment was performed to separate sintered lithium-manganese composite oxide. In the crushing treatment, after ethanol was added to the sintered lithium-manganese composite oxide, crushing was performed for 10 minutes in a chamber of a bead mill rotating at a peripheral speed of 8 m/s and then performed for 10 hours at a peripheral speed of 4 m/s; as a result, a powdery lithium-manganese composite oxide was obtained.

(Step S16)

After that, heat treatment was performed on the lithium-manganese composite oxide subjected to the crushing treatment. The heat treatment was performed at 75° C. in an air atmosphere so that ethanol contained in the mixed material was evaporated. Next, the obtained lithium-manganese composite oxide was put in a crucible and firing was performed at 700° C. in a dry air atmosphere at 10 L/min. for 3 hours. The resulting powder is referred to as a sample A. Although the sample A is represented by a composition formula $Li_{1.68}Mn_{0.8062}Ni_{0.318}O_3$, the composition of the sample A might be different from this.

<Coating Layer>

Next, a layer containing carbon was formed on the sample A. Water and graphene oxide were mixed in a mixer to form an aqueous dispersion of the graphene oxide. The amount of the water with respect to 0.1 g of the graphene oxide was set to 1 g.

(Step S17)

Then, the formed aqueous dispersion and the sample A were mixed. Here, the amount of the sample A with respect to 1 g of the graphene oxide was set to 50 g. The obtained mixture was dried under a reduced pressure in a bell jar at 50° C. and then ground in an alumina mortar, so that a sample B (lithium manganese composite oxide coated with graphene oxide) was obtained.

(Step S18)

Then, the graphene oxide coating the surface of the lithium manganese composite oxide was reduced. Ascorbic acid was used as a reducing agent, and a mixed solvent of ethanol and water was used as a solvent. In the mixed solvent, the concentration of ethanol was 80 vol %. A reducing solution was formed by adding 16.87 wt % of the ascorbic acid and 3.9 wt % of lithium hydroxide, the weight percentages were with respect to the weight of the lithium-manganese composite oxides coated with graphene oxide. The obtained powder was put in the reducing solution, and reduction was performed at 60° C. for 3 hours.

(Step S19)

Then, the obtained solution was filtered by suction filtration. For the filtration, filter paper with a particle retention capability of 1 μm was used. After that, washing and another filtration were performed.

Next, pure water was added to the sample from which the solvent was separated to obtain a solution at a concentration of 15 g/l. The obtained solution was heated at 60° C., supplied to a spray dry apparatus, and heated to 150° C. to perform spray dry treatment.

Then, powder obtained by the spray dry treatment was dried at 170° C. under a reduced pressure for 10 hours.

Then, the obtained powder was ground in a mortar. After that, drying was performed at 170° C. under a reduced pressure for 10 hours.

Through the above steps, a powdery lithium-manganese composite oxide (sample C) in which graphene was formed on a surface was formed.

<Manufacture of Electrode>

Next, an electrode was manufactured using the obtained sample C. The sample C was used as an active material, acetylene black (AB) was used as a conductive additive, and PVdF was used as a binder.

First, in a mixer, PVdF and AB were mixed with N-methyl-2-pyrrolidone (NMP) which was a polar solvent, so that slurry was formed. The compounding ratio of the sample C to AB and PVdF in the electrode binder composition was 90:5:5 (weight ratio).

Next, the electrode binder composition was applied to aluminum foil which was a current collector. Note that a surface of the aluminum foil was covered with an undercoat in advance. After that, drying was performed at 80° C. for 30 minutes in a circulation drying furnace. An electrode obtained here is referred to as an electrode X1. Then, the electrode was pressed with a roller press machine while the press pressure was adjusted so that the thickness after application of the electrode was reduced by 20%. The press temperature was 120° C.

After that, heat treatment was performed on the electrode X1 at 250° C. under a reduced pressure atmosphere (1 kPa) for 10 hours. Through the above process, an electrode X2 was obtained.

<Half Cell Characteristics>

Next, half cells were fabricated using the electrodes X1 and X2. For each of the cells, a coin cell was used. Lithium was used for a counter electrode of each of the half cells. An electrolytic solution was formed by dissolving $LiPF_6$ as an electrolyte in a mixed solution containing EC and DEC, which are aprotic organic solvents, at a volume ratio of 1:1. As the separator, polypropylene (PP) was used.

Figure 52:
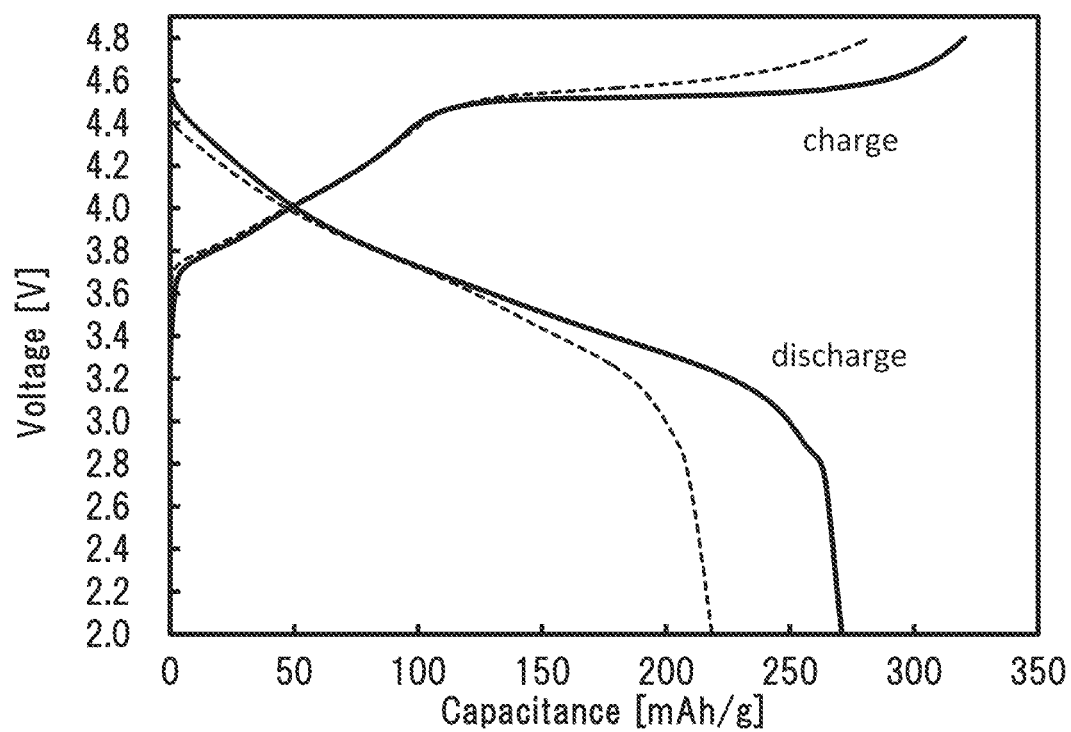
FIG. 52 is a graph showing charge and discharge characteristics.

The charge and discharge characteristics were measured at 25° C. Charging was performed at a constant current of 30 mA/g with the upper voltage limit set to 4.8 V and discharging was performed at a constant current of 30 mA/g with the lower voltage limit set to 2 V. FIG. 52 shows charge and discharge curves. The dashed line indicates a charge and discharge curve of the electrode X1, and the solid line indicates a charge and discharge curve of the electrode X2. The electrode X2 subjected to heat treatment achieved higher capacity.

Example 10

In this example, XPS analysis results of an electrode of one embodiment of the present invention are described.

<Synthesis>

A particle containing a lithium-manganese composite oxide was formed through steps shown in FIG. 1.

(Step S11)

First, $Li_2CO_3$, $MnCO_3$, and NiO were weighed as starting materials so that the ratio (molar ratio) of $Li_2CO_3$ to $MnCO_3$ and NiO became 0.84:0.8062:0.318.

(Step S12)

Ethanol was added to the starting materials. Then, ethanol and the starting materials were mixed in a chamber of a bead mill rotating at a peripheral speed of 10 m/s.

(Step S13)

Next, heat treatment was performed at a temperature lower than or equal to 100° C. to evaporate ethanol, and a mixed material was obtained.

(Step S14)

Subsequently, the mixed material was put in a crucible and firing was performed at 1000° C. in a dry air atmosphere at a flow rate of 10 L/min for 10 hours.

(Step S15)

Then, crushing treatment was performed on sintered lithium-manganese composite oxide. After ethanol was added to 600 g of the sintered lithium-manganese composite oxide, the crushing was performed for 10 hours in a chamber of a bead mill rotating at a peripheral speed of 12 m/s.

(Step S16)

Next, heat treatment was performed at a temperature lower than or equal to 100° C. to evaporate ethanol. Then, the obtained lithium-manganese composite oxide was put in a crucible and firing was performed at 800° C. in a dry air atmosphere at 10 L/min for 3 hours. The resulting powder is referred to as a sample A2. Although the sample A2 is represented by a composition formula $Li_{1.68}Mn_{0.8062}Ni_{0.318}O_3$, the composition of the sample A2 might be different from this.

<Coating Layer>

Next, a layer containing carbon was formed on a surface of the sample A2. Water and graphene oxide were mixed in a mixer to form an aqueous dispersion of the graphene oxide. The amount of the water with respect to 1 g of the graphene oxide was set to 15 mL.

(Step S17)

Then, the formed aqueous dispersion and the sample A2 were mixed. Here, the amount of the sample A2 with respect to 1 g of the graphene oxide was set to 50 g. The obtained mixture was dried under a reduced pressure in a bell jar at 70° C. and then ground in an alumina mortar, so that a sample B2 (lithium manganese composite oxide coated with graphene oxide) was obtained.

(Step S18)

Then, the graphene oxide coating the surface of the lithium manganese composite oxide was reduced. Ascorbic acid was used as a reducing agent, and a mixed solvent of ethanol and water was used as a solvent. In the mixed solvent, the concentration of ethanol was 80 vol %. A reducing solution was formed by adding 16.87 weight % of the ascorbic acid and 3.9 weight % of lithium hydroxide, the weight percentages were with respect to the weight of the lithium-manganese composite oxides coated with graphene oxide. The obtained powder was put in the reducing solution, and reduction was performed at 60° C. for 3 hours.

(Step S19)

Next, the obtained solution was subjected to treatment using a centrifuge to separate the solvent and the sample. Next, pure water was added to the sample from which the solvent was separated to obtain a solution at a concentration of 24 g/l. After being heated at 60° C., the obtained solution was heated to 200° C. in an inlet of the spray dry apparatus to perform spray dry treatment.

Then, powder obtained by the spray dry treatment was dried at 170° C. under a reduced pressure for 10 hours.

Through the above steps, a powdery lithium-manganese composite oxide (sample C2) in which graphene was formed on a surface was formed.

<Manufacture of Electrode>

Next, an electrode was manufactured using the obtained sample C2. The sample C2 was used as an active material, acetylene black (AB) was used as a conductive additive, and PVdF was used as a binder.

First, in a mixer, PVdF and AB were mixed with N-methyl-2-pyrrolidone (NMP) which was a polar solvent, so that slurry was formed. The compounding ratio of the sample C to AB and PVdF in the electrode binder composition was 90:5:5 (weight ratio).

Next, the electrode binder composition was applied to aluminum foil which was a current collector. Note that a surface of the aluminum foil was covered with an undercoat in advance. After that, drying was performed at 80° C. for 30 minutes in a circulation drying furnace. An electrode obtained here is referred to as an electrode X3. Then, the electrode X3 was pressed with a roller press machine while the press pressure was adjusted so that the thickness after application of the electrode was reduced by 20%. The press temperature was 120° C.

Then, heat treatment was performed on the electrode X3. An electrode obtained by performing heat treatment on the electrode X3 at 170° C. under a pressure of 1 kPa for 10 hours is referred to as an electrode X4. An electrode obtained by performing heat treatment on the electrode X3 at 250° C. under a pressure of 1 kPa for 10 hours is referred to as an electrode X5.

<XPS Analysis>

XPS analysis was performed on the electrodes X3, X4, and X5. FIGS. 53A and 53B and FIGS. 54A and 54B show narrow spectra of Li1s, O1s, C1s, and F1s. Table 5 shows the proportions of Ni, Mn, Li, O, C, and F in the electrodes. In Table 5, numerical values were normalized so that the sum of the proportions of the six elements became 100 atomic %.

TABLE 5

| Electrode | Proportion [atomic %] | | | | | |
| --- | --- | --- | --- | --- | --- | --- |
| | Ni | Mn | Li | O | C | F |
| X3 | 6.2 | 8 | 7.6 | 26.4 | 37.7 | 14.2 |
| X4 | 5.8 | 6.9 | 6.5 | 22.9 | 41.5 | 16.3 |
| X5 | 4.7 | 4.3 | 17.9 | 17.5 | 33.1 | 22.5 |

Figure 53A:
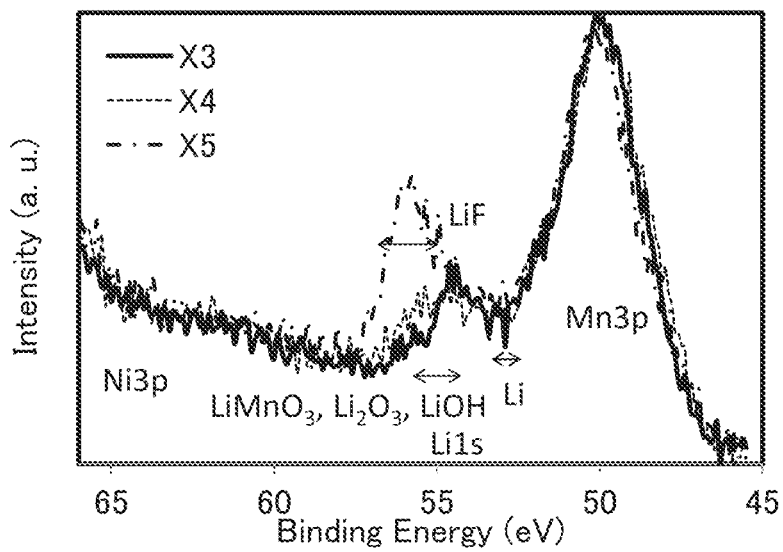
FIGS. 53A and 53B show XPS measurement results.
Figure 53B:
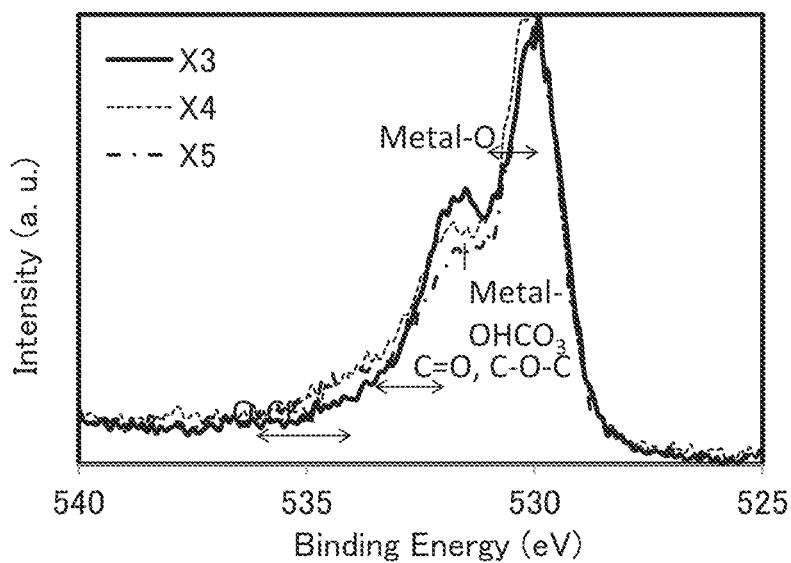
Figure 54A:
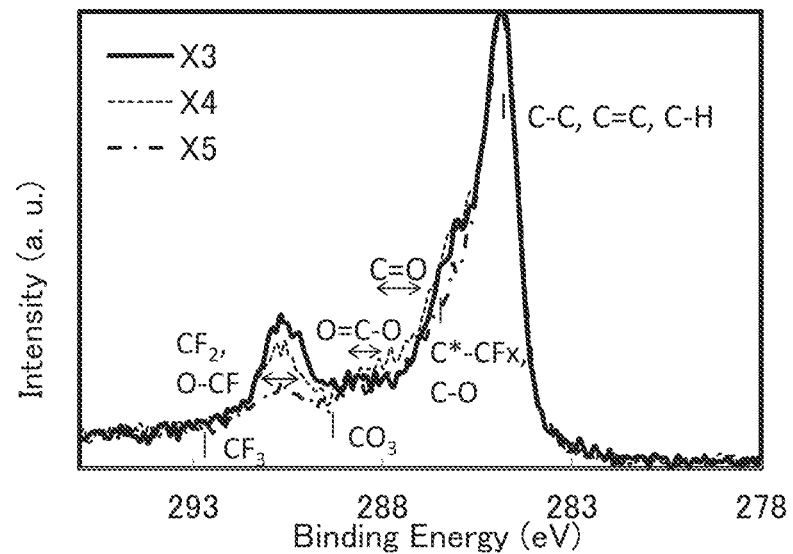
FIGS. 54A and 54B show XPS measurement results.
Figure 54B:
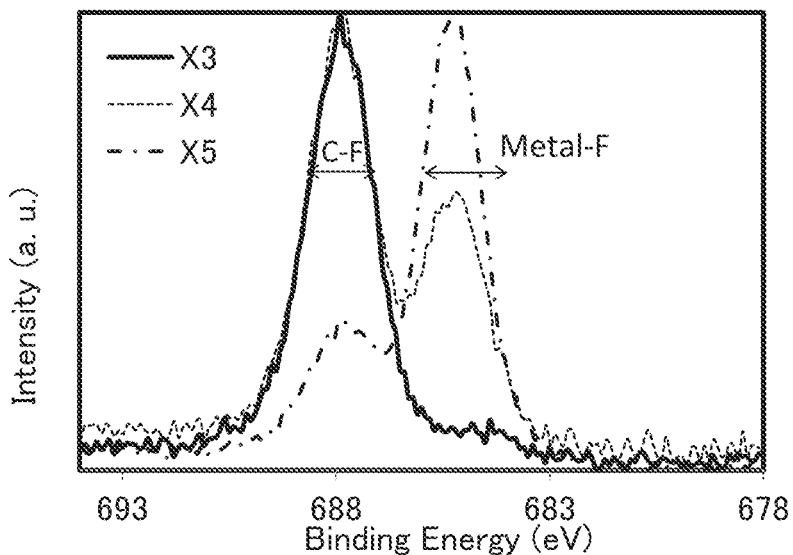

It is shown from FIG. 53A that the intensity of a peak due to LiF or the like is increased in the electrode X5 as compared to the cases of the electrodes X3 and X4. It is shown from FIG. 54A that a $CF_2$ bond and a O—CF bond in the electrodes X4 and X5 are decreased from those in the electrode X3 by the heat treatment performed on the electrodes and the increase in the temperature of the heat treatment. It is shown from FIG. 54B that a metal-F bond in the electrodes X4 and X5 is increased from that in the electrode X3 by the heat treatment performed on the electrodes and the increase in the temperature of the heat treatment. From these results, it is probable that the $CF_2$ bond and the O—CF bond in PVdF are cut by the heat treatment performed on the electrodes and the increase in the temperature of the heat treatment, and a Li—F bond is formed between Li in the sample C and F formed by cutting the $CF_2$ bond and the O—CF bond. There is a possibility that the formation of the Li—F bond increased the strength of the electrode.

Example 11

In this example, a half cell was formed using an electrode of one embodiment of the present invention, and characteristics thereof were evaluated.
<Manufacture of Electrode>
An electrode was manufactured using the sample C2 obtained through the steps described in Example 2. The sample C2 was used as an active material, acetylene black (AB) was used as a conductive additive, and polyimide was used as a binder.

First, in a mixer, a precursor of polyimide (PI) and AB were mixed with N-methyl-2-pyrrolidone (NMP) which was a polar solvent, so that slurry was formed. The compounding ratio of the sample C to AB and PI in the electrode binder composition was 90:5:5 (weight ratio). An NMP solution of the precursor of polyimide was used. The concentration of the solution was set to 13.7 weight %.

Next, the electrode binder composition was applied to aluminum foil which was a current collector. Note that a surface of the aluminum foil was covered with an undercoat in advance. After that, the solvent was evaporated by performing heating at 80° C. in a drying furnace for 30 minutes. The electrode obtained here is referred to as an electrode Z1. Then, the electrode was pressed.

After that, the electrode Z1 was subjected to heat treatment at 300° C. under a pressure of 1 kPa for 10 hours. The obtained electrode is referred to as an electrode Z2.
<Half Cell Characteristics>
Next, a half cell was fabricated using the electrode Z2. The conditions for fabricating the half cell were the same as those in Example 1.

Figure 55:
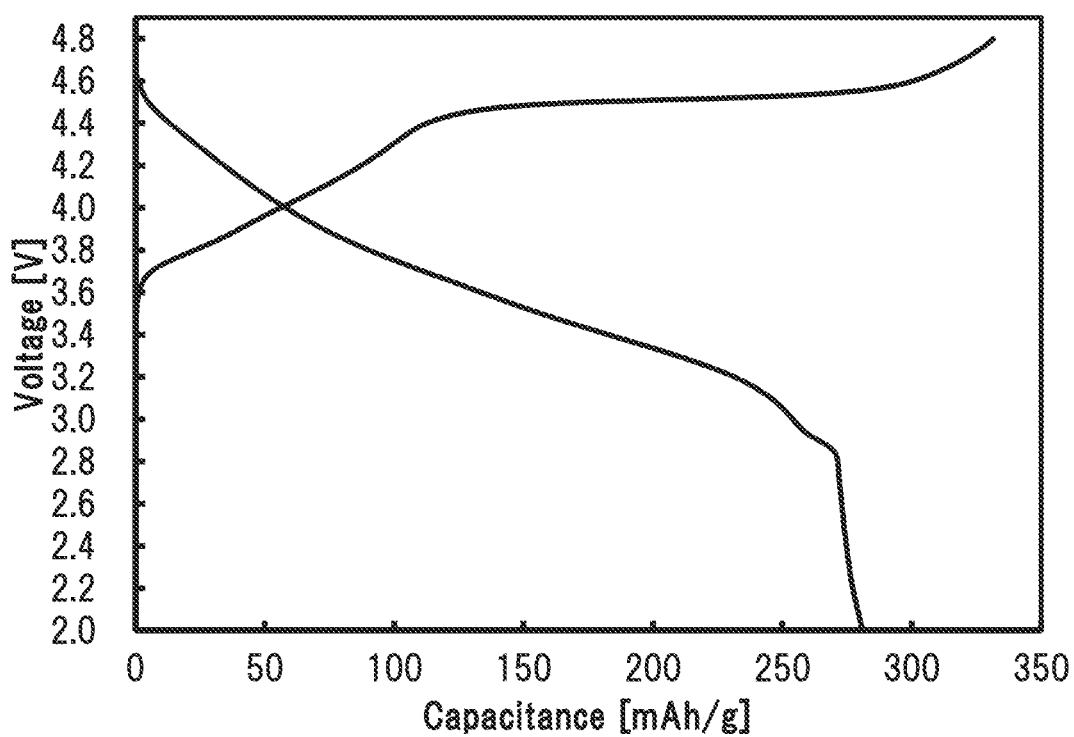
FIG. 55 is a graph showing charge and discharge characteristics.

The charge and discharge characteristics were measured at 25° C. Charging was performed at a constant current of 30 mA/g with the upper voltage limit set to 4.8 V and discharging was performed at a constant current of 30 mA/g with the lower voltage limit set to 2 V. FIG. 55 shows charge and discharge curves. An extremely high discharge capacity of 281 mAh/g was obtained by using the electrode Z2 subjected to the heat treatment at a temperature as high as 300° C.

REFERENCE NUMERALS

100: electrode, 101: current collector, 102: active material layer, 120a: graphene, 131: region, 132: region, 133: region, 141: particle, 142: region, 143: region, 300: storage battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 500: storage battery, 501: positive electrode current collector, 502: positive electrode active material layer, 503: positive electrode, 504: negative electrode current collector, 505: negative electrode active material layer, 506: negative electrode, 507: separator, 508: electrolyte solution, 509: exterior body, 510: the positive electrode Lead electrode, 511: negative electrode: lead electrode, 512: welding region, 513: bent portion, 514: sealing portion, 600: storage battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism, 900: circuit board, 910: label, 911: terminal, 912: circuit, 913: storage battery, 914: antenna, 915: antenna, 916: layer, 917: layer, 918: antenna, 919: terminal, 920: display device, 921: sensor, 922: terminal, 951: terminal, 952: terminal, 981: film, 982: film, 990: storage battery, 991: exterior body, 992: exterior body, 993: wound body, 994: negative electrode, 995: positive electrode, 996: separator, 997: lead electrode, 998: lead electrode, 1700: curved surface, 1701: plane, 1702: curve, 1703: radius of curvature, 1704: center of curvature, 1800: center of curvature, 1801: film, 1802: radius of curvature, 1803: film, 1804: radius of curvature, 1805: electrodes, an electrolytic solution, and the like, 7100: portable display device, 7101: housing, 7102: display portion, 7103: operation button, 7104: power storage device, 7200: portable information terminal, 7201: housing, 7202: display portion, 7203: hand, 7204: buckle, 7205: operation button, 7206: input-output terminal, 7207: icon, 7300: display device, 7304: display portion, 7400: mobile phone, 7401: housing, 7402: display portion, 7403: operation button, 7404: external connection port, 7405: speaker, 7406: microphone, 7407: power storage device, 7408: lead electrode, 7409: current collector, 8000: display device, 8001: housing. 8002: display portion, 8003: speaker portion, 8004: power storage device, 8021: charging device, 8022: cable, 8024: power storage device, 8100: lighting device, 8101: housing, 8102: light source, 8103: power storage device, 8104: ceiling, 8105: wall, 8106: floor, 8107: window, 8200: indoor unit, 8201: housing, 8202: air outlet, 8203: power storage device, 8204: outdoor unit, 8300: electric refrigerator-freezer, 8301: housing, 8302: refrigerator door, 8303: freezer door, 8304: power storage device, 8400: automobile, 8401: headlight, 8406: motor, 8500: automobile, 9600: tablet terminal, 9625: switch, 9626: switch, 9627: power source switch, 9628: operation switch, 9629: fastener, 9630: housing, 9630a: housing, 9630b: housing, 9631: display portion, 9631a: display portion, 9631b: display portion, 9632a: region, 9632h: region, 9633: solar cell, 9634: charge and discharge control circuit, 9635: power storage unit, 9636: DCDC converter, 9637: converter, 9638: operation key, 9639: button, 9640: movable portion; S1: control signal, S2: control signal, S3: voltage transformation signal, BT00: power storage device, BT01: terminal pair, BT02: terminal pair, BT03: switching control circuit, BT04: switching circuit, BT05: switching circuit, BT06: voltage transformation control circuit, BT07: transformer circuit, BT08: battery portion, BT09: battery cell, BT10: transistor, BT11: bus, BT12: bus, BT13: transistor, BT14: current control switch, BT15: bus, BT16: bus, BT17: switch pair, BT18: switch pair, BT21: transistor pair, BT22: transistor, BT23: transistor, BT24: bus, BT25: bus, BT31: transistor pair, BT32: transistor, BT33: transistor, BT34: bus, BT35: bus, BT41: battery management unit, BT51: insulated DC-DC converter, BT52: switch portion, and BT53: transformer.

This application is based on Japanese Patent Application serial No. 2014-218659 filed with Japan Patent Office on Oct. 27, 2014, Japanese Patent Application serial No. 2014-218501 filed with Japan Patent Office on Oct. 27, 2014, Japanese Patent Application serial No. 2014-227325 filed with Japan Patent Office on Nov. 7, 2014, and Japanese Patent Application serial No. 2014-227729 filed with Japan Patent Office on Nov. 10, 2014, the entire contents of which are hereby incorporated by reference.

What is claimed is:

1. A battery comprising:
a positive electrode and a negative electrode,
wherein the positive electrode includes a positive electrode active material and a conductive additive,
wherein the positive electrode active material includes composite oxide containing lithium and manganese,
wherein the composite oxide has a first region and a second region,
wherein the second region is located at a more surface side than the first region,
wherein the first region and the second region include lithium and oxide,
wherein at least one of the first region and the second region includes manganese and an element represented by M,
wherein the element represented by M is one or more elements selected from Ni, Ga, Fe, Mo, In, Nb, Nd, Co, Sm, Mg, Al, Ti, Cu, Zn, Si, and P,
wherein an atomic ratio of lithium, manganese, the element represented by M, and oxygen in the first region is represented by a1:b1:c1:d1,
wherein an atomic ratio of lithium, manganese, the element represented by M, and oxygen in the second region is represented by a2:b2:c2:d2,
wherein $d1/(b1+c1)$ is greater than or equal to 2.2,
wherein $d2/(b2+c2)$ is less than 2.2,
wherein the conductive additive includes a carbon fiber or graphene,
wherein the negative electrode includes a negative electrode active material,
wherein the negative electrode active material includes a carbon-based material, and
wherein a thickness of the second region is greater than or equal to 0.1 nm and less than or equal to 30 nm.

2. The battery according to claim 1, wherein the carbon fiber is a carbon nanotube.

3. A battery comprising:
a positive electrode and a negative electrode,
wherein the positive electrode includes a positive electrode active material and a conductive additive,
wherein the positive electrode active material includes composite oxide containing lithium and manganese,
wherein the composite oxide has a first region and a second region,
wherein the second region is located at a more surface side than the first region,
wherein the first region and the second region include lithium and oxide,
wherein at least one of the first region and the second region includes manganese and an element represented by M,
wherein the element represented by M is one or more elements selected from Ni, Ga, Fe, Mo, In, Nb, Nd, Co, Sm, Mg, Al, Ti, Cu, Zn, Si, and P,
wherein the first region includes a first layered rock-salt structure and the second region includes a second layered rock-salt structure whose crystal orientations are different from each other,
wherein an atomic ratio of lithium, manganese, the element represented by M, and oxygen in the first region is represented by a1:b1:c1:d1,
wherein an atomic ratio of lithium, manganese, the element represented by M, and oxygen in the second region is represented by a2:b2:c2:d2,
wherein $d1/(b1+c1)$ is greater than or equal to 2.2,
wherein $d2/(b2+c2)$ is less than 2.2,
wherein the conductive additive includes a carbon fiber or graphene,
wherein the negative electrode includes a negative electrode active material, and
wherein the negative electrode active material includes a carbon-based material, and
wherein a thickness of the second region is greater than or equal to 0.1 nm and less than or equal to 30 nm.

4. The battery according to claim 3, wherein the carbon fiber is a carbon nanotube.

5. A battery comprising:
a positive electrode and a negative electrode,
wherein the positive electrode includes a positive electrode active material and a conductive additive,
wherein the positive electrode active material includes composite oxide containing lithium and manganese,
wherein the composite oxide has a first region, a second region, and a third region,
wherein the second region and the third region are located at a more surface side than the first region,
wherein the third region is located at a more surface side than the second region,
wherein the first region and the second region include lithium and oxide,
wherein at least one of the first region and the second region includes manganese and an element represented by M,
wherein the element represented by M is one or more elements selected from Ni, Ga, Fe, Mo, In, Nb, Nd, Co, Sm, Mg, Al, Ti, Cu, Zn, Si, and P,
wherein the third region includes carbon and oxide,
wherein the first region includes a first layered rock-salt structure and the second region includes a second layered rock-salt structure whose crystal orientations are different from each other,
wherein an atomic ratio of lithium, manganese, the element represented by M, and oxygen in the first region is represented by a1:b1:c1:d1,
wherein an atomic ratio of lithium, manganese, the element represented by M, and oxygen in the second region is represented by a2:b2:c2:d2,
wherein $d1/(b1+c1)$ is greater than or equal to 2.2,
wherein $d2/(b2+c2)$ is less than 2.2,
wherein the conductive additive includes a carbon fiber or graphene, wherein the negative electrode includes a negative electrode active material, and wherein the negative electrode active material includes a carbon-based material.

6. The battery according to claim 5, wherein a thickness of the second region is greater than or equal to 0.1 nm and less than or equal to 30 nm.

7. The battery according to claim 5, wherein the carbon fiber is a carbon nanotube.

8. The battery according to claim 5, wherein a thickness of the third region is greater than or equal to 0.1 nm and less than or equal to 30 nm.

9. The battery according to claim 5, wherein a proportion of oxygen in the third region is higher than or equal to 2 atomic % and lower than or equal to 20 atomic %.

* * * * *